United States Patent
Gross et al.

(10) Patent No.: US 12,497,662 B2
(45) Date of Patent: Dec. 16, 2025

(54) SYSTEMS AND METHODS FOR TUMOR FRACTION ESTIMATION FROM SMALL VARIANTS

(71) Applicant: GRAIL, Inc., Menlo Park, CA (US)

(72) Inventors: Samuel S. Gross, Sunnyvale, CA (US); Joshua Newman, Mountain View, CA (US); Pranav Parmjit Singh, Santa Clara, CA (US); Collin Melton, Menlo Park, CA (US); Oliver Claude Venn, San Francisco, CA (US); Earl Hubbell, Palo Alto, CA (US)

(73) Assignee: GRAIL, Inc., Menlo Park, CA (US)

( * ) Notice: Subject to any disclaimer, the term of this patent is extended or adjusted under 35 U.S.C. 154(b) by 629 days.

(21) Appl. No.: 16/850,634

(22) Filed: Apr. 16, 2020

(65) Prior Publication Data

US 2020/0340064 A1  Oct. 29, 2020

Related U.S. Application Data

(60) Provisional application No. 62/972,375, filed on Feb. 10, 2020, provisional application No. 62/834,904, filed on Apr. 16, 2019.

(51) Int. Cl.
*C12Q 1/6886* (2018.01)
*C12Q 1/6869* (2018.01)
(Continued)

(52) U.S. Cl.
CPC ......... *C12Q 1/6886* (2013.01); *C12Q 1/6869* (2013.01); *G16B 20/20* (2019.02);
(Continued)

(58) Field of Classification Search
CPC ................ C12Q 1/6886; C12Q 1/6869; C12Q 2523/125; C12Q 2600/112;
(Continued)

(56) References Cited

U.S. PATENT DOCUMENTS 8,642,349 B1  2/2014 Yeatman et al.
8,706,422 B2  4/2014 Lo et al.
(Continued)

FOREIGN PATENT DOCUMENTS

AU  2015360298 A1  9/2018
WO  WO 2010/051318 A1  5/2010
(Continued)

OTHER PUBLICATIONS

Movassagh, Mercedeh, et al. "RNA2DNAlign: nucleotide resolution allele asymmetries through quantitative assessment of RNA and DNA paired sequencing data." Nucleic acids research 44.22 (2016): e161-e161. (Year: 2016).*

(Continued)

*Primary Examiner* — Kaitlyn L Minchella
*Assistant Examiner* — Noah A. Auger
(74) *Attorney, Agent, or Firm* — Fenwick & West LLP

(57) ABSTRACT

Systems and methods for cancer subject tumor fraction estimation comprise obtaining a first plurality of nucleic acid fragment sequences from the subject's liquid biological sample. The first plurality of sequences represent cell-free nucleic acids in the liquid sample. A second plurality of nucleic acid fragment sequences is obtained from the subject's tumor sample. The second plurality of sequences represent nucleic acid molecules in the tumor. Smoothed noise rates, each determined using nucleic acid fragment sequences from non-cancer samples mapping to a corresponding allele position in a plurality of allele positions, are obtained. Variant allele counts and coverages are determined for the allele positions using the first plurality of sequences. Solid variant allele fractions are determined for the plurality of allele positions using the second plurality of sequences. The subject tumor fraction is calculated using the smoothed (Continued)

noise rates, variant allele counts, coverages, and solid variant allele fractions.

22 Claims, 19 Drawing Sheets

(51) Int. Cl.
    G16B 20/00     (2019.01)
    G16B 20/20     (2019.01)
    G16B 30/10     (2019.01)
    G16B 30/20     (2019.01)
    G16B 40/20     (2019.01)
    G16B 40/30     (2019.01)
    G16C 10/00     (2019.01)
    G16H 50/20     (2018.01)

(52) U.S. Cl.
    CPC ............ *G16B 30/10* (2019.02); *G16C 10/00* (2019.02); *G16H 50/20* (2018.01); *C12Q 2523/125* (2013.01); *C12Q 2600/112* (2013.01); *C12Q 2600/154* (2013.01); *G16B 20/00* (2019.02); *G16B 30/20* (2019.02); *G16B 40/20* (2019.02); *G16B 40/30* (2019.02)

(58) Field of Classification Search
    CPC .. C12Q 2600/154; G16H 50/20; G16C 10/00; G16B 30/10; G16B 20/20; G16B 40/30; G16B 20/00; G16B 30/20; G16B 40/20
    USPC .......................................................... 702/19
    See application file for complete search history.

(56)  References Cited

U.S. PATENT DOCUMENTS

| | | | |
|---|---|---|---|
| 9,260,745 B2 | 2/2016 | Rava et al. | |
| 10,457,995 B2 | 10/2019 | Talasaz | |
| 2010/0112590 A1 | 5/2010 | Lo et al. | |
| 2012/0053253 A1 | 3/2012 | Stone et al. | |
| 2013/0034546 A1 | 2/2013 | Rava et al. | |
| 2013/0325360 A1 | 12/2013 | Deciu et al. | |
| 2014/0066317 A1 | 3/2014 | Talasaz | |
| 2014/0100121 A1 | 4/2014 | Lo et al. | |
| 2014/0242588 A1 | 8/2014 | Van Den Boom et al. | |
| 2016/0002739 A1 | 1/2016 | Schutz et al. | |
| 2016/0232290 A1 | 8/2016 | Rava et al. | |
| 2016/0251704 A1 | 9/2016 | Talasaz et al. | |
| 2017/0107576 A1 | 4/2017 | Babiarz et al. | |
| 2017/0121767 A1 | 5/2017 | Dor et al. | |
| 2017/0240973 A1 | 8/2017 | Eltoukhy et al. | |
| 2017/0329893 A1 | 11/2017 | Di Iulio et al. | |
| 2017/0342477 A1 | 11/2017 | Jensen et al. | |
| 2017/0342500 A1 | 11/2017 | Maquard et al. | |
| 2017/0362638 A1 | 12/2017 | Chudova et al. | |
| 2018/0148777 A1 | 5/2018 | Kirkizlar et al. | |
| 2018/0173845 A1 | 6/2018 | Sigurjonsson et al. | |
| 2019/0106737 A1 | 4/2019 | Underhill | |
| 2019/0164627 A1 | 5/2019 | Blocker et al. | |
| 2019/0287646 A1 | 9/2019 | Hubbell | |
| 2019/0287649 A1 | 9/2019 | Fillipova et al. | |
| 2019/0287652 A1 | 9/2019 | Gross | |
| 2019/0316209 A1 | 10/2019 | Hubbell et al. | |
| 2020/0131582 A1 | 4/2020 | Zhou et al. | |
| 2021/0043275 A1* | 2/2021 | Landau ................. | G16B 20/20 |

FOREIGN PATENT DOCUMENTS

| | | |
|---|---|---|
| WO | WO 2012/071621 A1 | 6/2012 |
| WO | WO 2013/052907 A1 | 4/2013 |
| WO | WO 2014/149134 A1 | 9/2014 |
| WO | WO 2016/094853 A1 | 6/2016 |
| WO | 20160127944 A1 | 8/2016 |
| WO | WO 2017/161175 A1 | 9/2017 |
| WO | 20170181146 A1 | 10/2017 |
| WO | WO 2017/181202 A1 | 10/2017 |
| WO | WO 2017/212428 A1 | 12/2017 |
| WO | WO 2018/009723 A1 | 1/2018 |
| WO | WO 2018/022890 A1 | 2/2018 |
| WO | WO 2018/022906 A1 | 2/2018 |
| WO | WO 2018/031929 A1 | 2/2018 |
| WO | 20190055835 A1 | 3/2019 |
| WO | WO 2019/084559 A1 | 5/2019 |

OTHER PUBLICATIONS

Landau, Dan A., et al. "Evolution and impact of subclonal mutations in chronic lymphocytic leukemia." Cell 152.4 (2013): 714-726. (Year: 2013).*

Carter, Scott L., et al. "Absolute quantification of somatic DNA alterations in human cancer." Nature biotechnology 30.5 (2012): 413-421. (Year: 2012).*

Fernandez-Cuesta, Lynnette, et al. "Identification of circulating tumor DNA for the early detection of small-cell lung cancer." EBioMedicine 10 (2016): 117-123. (Year: 2016).*

Zucker, Mark R., et al. "Inferring clonal heterogeneity in cancer using SNP arrays and whole genome sequencing." Bioinformatics 35.17 (2019): 2924-2931. (Year: 2019).*

Vavoulis, Dimitrios V., Jenny C. Taylor, and Anna Schuh. "Hierarchical probabilistic models for multiple gene/variant associations based on next-generation sequencing data." Bioinformatics 33.19 (2017): 3058-3064. (Year: 2017).*

Maggi, Elaine C., et al. "Development of a method to implement whole-genome bisulfite sequencing of cfDNA from cancer patients and a mouse tumor model." Frontiers in genetics 9 (2018): 6. (Year: 2018).*

Buono, Giuseppe, et al. "Circulating tumor DNA analysis in breast cancer: Is it ready for prime-time?." Cancer Treatment Reviews 73 (2019): 73-83. (Year: 2019).*

Serrati, S., De Summa, S., Pilato, B., Petriella, D., Lacalamita, R., Tommasi, S., & Pinto, R. (2016). Next-generation sequencing: advances and applications in cancer diagnosis. OncoTargets and therapy, 7355-7365. (Year: 2016).*

Xia, L., Li, Z., Zhou, B., Tian, G., Zeng, L., Dai, H., . . . & He, J. (2017). Statistical analysis of mutant allele frequency level of circulating cell-free DNA and blood cells in healthy individuals. Scientific reports, 7(1), 7526. (Year: 2017).*

Rachiglio, A. M., Abate, R. E., Sacco, A., Pasquale, R., Fenizia, F., Lambiase, M., . . . & Normanno, N. (2016). Limits and potential of targeted sequencing analysis of liquid biopsy in patients with lung and colon carcinoma. Oncotarget, 7(41), 66595. (Year: 2016).*

Yao, Y., Liu, J., Li, L., Yuan, Y., Nan, K., Wu, X., Zhang, Z., Wu, Y., Li, X., Zhu, J., Meng, X., Wei, L., Chen, J., & Jiang, Z. (2017). Detection of circulating tumor DNA in patients with advanced non-small cell lung cancer. Oncotarget, 8(2), 2130-2140. https://doi.org/10.18632/oncotarget.12883 (Year: 2017).*

Villaflor, V., Won, B., Nagy, R., Banks, K., Lanman, R. B., Talasaz, A., & Salgia, R. (2016). Biopsy-free circulating tumor DNA assay identifies actionable mutations in lung cancer. Oncotarget, 7(41), 66880. (Year: 2016).*

Gray, P. N., Dunlop, C. L., & Elliott, A. M. (2015). Not all next generation sequencing diagnostics are created equal: understanding the nuances of solid tumor assay design for somatic mutation detection. Cancers, 7(3), 1313-1332. (Year: 2015).*

International Search Report and Written Opinion for PCT Application No. PCT/US2019/22139, 18 pages, Jul. 11, 2019.

International Search Report and Written Opinion for PCT Application No. PCT/US2019/034994, Sep. 13, 2019.

"U.S. Appl. No. 62/847,223, entitled Model-Based Featurization and Classification," filed May 13, 2019.

"U.S. Appl. No. 62/851,486, entitled Systems and Methods for Determining Whether a Subject Has a Cancer Condition Using Transfer Learning," filed May 22, 2019.

"U.S. Appl. No. 62/827,682, entitled Systems and Methods for Using Fragment Lengths as a Predictor of Cancer," filed Apr. 1, 2019.

U.S. Appl. No. 62/818,013, filed Mar. 13, 2019.

(56) References Cited

OTHER PUBLICATIONS

U.S. Appl. No. 62/679,347, filed Jun. 1, 2018.
Alkan, et al., "Personalized Copy-Number and Segmental Duplication Maps using Next-Generation Sequencing," Nat Genet 41, pp. 1061-1067, 2009.
Benjamin, et al., "Summarizing and Correcting the GC Content Bias in High-Throughput Sequencing," Nucleic Acids Research, vol. 40, Issue 10, pp. 1-14, 2012.
Boeva, et al., "Control-Free Calling of Copy Number Alternations in Deep-Sequencing Data using GC-Content Normalization," Bioinformatics, 27(2), pp. 266-269, 2011.
Casadio, et al., "Urine cell-free DNA integrity as a marker for early bladder cancer diagnosis: preliminary data," Urol Oncol. 31(8), pp. 1744-1750, 2013.
Chan, et al., "Clinical Sciences Reviews Committee of the Association of Clinical Biochemists Cell-free nucleic acids in plasma, serum and urine: a new tool in molecular diagnosis," (Pt 2), pp. 122-130, 2003.
De Mattos-Arruda, et al., "Cell-free circulating tumour DNA as a liquid biopsy in breast cancer," Mol Oncol. 10(3), pp. 464-474, 2016.
Erickson, et al., "Somatic gene mutation and human disease other than cancer," Mutat Res 543(2), pp. 125-136, 2003.
Erickson, "Somatic gene mutation and human disease other than cancer: An update," Mutat Res 705(2), pp. 96-106, 2010.
Frenel, et al., "Serial next-generation sequencing of circulating cell-free DNA evaluating tumor clone response to molecularly targeted drug administration," Clin Cancer Res 21(20), pp. 4586-4596, 2015.
Goessl, et al., "Fluorescent methylation-specific polymerase chain reaction for DNA based detection of prostate cancer in bodily fluids," Cancer Res 60(21), pp. 5941-5845, 2000.
Gold, "Softmax to Softassign: Neural Network Algorithms for Combinatorial Optimization," Journal of Artificial Neural Networks 2, pp. 381-399, 1996.
Hao, et al., "Circulating cell-free DNA in serum as a biomarker for diagnosis and prognostic prediction of colorectal cancer," Br J Cancer 111(8), pp. 1482-1489, 2014.
Heitzer, et al., "Circulating tumor DNA as a liquid biopsy for cancer," Clin Chem. 61(1), pp. 112-123, 2015.
Heitzer, et al., "Establishment of tumor specific copy number alterations from plasma DNA of patients with cancer," Int J Cancer. 133(2), pp. 346-356, 2013.
Hoadley, et al., "Multi-platform analysis of 12 cancer types reveals molecular classification within and across tissues-of-origin," Cell, 158(4), pp. 929-944, 2014.
Kim, et al., "Circulating cell-free DNA as a promising biomarker in patients with gastric cancer: diagnostic validity and significant reduction of cfDNA after surgical resection," Ann Surg Treat Res 86(3), pp. 136-142, 2014.
Liu, et al., "Bisulfite-free direct detection of 5-methylcytosine and 5-hydroxymethylcytosine at base resolution," Nature Biotechnology 37, pp. 424-429, 2019.
Lo, Y.M. Dennis, et al., "Maternal Plasma DNA Sequencing Reveals the Genome-Wide Genetic and Mutational Profile of the Fetus," Science Translational Medicine, vol. 2, Issue 61, 14 pages, [online], retrieved from the internet URL: www.stm.sciencemag.org., 2010.
Miller, et al., "ReadDepth: A parallel R package for detecting copy numer alterations from short sequencing reads," PLOS ONE, vol. 6, pp. 1-7, 2011.
Raptis, et al., "Quantitation and characterization of plasma DNA ins normals and patients with systemic lupus erythematosu," J Clin Invest. 66(6), pp. 1391-1399, 1980.
Salvi, et al., "Cell-free DNA as a diagnostic marker for cancer: current insights," Onco Targets Ther. 9, pp. 6549-6559, 2016.
Shao, et al., "Quantitative analysis of cell-free DNA in ovarian cancer," Oncol Lett 10(6), pp. 3478-3482, 2015.
Shapiro, et al., "Determination of circulating DNA levels in patients with benign or malignant gastrointestinal disease," Cancer. 51(11), pp. 2116-2120, 1983.
Siegel, et al., "Cancer statistics," CA Cancer J Clin. 65(1), pp. 5-29, 2015.
Sozzi, "Quantification of free circulating DNA as a diagnostic marker in lung cancer," J Clin Oncol. 21(21), pp. 3902-3908.
Stroun, et al., "Neoplastic characteristics of the DNA found in the plasma of cancer patients," Oncology 46(5), pp. 318-322, 1989.
Terry, et al., "A prospective evaluation of early detection biomarkers for ovarian cancer in the European EPIC cohort," Clin Cancer Res., 2016.
Yoon, et al., "Sensitive and Accurate Detection of Copy Number Variants Using Read Depth of Coverage," Genome Research, vol. 19, No. 9, pp. 1586-1592, Aug. 5, 2009.
Zhang, et al., "Tumor markers CA19-9, CA242 and CEA in the diagnosis of pancreatic cancer: a meta-analysis," Int J Clin Exp Med. 8(7), pp. 11683-11691, 2015.
Zonta, et al., "Assessment of DNA integrity, applications for cancer research," Adv Clin Chem 70, pp. 197-246, 2015.
Zviran, et al., "Genome-wide cell-free DNA mutational integration enables ultra-sensitive cancer monitoring," Nature Medicine, 2020.
Kang, et al. CancerLocator: non-invasive cancer diagnosis and tissue-of-origin prediction using methylation profiles of cell-free DNA. Genome Biology. 2017; vol. 18, Article No. 53.
Li, et al. CancerDetector: ultrasensitive and non-invasive cancer detection at the resolution of individual reads using cell-free DNA methylation sequencing data. Nucleic Acids Research, vol. 46, Issue 15, Sep. 6, 2018, p. e89.
Hackenberg, Michael, et al. "CpGcluster: a distance-based algorithm for CpG-island detection." BMC bioinformatics 7 (2006): 1-13. (Year: 2006).
"What Does 'Canonical' Mean in Biology?" Biosynthesis, 2021, https://www.biosyn.com/faq/What-does-%22canonical%22-mean-in-biology.aspx. (Year: 2021).
Amarashinghe, et al. "Inferring copy number and genotyp in tumour exome data", BMC Genomics 15, 2014, p. 732.
Ballester, "Advances in clinical next-generation sesquencing: target enrichment and sequencing technologie", Expert Review of Molecular Diagnostics 16:3, pp. 357-372.
Chan, et al. "Noninvasive detection of cancer-associated genome-wide hypomethylation and copy number aberrations by plasma DNA bisulfite sequencing", PNAS, vol. 110, No. 47, pp. 18761-18768.
Cheng, et al., "Noninvasive Detection of Bladder Cancer by Shallow-Depth Genome-Wide Bisulfite Sequencing of Urinary Cell-Free DNA for Methylation and Copy Number Profiling", Clinical Chemistry, vol. 65, Issue 7, Jul. 1, 2019, pp. 927-936.
Corcoran, et al., "Application of Cell-free DNA Analysis to Cancer Treatment", N Engl J Med 379(18), pp. 1754-1765.
Couraud, et al., "Noninvasive diagnosis of actionable mutations by deep sequencing of circulating free DNA in lung cancer from never-smokers: a proof of concept study from BioCAST/IFCT-1002," Clin Cancer Res, 2014.
Gale, et al., Development of a highly sensitive liquid biopsy platform to detect clinically-relevant cancer mutations at low allele fractions in cell-free DNA, PLOS One 13(3), 2018.
Li, Heng, "A survey of sequence alignment algorithms for next-generation sequencing", Briefings in Bioinformatics, 11(5), pp. 473-483.
Min, et al., "Deep learning in bioinformatics", Briefings in Bioinformatics, 18(5), pp. 851-869.
Silva, et al., "Genome-Wide Analysis of Circulating Cell-Free DNA Copy Number Detects Active Melanoma and Predicts Survival", Clinical Chemistry, vol. 64, Issue 9, Sep. 1, 2018, pp. 1338-1346.
Takai, et al., "Clinical utility of circulating tumor DNA for molecular assessment in pancreatic cancer", Sci Rep 5, p. 18425.
Ulz, et al. "Patient monitoring through liquid biopsies using circulating tumor DNA", Int. J. Cancer, 141, p. 887-896.
Wang, et al., "Tumor microenvironment: recent advances in various cancer treatments", Eur Rev Med Pharmacol Sci. Jun. 2018;22(12):3855-3864.
Zeldis, et al., "A review of the history, properties, and use of the immunomodulatory compound lenalidomide", Annals of the New York Academy of Sciences, 1222:76-82.

(56) References Cited

OTHER PUBLICATIONS

Zhao et al., "Abstract 3768: Detection of allele specific loss of heterozygosity in 70,000 patients with ctDNA", Tumor Biology, 2019, vol. 79, issue 13, pp. 3769-3769.
U.S. Appl. No. 16/719,902, filed Dec. 18, 2019.
U.S. Appl. No. 16/936,901, filed Jul. 23, 2020.

* cited by examiner

254 — Use $D_S$, where $D_S$ comprises (i) the plurality of estimated smoothed noise rates, (ii) the plurality of variant allele counts, (iii) the plurality of coverages, and (iv) the plurality of solid variant allele fractions to calculate the tumor fraction $f$ of the subject.

256 — Calculate a likelihood that a given tumor fraction $f$ is a true tumor fraction of the subject in the form of a posterior distribution of the tumor fraction $f$ given $D_S$ by evaluating:

$$P(f_c|D_S) \propto P(D_S|f_c)P(f_c),$$

where $P(f_c)$ is a prior, $P(f_c|D_S)$ is a posterior distribution of the candidate tumor fraction $f_c$ given $D_S$, and $P(D_S|f_c)$ is a probability of observing $D_S$ given the candidate tumor fraction $f_c$.

258 — The prior is a non-informative prior.

260 — The non-informative prior is Jeffrey's prior expressed as $f_c^{-1/2}(1 - f_c)^{-1/2}$.

262 — The tumor fraction of the subject is deemed to be the median value of $P(f|D_S)$.

264 — The posterior distribution is calculated using a Bayesian inference for a binomial distribution.

266 — The using of $D_S$ to calculate the tumor fraction $f$ of the subject comprises calculating:

$$\log P(D_S|f_c) = \sum_{v_i} \log \text{Binomial}\big(s_{v_i,t}; s_{v_i}, f_c a_i + (1 - f_c)ev_i\big)$$

where $s_{v_i,t}$ is a variant allele count at allele position $v_i$, $s_{v_i}$ is a coverage for $s_{v_i,t}$ at allele position $v_i$, and $a_i$ is a solid variant allele fraction at allele position $v_i$.

Figure 3D

E-step

For each variant update:

$Pr(germline \mid data) \sim Pr(data \mid germline) * Pr(germline)$
$Pr(other \mid data) \sim Pr(data \mid other) * Pr(other)$
$Pr(cancer \mid data) \sim Pr(data \mid cancer) * Pr(cancer)$

M-step

Update:

$Pr(germline), Pr(other), Pr(cancer)$
tumor fraction
other expected variant allele fraction

Figure 12

SYSTEMS AND METHODS FOR TUMOR FRACTION ESTIMATION FROM SMALL VARIANTS

CROSS-REFERENCE TO RELATED APPLICATIONS

This application claims priority to U.S. Provisional Patent Application No. 62/972,375, entitled "Systems and Methods for Tumor Fraction Estimation From Small Variants," filed Feb. 10, 2020, the contents of which are hereby incorporated by reference in its entirety for all purposes. This application also claims priority to U.S. Provisional Patent Application No. 62/834,904, entitled "Systems and Methods for Tumor Fraction Estimation," filed Apr. 16, 2019, the contents of which are hereby incorporated by reference in its entirety for all purposes.

TECHNICAL FIELD

This specification describes using a cell-free nucleic acid sample and a solid tissue sample from a subject to determine a tumor fraction in the subject.

BACKGROUND

The increasing knowledge of the molecular basis for cancer and the rapid development of next-generation sequencing techniques are advancing the study of early molecular alterations involved in cancer development in body fluids. Large-scale sequencing technologies, such as next-generation sequencing (NGS), have afforded the opportunity to achieve sequencing at costs that are less than one U.S. dollar per million bases, and costs of less than ten U.S. cents per million bases have been realized. Specific genetic and epigenetic alterations associated with such cancer development are found in plasma, serum, and urine cell-free DNA (cfDNA). Such alterations could potentially be used as diagnostic biomarkers for several classes of cancers (see, Salvi et al., 2016, Onco Targets Ther. 9:6549-6559).

Cell-free DNA (cfDNA) can be found in serum, plasma, urine, and other body fluids (Chan et al., 2003, Ann Clin Biochem 40(Pt 2):122-130) representing a "liquid biopsy," which is a circulating picture of a specific disease (see, De Mattos-Arruda and Caldas, 2016, Mol Oncol. 10(3):464-474). This represents a potential, non-invasive method of screening for a variety of cancers.

The existence of cfDNA was demonstrated by Mandel and Metais decades ago (Mandel and Metais, 1948, C R Seances Soc Biol Fil. 142(3-4):241-243). cfDNA originates from necrotic or apoptotic cells, and it is generally released by all types of cells. Stroun et al. further showed that specific cancer alterations could be found in the cfDNA of patients (see, Stroun et al., 1989, Oncology 1989 46(5):318-322). A number of subsequent articles confirmed that cfDNA contains specific tumor-related alterations, such as mutations, methylation, and copy number variations (CNVs), thus confirming the existence of circulating tumor DNA (ctDNA) (see Goessl et al., 2000, Cancer Res. 60(21):5941-5945 and Frenel et al., 2015, Clin Cancer Res. 21(20):4586-4596).

cfDNA in plasma or serum is well characterized, while urine cfDNA (ucfDNA) has been traditionally less characterized. However, recent studies demonstrated that ucfDNA could also be a promising source of biomarkers (e.g., Casadio et al., 2013, Urol Oncol. 31(8):1744-1750).

In blood, apoptosis is a frequent event that determines the amount of cfDNA. In cancer patients, however, the amount of cfDNA seems to be also influenced by necrosis (see, Hao et al., 2014, Br J Cancer 111(8):1482-1489 and Zonta et al., 2015 Adv Clin Chem. 70:197-246). Since apoptosis seems to be the main release mechanism circulating cfDNA has a size distribution that reveals an enrichment in short fragments of about 167 base pair, (see, Heitzer et al., 2015, Clin Chem. 61(1):112-123 and Lo et al., 2010, Sci Transl Med. 2(61):61ra91) corresponding to nucleosomes generated by apoptotic cells.

The amount of circulating cfDNA in serum and plasma seems to be significantly higher in patients with tumors than in healthy controls, especially in those with advanced-stage tumors than in early-stage tumors (see Sozzi et al., 2003, J Clin Oncol. 21(21):3902-3908, Kim et al., 2014, Ann Surg Treat Res. 86(3):136-142; and Shao et al., 2015, Oncol Lett. 10(6):3478-3482). The variability of the amount of circulating cfDNA is higher in cancer patients than in healthy individuals, (see, Heitzer et al., 2013, Int J Cancer. 133(2): 346-356) and the amount of circulating cfDNA is influenced by several physiological and pathological conditions, including proinflammatory diseases (see, Raptis and Menard, 1980, J Clin Invest. 66(6):1391-1399, and Shapiro et al., 1983, Cancer 51(11):2116-2120).

Methylation status and other epigenetic modifications are known to be correlated with the presence of some cancer (e.g., cancer of origins; see, Jones, 2002, Oncogene 21:5358-5360). Also, specific patterns of methylation have been determined to be associated with particular cancer conditions (see Paska and Hudler, 2015, Biochemia Medica 25(2):161-176). Warton and Samimi have demonstrated that methylation patterns can be observed even in cell-free DNA (See Warton and Samimi, 2015, Front Mol Biosci, 2(13) doi: 10.3389/fmolb.2015.00013).

cfDNA derived from patient plasma is attractive as a noninvasive method for genetic characterization of tumor burden, given its high concordance with matched metastatic biopsies. See Adalsteinsson et al., 2017, "Scalable whole-exome sequencing of cell-free DNA reveals high concordance with metastatic tumors" Nat. Commun. 8(1):1324 and Holvelson et al. 2017, "Rapid, ultra low coverage copy number profiling of cell-free DNA as a precision oncology screening strategy" Oncotarget. 8(52): 89848-89866. In addition, both the total quantity of cfDNA in the circulation and estimates of the tumor-derived contribution to cfDNA (tumor fraction; TFx) have been proposed as prognostic biomarkers (Fan, et al., 2017, "Prognostic value of circulating tumor DNA in patients with colon cancer: Systematic review," PLoS One 12(2):e0171991) and indicators of response and resistance to therapy (Goodall et al., "Circulating Cell-Free DNA to Guide Prostate Cancer Treatment with PARP Inhibition" Cancer Discov. 7(9):1006-1017).

Because of its promise, tumor fraction has been proposed as a biomarker of disease burden and therapeutic response, since—unlike circulating protein tumor markers—this metric is agnostic to cancer type. For instance, among the clinical applications of such a biomarker is the disambiguation of radiographic flare or pseudoprogression responses after starting new agents (particularly hormonal or immune therapies), or the early measurement of treatment response to allow earlier intensification or discontinuation of ineffective therapy prior to radiographic progression. See Choudhury et al, 2018 "Tumor fraction in cell-free DNA as a biomarker in prostate cancer," JCI Insight 3(31):e122109, which is hereby incorporated by reference.

As another example, tumor fraction greater than or equal to ten percent is associated with significantly worse survival for triple negative breast cancer. See, Stover et al, 2018, "Association of Cell-Free DNA Tumor Fraction and Somatic Copy Number Alterations With Survival in Metastatic Triple-Negative Breast Cancer," J. Clin. Oncol. 36(6): 543-553.

Given the promise of using tumor fraction to evaluate a response of a subject to an agent for cancer, determining whether to intensify or discontinue an agent for cancer in a subject, and evaluating a condition of the subject in response to the surgical intervention, among other applications, better technical solutions for estimating tumor fraction are needed in the art.

SUMMARY

Improved technical solutions (e.g., computing systems, methods, and non-transitory computer-readable storage media) for estimating tumor fraction in a subject are provided in the present disclosure.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments of the present disclosure are directed to determining a tumor fraction in a subject using matched cell-free DNA (cfDNA) and solid tumor tissue samples obtained from that subject. The cfDNA can be obtained using a whole-genome sequencing or another type of sequencing such as targeted sequencing. As known, tumors shed DNA into the bloodstream and detection of tumor fraction in the cfDNA can be estimated using the fraction of mutant reads in cfDNA contributed from the tumor to the cfDNA sample. This allows early and less invasive cancer detection. At the same time, using both liquid (e.g., blood) and solid tumor samples permits a reliable tumor fraction detection when a sequencing coverage is relatively low. Thus, the described techniques use data obtained from both types of samples obtained from the subject.

In embodiments of the present disclosure, the tumor fraction is determined for the subject using an estimated smoothed noise rate determined for each allele position (locus) such that the estimated smoothed noise rate accounts for sequencing errors, for a likelihood that a particular variant at the position is indeed indicative of a cancer, and for other factors. In some embodiments, Bayesian approaches can be employed to estimate a tumor fraction in a subject.

One particular embodiment of the present disclosure provides a method of estimating a tumor fraction f of a subject identified as having a cancer. In the method, at a computer system having one or more processors, and memory storing one or more programs for execution by the one or more processors, a first plurality of nucleic acid fragment sequences is obtained, in electronic form, from a liquid biological sample obtained from the subject. Each respective nucleic acid fragment sequence in the first plurality of nucleic acid fragment sequences represents all or a portion of a respective cell-free nucleic acid molecule in a population of cell-free nucleic acid molecules in the liquid biological sample. Further, in the method, a second plurality of nucleic acid fragment sequences is obtained, in electronic form, from a solid tumor sample obtained from the subject. Each respective nucleic acid fragment sequence in the second plurality of nucleic acid fragment sequences represents all or a portion of a respective nucleic acid fragment in a population of nucleic acid fragments in the tumor sample.

A plurality of estimated smoothed noise rates is obtained. Each respective estimated smoothed noise rate $ev_i$ in the plurality of estimated smoothed noise rates is determined using nucleic acid fragment sequences, in electronic form, obtained from each non-cancer sample in a cohort of non-cancer samples mapping to a corresponding allele position (locus) $v_i$ in a plurality of allele positions.

Further in the method, a variant allele count $s_{v_i,t}$ is determined for each respective allele position $v_i$ in the plurality of allele positions using the first plurality of nucleic acid fragment sequences, thereby calculating a plurality of variant allele counts for the subject.

Further in the method, a coverage $s_{v_i}$ is determined for each respective allele position $v_i$ in the plurality of allele positions using the first plurality of nucleic acid fragment sequences, thereby calculating a plurality of coverages for the subject.

Further in the method, a solid variant allele fraction $a_i$ is determined for each respective allele position $v_i$ in the plurality of allele positions using the second plurality of nucleic acid fragment sequences, thereby calculating a plurality of solid variant allele fractions. Then, $D_s$ is used, where $D_s$ comprises (i) the plurality of estimated smoothed noise rates, (ii) the plurality of variant allele counts, (iii) the plurality of coverages, and (iv) the plurality of solid variant allele fractions to calculate the tumor fraction f of the subject.

In some such embodiments, the respective estimated smoothed noise rate $ev_i$ for a respective allele position $v_i$ is calculated as:

$$ev_i = \frac{(n_{v_i,t} + b)}{(n_{v_i} + 2b)}$$

where $n_{v_i,t}$ is a variant allele count at position $v_i$ over the cohort of non-cancer samples, $n_{v_i}$ is coverage of nucleic acid fragment sequences at $v_i$ summed over the cohort of non-cancer samples, and b is a positive value representing a pseudo-count.

In some embodiments the tumor fraction f of the subject is calculated as a likelihood that a candidate tumor fraction $f_c$ is a true tumor fraction of the subject in the form of a posterior distribution of the candidate tumor fraction $f_c$ given $D_s$ by evaluating:

$$P(f_c|D_s) \propto P(D_s|f_c)P(f_c),$$

where $P(f_c)$ is a prior, $P(f_c|D_s)$ is a posterior distribution of the candidate tumor fraction $f_c$ given $D_s$, and $P(D_s|f_c)$ is a probability of observing $D_s$ given the candidate tumor fraction $f_c$.

In some such embodiments:

$$\log P(D_s | f_c) = \sum_{v_i} \log \text{Binomial}(s_{v_i,t}; s_{v_t}, f_c a_i + (1 - f_c)ev_i)$$

where $s_{v_i,t}$ is a variant allele count at allele position $v_i$, $s_{v_i}$ is a coverage at allele position $v_i$, and $a_i$ is a solid variant allele fraction at allele position $v_i$.

In some such embodiments $\log P(D_s|f_c) = \Sigma_{v_i} \log \text{Binomial}(x_{v_i}; n_{v_i}, p_{v_i}) =$ $$\sum_{v_i} \log\left(\frac{n_{v_i}!}{x_{v_i}!(n_{v_i}-x_{v_i})!} p_{v_i}^{x_{v_i}}(1-p_{v_i})^{n_{v_i}-x_{v_i}}\right)$$

where $$\sum_{v_i} \log\left(\frac{n_{v_i}!}{x_{v_i}!(n_{v_i}-x_{v_i})!} p_{v_i}^{x_{v_i}}(1-p_{v_i})^{n_{v_i}-x_{v_i}}\right)$$

is normalized, $x_{v_i}=s_{v_i,t}$, $n_{v_i}=s_{v_i}$, $p_{v_i}=f_c a_i+(1-ev_i)$, and $a_i=$the solid variant allele fraction at allele position $v_i$.

In some embodiments $$\log P(D_s \mid f_c) = \sum_{v_i}$$
$$\log(Q*\text{Binomial}(s_{v_i,t}; s_{v_i}, f_c a_i + (1-f_c)ev_i) + P*\text{Binomial}(s_{v_i,t}; s_{v_i}, t)),$$

where, $s_{v_i,t}$ is a variant allele count at allele position $v_i$, $s_{v_i}$ is a coverage for $s_{v_i,t}$ at allele position $v_i$, $a_i$ is a solid variant allele fraction at allele position $v_i$, Q and P are each positive and sum to one, and T is between 0.45 and 0.55. In some such embodiments, T is 0.50. In some such embodiments, Q=0.5 and P=0.5. In some embodiments, the values of Q, P and T are optimized using a training population of subjects with known tumor fractions.

In some embodiments, $$\log P(D_s \mid f_c) = \sum_{v_i}$$
$$\log(Q*\text{Binomial}(s_{v_i,t}; s_{v_i}, f_c a_i + (1-f_c)ev_i) + P*\text{Binomial}(S_{v_i,t}; s_{v_i}, V)),$$

where, $s_{v_i,t}$ is a variant allele count at allele position $v_i$, $s_{v_i}$ is a coverage for $s_{v_i,t}$ at allele position $v_i$, $a_i$ is a solid variant allele fraction at allele position $v_i$, Q and P are each positive and sum to one, and V is between 0.15 and 0.25. In some embodiments, V is 0.20. In some embodiments, Q=0.5 and P=0.5. In some embodiments, the values of Q, P and V are optimized using a training population of subjects with known tumor fractions.

In some embodiments, $$\log P(D_s \mid f_c) = \sum_{v_i} \log$$
$$(Q*\text{Binomial}(s_{v_i,t}; s_{v_i}, f_c a_i + (1-f_c)ev_i) + P*\text{Binomial}(s_{v_i,t}; s_{v_i}, Z)),$$

where, $s_{v_i,t}$ is a variant allele count at allele position $v_i$, $s_{v_i}$ is a coverage for $s_{v_i,t}$ at allele position $v_i$, $a_i$ is a solid variant allele fraction at allele position $v_i$, Q and P are each positive and sum to one, and Z is between 0.00 and 0.05. In some embodiments Q=0.5 and P=0.5. In some embodiments the values of Q, P and V are optimized using a training population of subjects with known tumor fractions.

In some embodiments, $$\log P(D_s \mid f_c) = \sum_{v_i}$$
$$\log(Q*\text{Binomial}(s_{v_i,t}; s_{v_i}, f_c a_i + (1-f_c)ev_i) + P_1*\text{Binomial}(s_{v_i,t}, s_{v_i}, T) +$$
$$P_2*\text{Binomial}(s_{v_i,t}; s_{v_i}, V) + P_3*\text{Binomial}(s_{v_i,t}, s_{v_i}, Z)),$$

where $s_{v_i,t}$ is a variant allele count at allele position $v_i$, $s_{v_i}$ is a coverage for $s_{v_i,t}$ at allele position $v_i$, $a_i$ is a solid variant allele fraction at allele position $v_i$. Further Q, $P_1$, $P_2$, and $P_3$ are each positive and collectively sum to one (a whole), T is between 0.45 and 0.55, V is between 0.15 and 0.25, and Z is between 0.00 and 0.05. In some embodiments, T is 0.5, V is 0.20, and Z is 0. In some embodiments, Q=0.5 and $P_1$, $P_2$ and $P_3$ sum to 0.5. In some embodiments, $P_1$ is 0.5*⅓, $P_2$ is 0.5*⅓ and $P_3$ is 0.5*⅓. In some embodiments, the values of Q, $P_1$, $P_2$, $P_3$, T, V, and Z are optimized using a training population of subjects with known tumor fractions.

In some embodiments, the tumor fraction f of the subject is determined by computing $D_s$, for each respective candidate tumor fraction $f_c$ in a plurality of candidate tumor fractions and selecting the tumor fraction $f_c$ in the plurality of candidate tumor fractions as the tumor fraction f of the subject that has the highest $P(f_c|D_s)$. In some such embodiments, the plurality of candidate tumor fractions comprises between five and one thousand different candidate tumor fractions.

In some embodiments, the prior is a non-informative prior. For instance, in some embodiments, the non-informative prior is Jeffrey's prior expressed as $f_c^{-1/2}(1-f_c)^{-1/2}$.

In some embodiments, the tumor fraction of the subject is deemed to be the median value of $P(f_c|D_s)$.

In some embodiments, the method further comprises calculating a threshold credible interval for the tumor fraction f of the subject.

In some embodiments, the method further comprises using at least the tumor fraction f of the subject to determine a cancer condition of the subject.

In some embodiments the calculation of a plurality of variant allele counts for a subject comprises determining a number of nucleic acid fragment sequences in the above-described first plurality of nucleic acid fragment sequences having a respective variant at each respective allele position in the plurality of allele positions. In some such embodiments, this comprises aligning a nucleic acid fragment sequence in the first plurality of nucleic acid fragment sequences to a region in a reference genome in order to determine whether the nucleic acid fragment sequence includes the respective variant.

In some embodiments, the determining the solid variant allele fraction $a_i$ for each respective allele position $v_i$ in the plurality of allele positions using the second plurality of nucleic acid fragment sequences comprises determining a ratio of a number of nucleic acid fragment sequences in the second plurality of nucleic acid fragment sequences having a respective variant at each respective allele position in the plurality of allele positions to a total number of nucleic acid fragment sequences in the second plurality of nucleic acid fragment sequences that map to the respective allele position. In some such embodiments, this comprises aligning a nucleic acid fragment sequence in the second plurality of nucleic acid fragment sequences to a region in a reference genome in order to determine whether the nucleic acid fragment sequence includes the respective variant.

In some embodiments, the subject is human.

In some embodiments, the liquid biological sample comprises blood, whole blood, plasma, serum, urine, cerebrospinal fluid, fecal, saliva, sweat, tears, pleural fluid, pericardial fluid, or peritoneal fluid of the subject.

In some embodiments, the solid tumor sample comprises a sample from tumor comprising a breast cancer, a lung cancer, a prostate cancer, a colorectal cancer, a renal cancer, a uterine cancer, a pancreatic cancer, a cancer of the esophagus, a lymphoma, a head/neck cancer, an ovarian cancer, a hepatobiliary cancer, a melanoma, a cervical cancer, a multiple myeloma, a leukemia, a thyroid cancer, a bladder cancer, a biliary tract cancer, or a gastric cancer.

In some embodiments, the cancer is a breast cancer, a lung cancer, a prostate cancer, a colorectal cancer, a renal cancer, a uterine cancer, a pancreatic cancer, a cancer of the esophagus, a lymphoma, a head/neck cancer, an ovarian cancer, a hepatobiliary cancer, a melanoma, a cervical cancer, a multiple myeloma, a leukemia, a thyroid cancer, a bladder cancer, a biliary tract cancer, or a gastric cancer.

In some embodiments, the plurality of allele positions that are sampled for the subject (e.g., from a solid biopsy taken from the subject) are those associated with a particular type of cancer.

In some embodiments, the plurality of allele positions that are sampled for the subject (e.g., from a solid biopsy taken from the subject) are selected for (collectively represent the alleles associated with) a plurality of cancers.

In some embodiments, the plurality of allele positions that are sampled for the subject (e.g., from a solid biopsy taken from the subject) are selected independent of a type of cancer.

In some embodiments, each respective allele position in the plurality of allele positions that are sampled for the subject (e.g., from a solid biopsy taken from the subject) arises from a single nucleotide variation (SNV), and the plurality of alleles positions consists of between 100 allele positions and 10,000,000 allele positions.

In some embodiments, each respective allele position in the plurality of allele positions that are sampled for the subject (e.g., from a solid biopsy taken from the subject) arises from a SNV, and the plurality of allele positions consists of between 2 allele positions and 200 allele positions.

In some embodiments, an allele position in the plurality of allele positions arises from an aberrant methylation pattern at the allele position. For instance, at the allele position (locus), there may be a typical methylation pattern (reference methylation pattern) in some subjects, and an alternate methylation pattern (alternate methylation pattern) in other subjects.

In some embodiments, the plurality of variant allele counts for the subject comprises variant allele counts for at least one variant at each allele position in the plurality of allele positions.

In some embodiments, the plurality of variant allele counts for the subject comprises variant allele counts for at least two variants at each allele position in the plurality of allele positions.

In some embodiments, at least one of the first plurality of nucleic acid fragment sequences and the second plurality of nucleic acid fragment sequences is obtained using whole-genome sequencing.

In some embodiments, at least one of the first plurality of nucleic acid fragment sequences and the second plurality of nucleic acid fragment sequences is obtained using whole-genome bisulfite sequencing.

In some embodiments, an average coverage rate for at least one of the first plurality of nucleic acid fragment sequences and the second plurality of nucleic acid fragment sequences is less than 100×, less than 500×, or less than 5000×.

In some embodiments, the cohort of non-cancer samples comprises samples from at least 10 subjects or at least 100 subjects.

In some embodiments, the tumor fraction f of the subject comprises a tumor fraction in the blood of the subject that is indicative of the cancer.

In some embodiments, the posterior distribution is calculated using a Bayesian inference for a binomial distribution.

In some embodiments, the calculating the tumor fraction f of the subject comprises calculating a respective estimated circulating tumor DNA (ctDNA) fraction in cell-free DNA (cfDNA) of the subject.

In some embodiments, the method further comprises evaluating a stage of the cancer in the subject based on the calculated tumor fraction f of the subject.

In some embodiments, the method further comprises evaluating a level of aggressiveness of the cancer in the subject based on the calculated tumor fraction f of the subject.

In some embodiments, the method further comprises evaluating a performance of a classifier based on the calculated tumor fraction f of the subject.

In some embodiments, the present disclosure further provides for applying a treatment regimen to the subject based at least in part, on a value of the tumor fraction f of the subject that is calculated using any of the disclosed methods. In some embodiments, the treatment regimen comprises applying an agent for cancer to the subject. Non-limiting examples of agents for cancer include, but are not limited to, hormones, immune therapies, radiography, and cancer drugs. Examples of cancer drugs include, but are not limited to, Lenalidomid, Pembrolizumab, Trastuzumab, Bevacizumab, Rituximab, Ibrutinib, Human Papillomavirus Quadrivalent (Types 6, 11, 16, and 18) Vaccine, Pertuzumab, Pemetrexed, Nilotinib, Nilotinib, Denosumab, Abiraterone acetate, Promacta, Imatinib, Everolimus, Palbociclib, Erlotinib, Bortezomib, and Bortezomib.

In some embodiments, the subject has been treated with an agent for cancer and the method further comprises using the tumor fraction f of the subject to evaluate a response of the subject to the agent for cancer.

In some embodiments, the subject has been treated with an agent for cancer and the method further comprises using the tumor fraction f of the subject to determine whether to intensify (e.g., increase radiation, increase drug dosage, etc.) or discontinue the agent for cancer in the subject.

In some embodiments, the subject has been subjected to a surgical intervention to address the cancer and the method further comprises using the tumor fraction f of the subject to evaluate a condition of the subject in response to the surgical intervention.

Another aspect of the present disclosure provides a computer system comprising one or more processors, memory storing one or more programs to be executed by the one or more processors, where the one or more programs comprise computer-executable instructions that, when executed by the one or more processors, perform a method for estimating a tumor fraction f of a subject identified as having a cancer. In the method, a first plurality of nucleic acid fragment sequences is obtained, in electronic form, from a liquid biological sample obtained from the subject. Each respective nucleic acid fragment sequence in the first plurality of nucleic acid fragment sequences represents all or a portion of a respective cell-free nucleic acid molecule in a population of cell-free nucleic acid molecules in the liquid biological sample. In the method, a second plurality of nucleic acid fragment sequences is obtained, in electronic form, from a solid tumor sample obtained from the subject, where each respective nucleic acid fragment sequence in the second plurality of nucleic acid fragment sequences represents all or a portion of a respective nucleic acid molecule in a population of nucleic acid molecules in the tumor sample. In the method a plurality of estimated smoothed noise rates is obtained, where each respective estimated smoothed noise rate $ev_i$ in the plurality of estimated smoothed noise rates is determined using nucleic acid fragment sequences, in electronic form, obtained from each non-cancer sample in a cohort of non-cancer samples mapping to a corresponding allele position $v_i$ in a plurality of allele positions. In the method, a variant allele count $s_{v_i,t}$ is determined for each respective allele position $v_i$ in the plurality of allele positions using the first plurality of nucleic acid fragment sequences, thereby calculating a plurality of variant allele counts for the subject. In the method a coverage $s_{v_i}$ is determined for each respective allele position $v_i$ in the plurality of allele positions using the first plurality of nucleic acid fragment sequences, thereby calculating a plurality of coverages for the subject. In the method, a solid variant allele fraction $a_i$ is determined for each respective allele position $v_i$ in the plurality of allele positions using the second plurality of nucleic acid fragment sequences, thereby calculating a plurality of solid variant allele fractions. Then, the tumor fraction f of the subject is determined using $D_s$, where $D_s$ comprises (i) the plurality of estimated smoothed noise rates, (ii) the plurality of variant allele counts, (iii) the plurality of coverages, and (iv) the plurality of solid variant allele fractions. In some embodiments, the respective estimated smoothed noise rate $ev_i$ for a respective allele position $v_i$ is calculated as:

$$ev_i = \frac{(n_{v_i,t} + b)}{(n_{v_i} + 2b)}$$

where $n_{v_i,t}$ is a variant allele count at position $v_i$ over the cohort of non-cancer samples, $n_{v_i}$ is coverage of nucleic acid fragment sequences at $v_i$ summed over the cohort of non-cancer samples, and b is a positive value representing a pseudo-count. In some embodiments the tumor fraction f of the subject is determined by calculating a likelihood that a candidate tumor fraction $f_c$ is a true tumor fraction of the subject in the form of a posterior distribution of the candidate tumor fraction $f_c$ given $D_s$ by evaluating:

$$P(f_c|D_s) \propto P(D_s|f_c)P(f_c),$$

where $P(f_c)$ is a prior, $P(f_c|D_s)$ is a posterior distribution of the tumor fraction $f_c$ given $D_s$, and $P(D_s|f_c)$ is a probability of observing $D_s$ given the tumor fraction $f_c$.

In some embodiments the tumor fraction f of the subject is determined by calculating:

$$\log P(D_s \mid f_c) = \sum_{v_i} \log \text{Binomial}(s_{v_i,t}; s_{v_i}, f_c a_i + (1 - f_c)ev_i)$$

where $s_{v_i,t}$ is a variant allele count at allele position $v_i$, $s_{v_i}$ is a coverage for $s_{v_i,t}$ at allele position $v_i$, and $a_i$ is a solid variant allele fraction at allele position $v_i$.

In some embodiments the tumor fraction f of the subject is determined by calculating $$\log P(D_s \mid f_c) = \sum_{v_i} \log \text{Binomial}(x_{v_i}; n_{v_i}, p_{v_i}) =$$

$$\sum_{v_i} \log\left(\frac{n_{v_i}!}{x_{v_i}!(n_{v_i} - x_{v_i})!} p_{v_i}^{x_{v_i}} (1 - p_{v_i})^{n_{v_i} - x_{v_i}}\right)$$

where $$\sum_{v_i} \log\left(\frac{n_{v_i}!}{x_{v_i}!(n_{v_i} - x_{v_i})!} p_{v_i}^{x_{v_i}} (1 - p_{v_i})^{n_{v_i} - x_{v_i}}\right)$$

is normalized, $x_{v_i} = s_{v_i,t}$, $n_{v_i} = s_{v_i}$, $p_{v_i} = f_c a_i + (1 - f_c)ev_i$, and $a_i$=the solid variant allele fraction at allele position $v_i$.

Another aspect of the present disclosure provides a non-transitory computer-readable storage medium storing one or more programs configured for execution by a computer processor. The one or more programs comprising computer-executable instructions for execution by the computer processor to perform a method of estimating a tumor fraction f of a subject identified as having a cancer. The method comprises obtaining a first plurality of nucleic acid fragment sequences, in electronic form, from a liquid biological sample obtained from the subject, where each respective nucleic acid fragment sequence in the first plurality of nucleic acid fragment sequences represents all or a portion of a respective cell-free nucleic acid molecule in a population of cell-free nucleic acid molecules in the liquid biological sample. The method further comprises obtaining a second plurality of nucleic acid fragment sequences, in electronic form, from a solid tumor sample obtained from the subject, where each respective nucleic acid fragment sequence in the second plurality of nucleic acid fragment sequences represents all or a portion of a respective nucleic acid molecule in a population of nucleic acid molecules in the tumor sample. The method further comprises obtaining a plurality of estimated smoothed noise rates, where each respective estimated smoothed noise rate $ev_i$ in the plurality of estimated smoothed noise rates is determined using nucleic acid fragment sequences, in electronic form, obtained from each non-cancer sample in a cohort of non-cancer samples mapping to a corresponding allele position $v_i$ in a plurality of allele positions. The method further comprises determining a variant allele count $s_{v_i,t}$ for each respective allele position $v_i$ in the plurality of allele positions using the first plurality of nucleic acid fragment sequences, thereby calculating a plurality of variant allele counts for the subject. The method further comprises determining a coverage $s_{v_i}$ for each respective allele position $v_i$ in the plurality of allele positions using the first plurality of nucleic acid fragment sequences, thereby calculating a plurality of coverages for the subject. The method further comprises determining a solid variant allele fraction $a_i$ for each respective allele position $v_i$ in the plurality of allele positions using the second plurality of nucleic acid fragment sequences, thereby calculating a plurality of solid variant allele fractions. Then the tumor fraction f of the subject is calculated $D_s$, where $D_s$ comprises (i) the plurality of estimated smoothed noise rates, (ii) the plurality of variant allele counts, (iii) the plurality of coverages, and (iv) the plurality of solid variant allele fractions to calculate the tumor fraction f of the subject.

Another aspect of the present disclosure provides a method for evaluating a performance of a cancer classifier, the method comprising, using at least one processor, the cancer classifier using a first plurality of nucleic acid fragment sequences, a second plurality of nucleic acid fragment sequences, and a plurality of estimated smoothed noise rates. In the method, the first plurality of nucleic acid fragment sequences is obtained, in electronic form, from a liquid biological sample obtained from the subject, where each respective nucleic acid fragment sequence in the first plurality of nucleic acid fragment sequences represents all or a portion of a respective cell-free nucleic acid molecule in a population of cell-free nucleic acid molecules in the liquid biological sample. Further, the second plurality of nucleic acid fragment sequences is obtained, in electronic form, from a solid tumor sample obtained from the subject, where each respective nucleic acid fragment sequence in the second plurality of nucleic acid fragment sequences represents all or a portion of a respective nucleic acid molecule in a population of nucleic acid molecules in the tumor sample. Further, a plurality of estimated smoothed noise rates, is obtained. Each respective estimated smoothed noise rate $ev_i$ in the plurality of estimated smoothed noise rates is determined using nucleic acid fragment sequences, in electronic form, obtained from each non-cancer sample in a cohort of non-cancer samples mapping to a corresponding allele position $v_i$ in a plurality of allele positions. A variant allele count $s_{v_i,t}$ is determined for each respective allele position $v_i$ in the plurality of allele positions using the first plurality of nucleic acid fragment sequences, thereby calculating a plurality of variant allele counts for the subject. A coverage $s_{v_i}$ is determined for each respective allele position $v_i$ in the plurality of allele positions using the first plurality of nucleic acid fragment sequences, thereby calculating a plurality of coverages for the subject. A solid variant allele fraction $a_i$ is determined for each respective allele position $v_i$ in the plurality of allele positions using the second plurality of nucleic acid fragment sequences, thereby calculating a plurality of solid variant allele fractions. The tumor fraction f of the subject is then calculated using $D_s$, where $D_s$ comprises (i) the plurality of estimated smoothed noise rates, (ii) the plurality of variant allele counts, (iii) the plurality of coverages, and (iv) the plurality of solid variant allele fractions. Next, the likelihood that the calculated tumor fraction $f_c$ is a true tumor fraction, given $D_{sj}$, is calculated thereby evaluating a performance of the cancer classifier.

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the several views of the drawings.

FIGS. 3A, 3B, 3C, 3D, 3E and 3F are flowcharts illustrating an example of a method of estimating a tumor fraction f of a subject identified as having cancer, in which optional steps are indicated by dashed borders, in accordance with some embodiments of the present disclosure.

FIG. 12 illustrates the E-step and the M-step of an expectation-maximization protocol used to refine $P(D_s|f_c)$ in accordance with some embodiments of the present disclosure.

DETAILED DESCRIPTION

Figure 1:
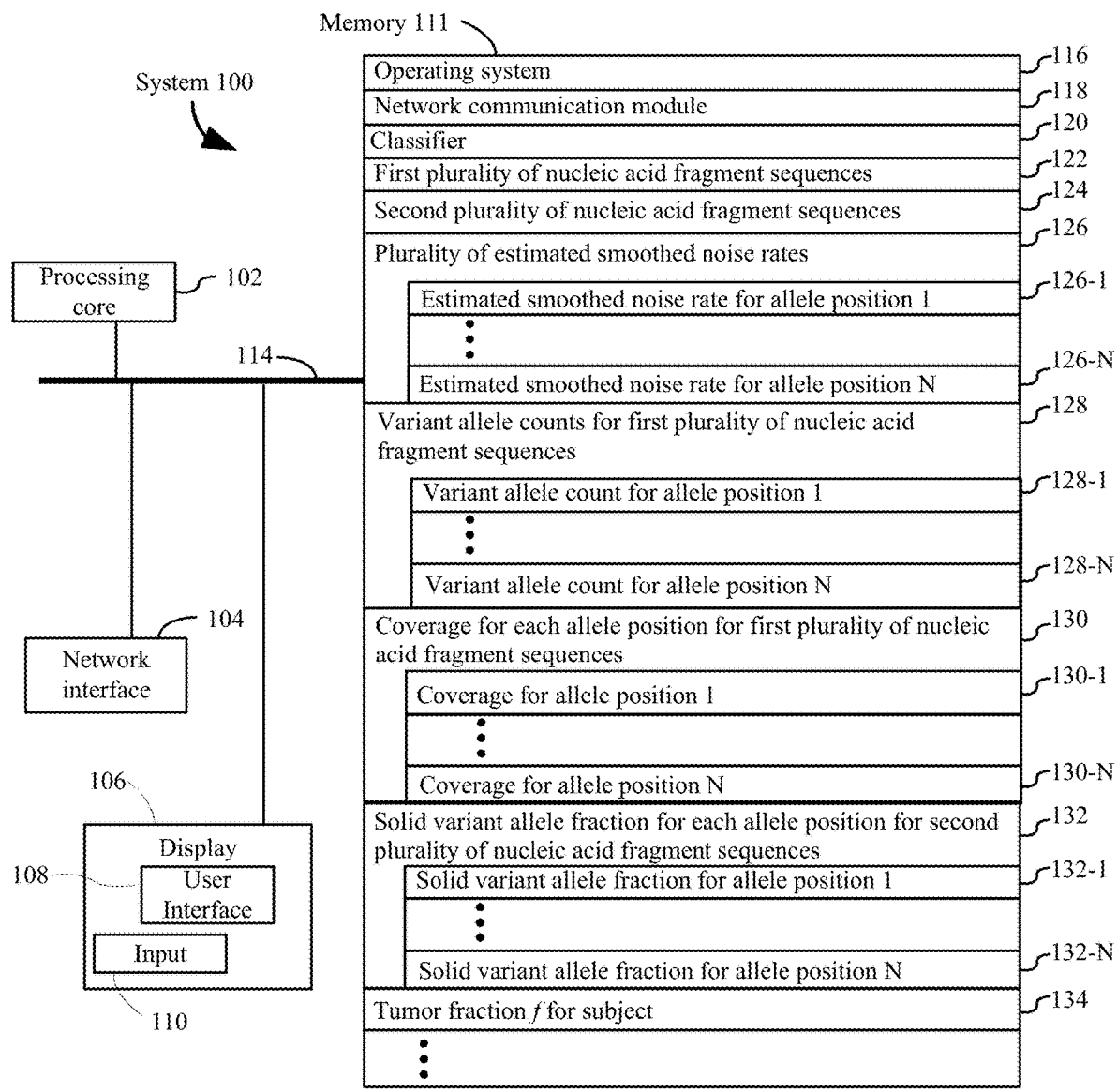
FIG. 1 is a block diagram illustrating an example of a computer system in which some embodiments of the present disclosure are implemented.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

The implementations described herein provide various technical solutions for estimating a tumor fraction of a subject identified as having a cancer, using aberrant tissue samples obtained from the subject. A first plurality of nucleic acid fragment sequences is obtained from a liquid biological sample obtained from a subject, and a second plurality of nucleic acid fragment sequences are obtained from a solid biological sample (e.g., cancer tissue sample) obtained from the subject. The first plurality of nucleic acid fragment sequences are of cell-free nucleic acid.

The matched first and second plurality of nucleic acid fragment sequences are used to estimate a tumor fraction in a subject, for example, a tumor fraction in the subject's blood. In this way, a tumor fraction can be estimated in scenarios even where a sequencing coverage (depth) would otherwise be insufficient to reliably estimate a tumor fraction.

Definitions

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject. Furthermore, the terms "subject," "user," and "patient" are used interchangeably herein.

The terminology used in the present disclosure is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

As used herein, the term "about" or "approximately" can mean within an acceptable error range for the particular value as determined by one of ordinary skill in the art, which can depend in part on how the value is measured or determined, e.g., the limitations of the measurement system. For example, "about" can mean within 1 or more than 1 standard deviation, per the practice in the art. "About" can mean a range of ±20%, ±10%, ±5%, or ±1% of a given value. The term "about" or "approximately" can mean within an order of magnitude, within 5-fold, or within 2-fold, of a value. Where particular values are described in the application and claims, unless otherwise stated the term "about" meaning within an acceptable error range for the particular value should be assumed. The term "about" can have the meaning as commonly understood by one of ordinary skill in the art. The term "about" can refer to ±10%. The term "about" can refer to ±5%.

As used herein, the term "assay" refers to a technique for determining a property of a substance, e.g., a nucleic acid, a protein, a cell, a tissue, or an organ. An assay (e.g., a first assay or a second assay) can comprise a technique for determining the copy number variation of nucleic acids in a sample, the methylation status of nucleic acids in a sample, the fragment size distribution of nucleic acids in a sample, the mutational status of nucleic acids in a sample, or the fragmentation pattern of nucleic acids in a sample. Any assay known to a person having ordinary skill in the art can be used to detect any of the properties of nucleic acids mentioned herein. Properties of a nucleic acid can include a sequence, genomic identity, copy number, methylation state at one or more nucleotide positions, size of the nucleic acid, presence or absence of a mutation in the nucleic acid at one or more nucleotide positions, and pattern of fragmentation of a nucleic acid (e.g., the nucleotide position(s) at which a nucleic acid fragments). An assay or method can have a particular sensitivity and/or specificity, and their relative usefulness as a diagnostic tool can be measured using ROC-AUC statistics.

As disclosed herein, the term "biological sample," "patient sample," or "sample" refers to any sample taken from a subject, which can reflect a biological state associated with the subject, and that includes DNA. Examples of biological samples include, but are not limited to, blood, whole blood, plasma, serum, urine, cerebrospinal fluid, fecal, saliva, sweat, tears, pleural fluid, pericardial fluid, or peritoneal fluid of the subject. In some embodiments, the biological sample consists of blood, whole blood, plasma, serum, urine, cerebrospinal fluid, fecal, saliva, sweat, tears, pleural fluid, pericardial fluid, or peritoneal fluid of the subject. In such embodiments, the biological sample is limited to blood, whole blood, plasma, serum, urine, cerebrospinal fluid, fecal, saliva, sweat, tears, pleural fluid, pericardial fluid, or peritoneal fluid of the subject and does not contain other components (e.g., solid tissues, etc.) of the subject. A biological sample can include any tissue or material derived from a living or dead subject. A biological sample can be a cell-free sample. A biological sample can comprise a nucleic acid (e.g., DNA or RNA) or a fragment thereof. The term "nucleic acid" can refer to deoxyribonucleic acid (DNA), ribonucleic acid (RNA) or any hybrid or fragment thereof. A sample can be a liquid sample or a solid sample (e.g., a cell or tissue sample). A biological sample can be a bodily fluid, such as blood, plasma, serum, urine, vaginal fluid, fluid from a hydrocele (e.g., of the testis), vaginal flushing fluids, pleural fluid, ascitic fluid, cerebrospinal fluid, saliva, sweat, tears, sputum, bronchoalveolar lavage fluid, discharge fluid from the nipple, aspiration fluid from different parts of the body (e.g., thyroid, breast), etc. A biological sample can be a stool sample. In various embodiments, the majority of DNA in a biological sample that has been enriched for cell-free DNA (e.g., a plasma sample obtained via a centrifugation protocol) can be cell-free (e.g., greater than 50%, 60%, 70%, 80%, 90%, 95%, or 99% of the DNA can be cell-free). A biological sample can be treated to physically disrupt tissue or cell structure (e.g., centrifugation and/or cell lysis), thus releasing intracellular components into a solution which can further contain enzymes, buffers, salts, detergents, and the like which can be used to prepare the sample for analysis. A biological sample can be obtained from a subject invasively (e.g., surgical means) or non-invasively (e.g., a blood draw, a swab, or collection of a discharged sample).

As used herein, the term "nucleic acid fragment sequence" refers to all or a portion of a polynucleotide sequence of at least three consecutive nucleotides. In the context of sequencing nucleic acid fragments found in a biological sample, the term "nucleic acid fragment sequence" refers to the sequence of a nucleic acid molecule (e.g., a DNA fragment) that is found in the biological sample or a representation thereof (e.g., an electronic representation of the sequence). Sequencing data (e.g., raw or corrected sequence reads from whole-genome sequencing, targeted sequencing, etc.) from a unique nucleic acid fragment (e.g., a cell-free nucleic acid) are used to determine a nucleic acid fragment sequence. Such sequence reads, which in fact may be obtained from sequencing of PCR duplicates of the original nucleic acid fragment, therefore "represent" or "support" the nucleic acid fragment sequence. There may be a plurality of sequence reads that each represents or supports a particular nucleic acid fragment in a biological sample (e.g., PCR duplicates), however, there will only be one nucleic acid fragment sequence for the particular nucleic acid fragment. In some embodiments, duplicate sequence reads generated for the original nucleic acid fragment are combined or removed (e.g., collapsed into a single sequence, e.g., the nucleic acid fragment sequence). Accordingly, when determining metrics relating to a population of nucleic acid fragments, in a sample, that each encompass a particular locus (e.g., an abundance value for the locus or a metric based on a characteristic of the distribution of the fragment lengths), the nucleic acid fragment sequences for the population of nucleic acid fragments, rather than the supporting sequence reads (e.g., which may be generated from PCR duplicates of the nucleic acid fragments in the population, should be used to determine the metric. This is because, in such embodiments, only one copy of the sequence is used to represent the original (e.g., unique) nucleic acid fragment (e.g., unique nucleic acid molecule). It is noted that the nucleic acid fragment sequences for a population of nucleic acid fragments may include several identical sequences, each of which represents a different original nucleic acid fragment, rather than duplicates of the same original nucleic acid fragment. In some embodiments, a cell-free nucleic acid is considered a nucleic acid fragment.

As used herein, the phrase "healthy" refers to a subject possessing good health. A healthy subject can demonstrate an absence of any malignant or non-malignant disease. A "healthy individual" can have other diseases or conditions, unrelated to the condition being assayed, which can normally not be considered "healthy."

As used herein the term "cancer" or "tumor" refers to an abnormal mass of tissue in which the growth of the mass surpasses and is not coordinated with the growth of normal tissue. A cancer or tumor can be defined as "benign" or "malignant" depending on the following characteristics: degree of cellular differentiation including morphology and functionality, rate of growth, local invasion and metastasis.

A "benign" tumor can be well-differentiated, have characteristically slower growth than a malignant tumor and remain localized to the site of origin. In addition, in some cases a benign tumor does not have the capacity to infiltrate, invade or metastasize to distant sites. A "malignant" tumor can be a poorly differentiated (anaplasia), have characteristically rapid growth accompanied by progressive infiltration, invasion, and destruction of the surrounding tissue. Furthermore, a malignant tumor can have the capacity to metastasize to distant sites.

As used herein, the Circulating Cell-free Genome Atlas or "CCGA" is defined as an observational clinical study that prospectively collects blood and tissue from newly diagnosed cancer patients as well as blood only from subjects who do not have a cancer diagnosis. The purpose of the study is to develop a pan-cancer classifier that distinguishes cancer from non-cancer and identifies tissue of origin. Example 3 provides further details of the CCGA-1 and CCGA-2 datasets.

As used herein the term "classification" can refer to any number(s) or other characters(s) that are associated with a particular property of a sample. For example, a "+" symbol (or the word "positive") can signify that a sample is classified as having deletions or amplifications. In another example, the term "classification" can refer to an amount of tumor tissue in the subject and/or sample, a size of the tumor in the subject and/or sample, a stage of the tumor in the subject, a tumor load in the subject and/or sample, and presence of tumor metastasis in the subject. The classification can be binary (e.g., positive or negative) or have more levels of classification (e.g., a scale from 1 to 10 or 0 to 1). The terms "cutoff" and "threshold" can refer to predetermined numbers used in an operation. For example, a cutoff size can refer to a size above which fragments are excluded. A threshold value can be a value above or below which a particular classification applies. Either of these terms can be used in either of these contexts.

As used herein, the term "level of cancer" refers to whether cancer exists (e.g., presence or absence), a stage of a cancer, a size of tumor, presence or absence of metastasis, an estimated tumor fraction concentration, a total tumor mutational burden value, the total tumor burden of the body, and/or other measure of a severity of a cancer (e.g., recurrence of cancer). The level of cancer can be a number or other indicia, such as symbols, alphabet letters, and colors. The level can be zero. The level of cancer can also include premalignant or precancerous conditions (states) associated with mutations or a number of mutations. The level of cancer can be used in various ways. For example, screening can check if cancer is present in someone who is not known previously to have cancer. Assessment can investigate someone who has been diagnosed with cancer to monitor the progress of cancer over time, study the effectiveness of therapies or to determine the prognosis. In one embodiment, the prognosis can be expressed as the chance of a subject dying of cancer, or the chance of the cancer progressing after a specific duration of time, or the chance of cancer metastasizing. Detection can comprise 'screening' or can comprise checking if someone, with suggestive features of cancer (e.g., symptoms or other positive tests), has cancer. A "level of pathology" can refer to level of pathology associated with a pathogen, where the level can be as described above for cancer. When the cancer is associated with a pathogen, a level of cancer can be a type of a level of pathology.

As used herein, the terms "control," "control sample," "reference," "reference sample," "normal," and "normal sample" describe a sample from a subject that does not have a particular condition, or is otherwise healthy. In an example, a method as disclosed herein can be performed on a subject having a tumor, where the reference sample is a sample taken from a healthy tissue of the subject. A reference sample can be obtained from the subject, or from a database. The reference can be, e.g., a reference genome that is used to map nucleic acid fragment sequences obtained from sequencing a sample from the subject. A reference genome can refer to a haploid or diploid genome to which nucleic acid fragment sequences from the biological sample and a constitutional sample can be aligned and compared. An example of a constitutional sample can be DNA of white blood cells obtained from the subject. For a haploid genome, there can be only one nucleotide at each locus. For a diploid genome, heterozygous loci can be identified; each heterozygous locus can have two alleles, where either allele can allow a match for alignment to the locus.

As disclosed herein, the terms "cell-free nucleic acid," "cell-free DNA," "circulating nucleic acids," and "cfDNA" interchangeably refer to nucleic acid molecules that can be found outside cells, in bodily fluids such as blood, whole blood, plasma, serum, urine, cerebrospinal fluid, fecal, saliva, sweat, sweat, tears, pleural fluid, pericardial fluid, or peritoneal fluid of a subject. Cell-free nucleic acids originate from one or more healthy cells and/or from one or more cancer cells. The term "cell-free nucleic acids" and "circulating nucleic acids" is used interchangeably herein. Examples of cell-free nucleic acids include, but are not limited to RNA, mitochondrial DNA, or genomic DNA. As used herein, the terms "cell-free nucleic acid," "cell-free DNA," and "cfDNA" are used interchangeably. As used herein, the term "circulating tumor DNA" or "ctDNA" refers to nucleic acid fragments that originate from tumor cells or other types of cancer cells, which may be released into a fluid from an individual's body (e.g., bloodstream) as result of biological processes such as apoptosis or necrosis of dying cells or actively released by viable tumor cells.

As disclosed herein, the term "circulating tumor DNA" or "ctDNA" refers to nucleic acid fragments that originate from aberrant tissue, such as the cells of a tumor or other types of cancer, which may be released into a subject's bloodstream as result of biological processes such as apoptosis or necrosis of dying cells or actively released by viable tumor cells.

As disclosed herein, the term "cell-free nucleic acids" refers to nucleic acid molecules that can be found outside cells, in bodily fluids such as blood, whole blood, plasma, serum, urine, cerebrospinal fluid, fecal, saliva, sweat, sweat, tears, pleural fluid, pericardial fluid, or peritoneal fluid of a subject. Cell-free nucleic acids are used interchangeably as circulating nucleic acids. Examples of the cell-free nucleic acids include but are not limited to RNA, mitochondrial DNA, or genomic DNA.

As used herein, the term "methylation" refers to a modification of deoxyribonucleic acid (DNA) where a hydrogen atom on the pyrimidine ring of a cytosine base is converted to a methyl group, forming 5-methylcytosine. In particular, methylation tends to occur at dinucleotides of cytosine and guanine referred to herein as "CpG sites". In other instances, methylation may occur at a cytosine not part of a CpG site or at another nucleotide that's not cytosine; however, these are rarer occurrences. In this present disclosure, methylation is discussed in reference to CpG sites for the sake of clarity. Anomalous cfDNA methylation can be identified as hypermethylation or hypomethylation, both of which may be indicative of cancer status. As is well known in the art, DNA methylation anomalies (compared to healthy controls) can cause different effects, which may contribute to cancer.

As used herein the term "methylation index" for each genomic site (e.g., a CpG site, a region of DNA where a cytosine nucleotide is followed by a guanine nucleotide in the linear sequence of bases along its 5'→3' direction) can refer to the proportion of sequence reads showing methylation at the site over the total number of reads covering that site. The "methylation density" of a region can be the number of reads at sites within a region showing methylation divided by the total number of reads covering the sites in the region. The sites can have specific characteristics, (e.g., the sites can be CpG sites). The "CpG methylation density" of a region can be the number of reads showing CpG methylation divided by the total number of reads covering CpG sites in the region (e.g., a particular CpG site, CpG sites within a CpG island, or a larger region). For example, the methylation density for each 100-kb bin in the human genome can be determined from the total number of unconverted cytosines (which can correspond to methylated cytosine) at CpG sites as a proportion of all CpG sites covered by sequence reads mapped to the 100-kb region. In some embodiments, this analysis is performed for other bin sizes, e.g., 50-kb or 1-Mb, etc. In some embodiments, a region is an entire genome or a chromosome or part of a chromosome (e.g., a chromosomal arm). A methylation index of a CpG site can be the same as the methylation density for a region when the region only includes that CpG site. The "proportion of methylated cytosines" can refer the number of cytosine sites, "C's," that are shown to be methylated (for example unconverted after bisulfite conversion) over the total number of analyzed cytosine residues, e.g., including cytosines outside of the CpG context, in the region. The methylation index, methylation density and proportion of methylated cytosines are examples of "methylation levels."

As disclosed herein, the terms "nucleic acid" and "nucleic acid molecule" are used interchangeably. The terms refer to nucleic acids of any composition form, such as deoxyribonucleic acid (DNA, e.g., complementary DNA (cDNA), genomic DNA (gDNA) and the like), and/or DNA analogs (e.g., containing base analogs, sugar analogs and/or a non-native backbone and the like), all of which can be in single- or double-stranded form. Unless otherwise limited, a nucleic acid can comprise known analogs of natural nucleotides, some of which can function in a similar manner as naturally occurring nucleotides. A nucleic acid can be in any form useful for conducting processes herein (e.g., linear, circular, supercoiled, single-stranded, double-stranded and the like). A nucleic acid in some embodiments can be from a single chromosome or fragment thereof (e.g., a nucleic acid sample may be from one chromosome of a sample obtained from a diploid organism). In certain embodiments, nucleic acids comprise nucleosomes, fragments or parts of nucleosomes or nucleosome-like structures. Nucleic acids sometimes comprise protein (e.g., histones, DNA binding proteins, and the like). Nucleic acids analyzed by processes described herein sometimes are substantially isolated and are not substantially associated with protein or other molecules. Nucleic acids also include derivatives, variants and analogs of DNA synthesized, replicated or amplified from single-stranded ("sense" or "antisense," "plus" strand or "minus" strand, "forward" reading frame or "reverse" reading frame) and double-stranded polynucleotides. Deoxyribonucleotides include deoxyadenosine, deoxycytidine, deoxyguanosine and deoxythymidine. A nucleic acid may be prepared using a nucleic acid obtained from a subject as a template.

As disclosed herein, the term "reference genome" refers to any particular known, sequenced or characterized genome, whether partial or complete, of any organism or virus that may be used to reference identified sequences from a subject. Exemplary reference genomes used for human subjects as well as many other organisms are provided in the on-line genome browser hosted by the National Center for Biotechnology Information ("NCBI") or the University of California, Santa Cruz (UCSC). A "genome" refers to the complete genetic information of an organism or virus, expressed in nucleic acid sequences. As used herein, a reference sequence or reference genome often is an assembled or partially assembled genomic sequence from an individual or multiple individuals. In some embodiments, a reference genome is an assembled or partially assembled genomic sequence from one or more human individuals. The reference genome can be viewed as a representative example of a species' set of genes. In some embodiments, a reference genome comprises sequences assigned to chromosomes. Exemplary human reference genomes include but are not limited to NCBI build 34 (UCSC equivalent: hg16), NCBI build 35 (UCSC equivalent: hg17), NCBI build 36.1 (UCSC equivalent: hg18), GRCh37 (UCSC equivalent: hg19), and GRCh38 (UCSC equivalent: hg38).

As disclosed herein, the term "regions of a reference genome," "genomic region," or "chromosomal region" refers to any portion of a reference genome, contiguous or non-contiguous. It can also be referred to, for example, as a bin, a partition, a genomic portion, a portion of a reference genome, a portion of a chromosome and the like. In some embodiments, a genomic section is based on a particular length of genomic sequence. In some embodiments, a method can include analysis of multiple mapped sequence reads to a plurality of genomic regions. Genomic regions can be approximately the same length or the genomic sections can be different lengths. In some embodiments, genomic regions are of about equal length. In some embodiments, genomic regions of different lengths are adjusted or weighted. In some embodiments, a genomic region is about 10 kilobases (kb) to about 500 kb, about 20 kb to about 400 kb, about 30 kb to about 300 kb, about 40 kb to about 200 kb, and sometimes about 50 kb to about 100 kb. In some embodiments, a genomic region is about 100 kb to about 200 kb. A genomic region is not limited to contiguous runs of sequence. Thus, genomic regions can be made up of contiguous and/or non-contiguous sequences. A genomic region is not limited to a single chromosome. In some embodiments, a genomic region includes all or part of one chromosome or all or part of two or more chromosomes. In some embodiments, genomic regions may span one, two, or more entire chromosomes. In addition, the genomic regions may span joint or disjointed portions of multiple chromosomes.

As used herein, the term "sequence reads" or "reads" refers to nucleotide sequences produced by any sequencing process described herein or known in the art. Reads can be generated from one end of nucleic acid fragments ("single-end reads"), and sometimes are generated from both ends of nucleic acids (e.g., paired-end reads, double-end reads). In some embodiments, sequence reads (e.g., single-end or paired-end reads) can be generated from one or both strands of a targeted nucleic acid fragment. The length of the sequence read is often associated with the particular sequencing technology. High-throughput methods, for example, provide sequence reads that can vary in size from tens to hundreds of base pairs (bp). In some embodiments, the sequence reads are of a mean, median or average length of about 15 bp to 900 bp long (e.g., about 20 bp, about 25 bp, about 30 bp, about 35 bp, about 40 bp, about 45 bp, about 50 bp, about 55 bp, about 60 bp, about 65 bp, about 70 bp, about 75 bp, about 80 bp, about 85 bp, about 90 bp, about 95 bp, about 100 bp, about 110 bp, about 120 bp, about 130, about 140 bp, about 150 bp, about 200 bp, about 250 bp, about 300 bp, about 350 bp, about 400 bp, about 450 bp, or about 500 bp. In some embodiments, the sequence reads are of a mean, median or average length of about 1000 bp, 2000 bp, 5000 bp, 10,000 bp, or 50,000 bp or more. Nanopore sequencing, for example, can provide sequence reads that can vary in size from tens to hundreds to thousands of base pairs. Illumina parallel sequencing can provide sequence reads that do not vary as much, for example, most of the sequence reads can be smaller than 200 bp. A sequence read (or sequencing read) can refer to sequence information corresponding to a nucleic acid molecule (e.g., a string of nucleotides). For example, a sequence read can correspond to a string of nucleotides (e.g., about 20 to about 150) from part of a nucleic acid fragment, can correspond to a string of nucleotides at one or both ends of a nucleic acid fragment, or can correspond to nucleotides of the entire nucleic acid fragment. A sequence read can be obtained in a variety of ways, e.g., using sequencing techniques or using probes, e.g., in hybridization arrays or capture probes, or amplification techniques, such as the polymerase chain reaction (PCR) or linear amplification using a single primer or isothermal amplification.

As used herein, the term "nucleic acid fragment sequence" refers to all or a portion of a polynucleotide sequence of at least three consecutive nucleotides. In the context of sequencing cell-free nucleic acid fragments found in a biological sample, the term "nucleic acid fragment sequence" refers to the sequence of a cell-free nucleic acid molecule (e.g., a cell-free DNA fragment) that is found in the biological sample or a representation thereof (e.g., an electronic representation of the sequence). Sequencing data (e.g., raw or corrected sequence reads from whole-genome sequencing, targeted sequencing, etc.) from a unique nucleic acid fragment (e.g., a cell-free nucleic acid) are used to determine a nucleic acid fragment sequence. Sequence reads in such sequencing data, which in fact may be obtained from sequencing of PCR duplicates of the original nucleic acid fragment, therefore "represent" or "support" the nucleic acid fragment sequence. There may be a plurality of sequence reads that each represents or supports a particular nucleic acid fragment in a biological sample (e.g., PCR duplicates), however, there will only be one nucleic acid fragment sequence for the particular nucleic acid fragment. In some embodiments, duplicate sequence reads generated for the original nucleic acid fragment are combined or removed (e.g., collapsed based on sequence into a single sequence, e.g., the nucleic acid fragment sequence). It is noted that the nucleic acid fragment sequences for a population of nucleic acid fragments may include several identical sequences, each of which represents a different original nucleic acid fragment, rather than duplicates of the same original nucleic acid fragment. In some embodiments, a cell-free nucleic acid is considered a nucleic acid fragment.

As disclosed herein, the terms "sequencing," "sequence determination," and the like as used herein refers generally to any and all biochemical processes that may be used to determine the order of biological macromolecules such as nucleic acids or proteins. For example, sequencing data can include all or a portion of the nucleotide bases in a nucleic acid molecule such as a DNA fragment.

As disclosed herein, the term "single nucleotide variant" or "SNV" refers to a substitution of one nucleotide to a different nucleotide at a position (e.g., site) of a nucleotide sequence, e.g., a sequence read from an individual. A substitution from a first nucleobase X to a second nucleobase Y may be denoted as "X>Y." For example, a cytosine to thymine SNV may be denoted as "C>T."

As used herein, the term "mutation," refers to a detectable change in the genetic material of one or more cells. In a particular example, one or more mutations can be found in, and can identify, cancer cells (e.g., driver and passenger mutations). A mutation can be transmitted from a parent cell to a daughter cell. A person having skill in the art will appreciate that a genetic mutation (e.g., a driver mutation) in a parent cell can induce additional, different mutations (e.g., passenger mutations) in a daughter cell. A mutation generally occurs in a nucleic acid. In a particular example, a mutation can be a detectable change in one or more deoxyribonucleic acids or fragments thereof. A mutation generally refers to nucleotides that is added, deleted, substituted for, inverted, or transposed to a new position in a nucleic acid. A mutation can be a spontaneous mutation or an experimentally induced mutation. A mutation in the sequence of a particular tissue is an example of a "tissue-specific allele." For example, a tumor can have a mutation that results in an allele at a locus (allele position) that does not occur in normal cells. Another example of a "tissue-specific allele" is a fetal-specific allele that occurs in the fetal tissue, but not the maternal tissue.

As disclosed herein, the term "subject" refers to any living or non-living organism, including but not limited to a human (e.g., a male human, female human, fetus, pregnant female, child, or the like), a non-human animal, a plant, a bacterium, a fungus or a protist. Any human or non-human animal can serve as a subject, including but not limited to mammal, reptile, avian, amphibian, fish, ungulate, ruminant, bovine (e.g., cattle), equine (e.g., horse), caprine and ovine (e.g., sheep, goat), swine (e.g., pig), camelid (e.g., camel, llama, alpaca), monkey, ape (e.g., gorilla, chimpanzee), ursid (e.g., bear), poultry, dog, cat, mouse, rat, fish, dolphin, whale and shark. In some embodiments, a subject is a male or female of any stage (e.g., a man, a woman or a child).

The terms "sequencing depth," "coverage" and "coverage rate" are used interchangeably herein to refer to the number of times a locus is covered by a consensus sequence read corresponding to a unique nucleic acid target molecule ("nucleic acid fragment") aligned to the locus; e.g., the sequencing depth is equal to the number of unique nucleic acid target fragments (excluding PCR sequencing duplicates) covering the locus. The locus can be as small as a nucleotide, or as large as a chromosome arm, or as large as an entire genome. Sequencing depth can be expressed as "YX", e.g., 50x, 100x, etc., where "Y" refers to the number of times a locus is covered with a sequence corresponding to a nucleic acid target; e.g., the number of times independent sequence information is obtained covering the particular locus. In some embodiments, the sequencing depth corresponds to the number of genomes that have been sequenced. Sequencing depth can also be applied to multiple loci, or the whole genome, in which case Y can refer to the mean or average number of times a loci or a haploid genome, or a whole genome, respectively, is sequenced. When a mean depth is quoted, the actual depth for different loci included in the dataset can span over a range of values. Ultra-deep sequencing can refer to at least 100x in sequencing depth at a locus.

As used herein, the term "tissue" can correspond to a group of cells that group together as a functional unit. More than one type of cell can be found in a single tissue. Different types of tissue may consist of different types of cells (e.g., hepatocytes, alveolar cells or blood cells), but also can correspond to tissue from different organisms (mother versus fetus) or to healthy cells versus tumor cells. The term "tissue" can generally refer to any group of cells found in the human body (e.g., heart tissue, lung tissue, kidney tissue, nasopharyngeal tissue, oropharyngeal tissue). In some aspects, the term "tissue" or "tissue type" can be used to refer to a tissue from which a cell-free nucleic acid originates. In one example, viral nucleic acid fragments can be derived from blood tissue. In another example, viral nucleic acid fragments can be derived from tumor tissue.

As used herein, the term "allele frequency" refers to the frequency at which a particular allele is represented at a particular genomic locus in the cell-free DNA of a biological sample, e.g., relative to the total occurrence of the loci in the biological sample. In some embodiments, allele frequency is calculated by dividing the read-depth of the allele in the biological sample by the read depth of the loci in the biological sample.

Exemplary System Embodiments

Details of an exemplary system are now described in conjunction with FIG. 1. FIG. 1 is a block diagram illustrating a system 100 in accordance with some implementations. Device 100 in some implementations includes at least one or more processing units CPU(s) 102 (also referred to as processors), one or more network interfaces 104, a display 106 having a user interface 108, an input device 110, a memory 111, and one or more communication buses 114 for interconnecting these components. The one or more communication buses 114 optionally include circuitry (sometimes called a chipset) that interconnects and controls communications between system components. Memory 111 may be a non-persistent memory, a persistent memory, or any combination thereof. The non-persistent memory typically includes high-speed random access memory, such as DRAM, SRAM, DDR RAM, ROM, EEPROM, flash memory, whereas the persistent memory typically includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid-state storage devices. Regardless of its specific implementation, memory 111 comprises at least one non-transitory computer-readable storage medium, and it stores thereon computer-executable executable instructions which can be in the form of programs, modules, and data structures.

In some embodiments, as shown in FIG. 1, the memory 111 stores the following:

- an operating system 116, which includes procedures for handling various basic system services and for performing hardware-dependent tasks;
- an optional network communication module (or instructions) 118 for connecting the system 100 with other devices and/or to a communication network;
- a classifier 120 for estimating a tumor fraction f of a subject identified as having a cancer;
- a first plurality of nucleic acid fragment sequences 122 obtained from a liquid biological sample obtained from the subject;
- a second plurality of nucleic acid fragment sequences 124 obtained from a solid tumor sample obtained from the subject;

a plurality of estimated smoothed noise rates 126 (such as 126-1 to 126-N), where each respective estimated smoothed noise rate is determined using nucleic acid fragment sequences obtained from each non-cancer sample in a cohort of non-cancer samples mapping to a corresponding allele position in a plurality of allele positions;

a plurality of variant allele counts 128 (such as 128-1 to 128-N) for the subject, where a variant allele count for each respective allele position (or variant allele) is obtained using the first plurality of nucleic acid fragment sequences;

a plurality of coverages 130 (such as 130-1 to 130-N) for the subject, where a coverage for each respective allele position in the plurality of allele positions is obtained using the first plurality of nucleic acid fragment sequences; and a plurality of solid variant allele fractions 132 (such as 132-1 to 132-N), where a solid variant allele fraction for each respective allele position in the plurality of allele positions is determined using the second plurality of nucleic acid fragment sequences.

In various implementations, one or more of the above-identified elements are stored in one or more of the previously mentioned memory devices, and correspond to a set of instructions for performing a function described above. The above-identified modules, data, or programs (e.g., sets of instructions) need not be implemented as separate software programs, procedures, datasets, or modules, and thus various subsets of these modules and data may be combined or otherwise re-arranged in various implementations. In some implementations, the memory 111 optionally stores a subset of the modules and data structures identified above. Furthermore, in some embodiments, the memory stores additional modules and data structures not described above. In some embodiments, one or more of the above-identified elements is stored in a computer system, other than that of the system 100, that is addressable by the system 100 so that the system 100 may retrieve all or a portion of such data when needed.

Although FIG. 1 depicts a "system 100," the figure is intended more as a functional description of the various features that may be present in computer systems than as a structural schematic of the implementations described herein. In practice, and as recognized by those of ordinary skill in the art, items shown separately could be combined and some items can be separate. Moreover, although FIG. 1 depicts certain data and modules in the memory 111 (which can be non-persistent or persistent memory), it should be appreciated that these data and modules, or portion(s) thereof, may be stored in more than one memory. For example, in some embodiments, at least the first plurality of nucleic acid fragment sequences 122 and the second plurality of nucleic acid fragment sequences 124 are stored in a remote storage device which can be a part of a cloud-based infrastructure. In some embodiments, other elements of the present disclosure are stored on a cloud-based infrastructure as well.

In embodiments of the present disclosure, techniques for determining a tumor fraction of a subject are provided. Tumor variant calls from sequencing data (obtained by e.g., whole-genome sequencing, whole-genome bisulfate sequencing, whole-genome methylation sequencing, targeted sequencing, whole-transcriptome RNAseq, etc.) can be used to ultimately determine a tumor fraction in a subject. For example, in some embodiments, Cell-Free Genome Atlas Study (CCGA-1) sequencing data or CCGA-2 sequencing data can be used. The CCGA-1 and CCGA-2 assays are described in Example 3. In some embodiments, sequencing data is processed to form a plurality of nucleic acid fragments (nucleic acid fragment sequences) in the manner disclosed in U.S. Provisional Patent Application No. 62/894,206, entitled "SYSTEMS AND METHODS FOR DETERMINING CONSENSUS BASE CALLS IN NUCLEIC ACID SEQUENCING," filed Aug. 30, 2019, which is hereby incorporated by reference. A plurality of allele positions can be used to determine counts and tumor allele frequency at each of the allele positions in the sequencing data. The sequencing data can be obtained from two types of samples obtained from a subject namely, from a liquid sample and from a solid tumor tissue sample. The liquid sample can be, for example, a blood sample including circulating tumor DNA (e.g., cell-free circulating DNA) from cancer DNA shed into the bloodstream. The solid sample is a tumor sample. An allele position can have more than one allele (e.g., a most common allele, termed the reference allele, a first alternative allele, a second alternative allele, and so forth). An allele position (locus) can arise because of a single nucleotide variation (SNV) or other type of mutation (e.g., an insertion mutation, a deletion mutation, a somatic copy number alteration, a nucleic acid rearrangement, or an aberrant methylation pattern) arising at the allele position.

In some embodiments, aggregated counts from non-cancer samples are used to estimate noise at each allele position. The allele counts and frequency determined based on the nucleic acid fragment sequences from samples obtained from the subject, as well as the estimated noise, are used to determine a tumor fraction f in that subject. Further, as discussed in more detail below, a probability of observing the allele counts and the frequency if the sample's tumor fraction was a particular value, f, is determined. A distribution of probabilities for various values off can then be determined. In this way, embodiments of the present disclosure can be used to evaluate a performance a classifier implemented to distinguish cancer from non-cancer in a subject and/or determine a tumor fraction in sample(s) obtained from a subject.

Figure 2:
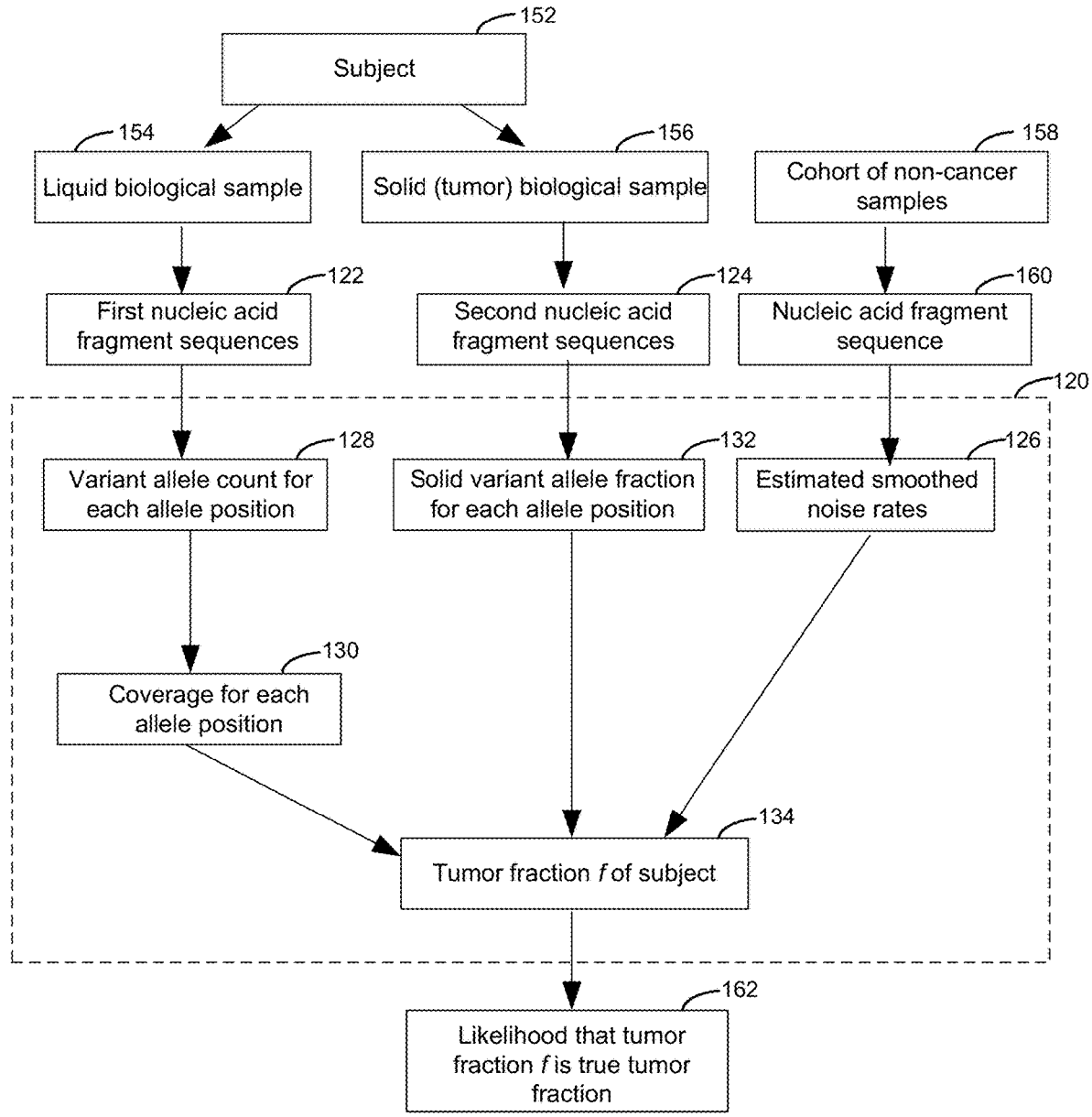
FIG. 2 is a schematic diagram of processing performed in accordance with some embodiments of the present disclosure.

FIG. 2 illustrates an overview of the techniques in accordance with some embodiments of the present disclosure. As shown in FIG. 2, a liquid biological sample 154 and a solid tumor sample 156 are obtained from a subject 152. The first plurality of nucleic acid fragment sequences ("First nucleic acid fragment sequences") 122 are obtained, in electronic form, from the liquid biological sample 154. The second plurality of sequence reads ("Second nucleic acid fragment sequences") 124 are obtained, in electronic form, from the solid tumor sample 156.

In some embodiments, a plurality of allele positions used to determine a tumor fraction in a subject is selected for a particular type of cancer or for a plurality of cancers. In some embodiments, however, the plurality of allele positions is selected regardless of a type of cancer. Each allele position has two or more alleles (e.g., a reference allele and at least one alternate allele). In some embodiments, an allele position can have a number of different alternate alleles (e.g., between one and five alternative alleles, etc.).

The plurality of allele positions is selected based on one or more sequencing approaches, and, in some embodiments, variant caller filters are applied. In some embodiments, an allele position is selected for analysis in accordance with embodiments of the present disclosure when a tumor allele fraction in a solid tumor sample is 0.2 and a coverage is at least 20x. It should be appreciated, however, that an allele position can be selected based on other parameters.

In some embodiments, for each allele position (also referred to herein as a "variant," "variant position," or "locus") in a plurality of allele positions, each nucleic acid fragment sequence in the first plurality of nucleic acid fragment sequences 122 is aligned to a region in a reference genome in order to determine whether that nucleic acid fragment sequence contains all or a portion of the allele position. The alignment of the nucleic acid fragment sequence to a region in the reference genome involves matching sequences from the nucleic acid fragment sequence to that of the reference genome based on complete or partial identity between the sequences. It should be appreciated that one or more filters are applied to the nucleic acid fragment sequences overlapping the variant position, e.g., filters that allow to retain reads that exhibit high base quality scores at each position, reads having high mapQ, etc.

As shown in FIG. 2, a variant allele count $s_{v_i,t}$ for each respective allele position $v_i$ in the plurality of allele positions is determined using the first nucleic acid fragment sequences 122, as shown in FIG. 2. In this way, a plurality of variant allele counts ("Variant allele count for each allele position") 128 for the subject is calculated. A coverage $s_{v_i}$ for each respective allele position $v_i$ in the plurality of allele positions using the first plurality of nucleic acid fragment sequences, thereby calculating a plurality of coverages ("Coverage for each allele position") 130 for the subject.

In the described embodiments, as shown schematically in FIG. 2, each non-cancer sample in a cohort of non-cancer samples 158 is used to obtain nucleic acid fragment sequences 160, and the nucleic acid fragment sequences 160 are used to obtain a plurality of estimated smoothed noise rates ("Estimated smoothed noise rates") 126. In particular, each respective estimated smoothed noise rate $ev_i$ in the plurality of estimated smoothed noise rates is determined using the nucleic acid fragment sequences 160 mapping to a corresponding allele position $v_i$ in a plurality of allele positions. In this way, there is an estimated noise rate for an allele position.

As also shown in FIG. 2, the second nucleic acid fragment sequences 124 obtained from the solid tumor sample 156 are used to determine a solid variant allele fraction $a_i$ for each respective allele position $v_i$ in the plurality of allele positions, thereby calculating a plurality of solid variant allele fractions ("Solid variant allele fraction for each allele position") 132.

In the described embodiments of the present disclosure, the tumor fraction f of the subject is calculated using $D_s$ which comprises (i) the plurality of estimated smoothed noise rates ("Estimated smoothed noise rates") 126, (ii) the plurality of variant allele counts ("Variant allele count for each allele position") 128, (iii) the plurality of coverages ("Coverage for each allele position") 130, and (iv) the plurality of solid variant allele fractions ("Solid variant allele fraction for each allele position") 132.

In some embodiments, the determination of the subject's tumor fraction f is used to evaluate a classifier used to determine a tumor fraction in a subject. Thus, FIG. 2 illustrates schematically that at least the variant allele counts 128, coverages 130, solid variant allele fractions 132, estimated smoother noise rates 126, tumor fraction f for the subject 134 can be used to evaluate the performance of a classifier 120. The described techniques determine a likelihood 162 of the calculated tumor fraction f (which is an estimated tumor fraction) being a true tumor fraction. Multiple cancer samples obtained from various patients can be analyzed to calculate a tumor fraction in each patient. In some implementations, one or more of the above-identified elements are stored in one or more of the previously mentioned memory devices, and correspond to a set of computer-executable instructions for performing a function described above. The above-identified modules, data, or programs (e.g., sets of computer-executable instructions) need not be implemented as separate software programs, procedures, datasets, or modules, and thus various subsets of these modules and data may be combined or otherwise re-arranged in various implementations. In some implementations, the non-persistent memory 111 optionally stores a subset of the modules and data structures identified above.

Furthermore, in some embodiments, the memory stores additional modules and data structures not described above. In some embodiments, one or more of the above-identified elements is stored in a computer system, other than that of the computer system 100, that is addressable by the system 100 so that the system 100 may retrieve all or a portion of such data when needed.

Exemplary Method Embodiment—Based on Aberrant Tissue Sequencing, Discovering a Condition A method in accordance with embodiments the present disclosure is now described with reference to FIGS. 3A-3F. Blocks 202-206.

Figure 3A:
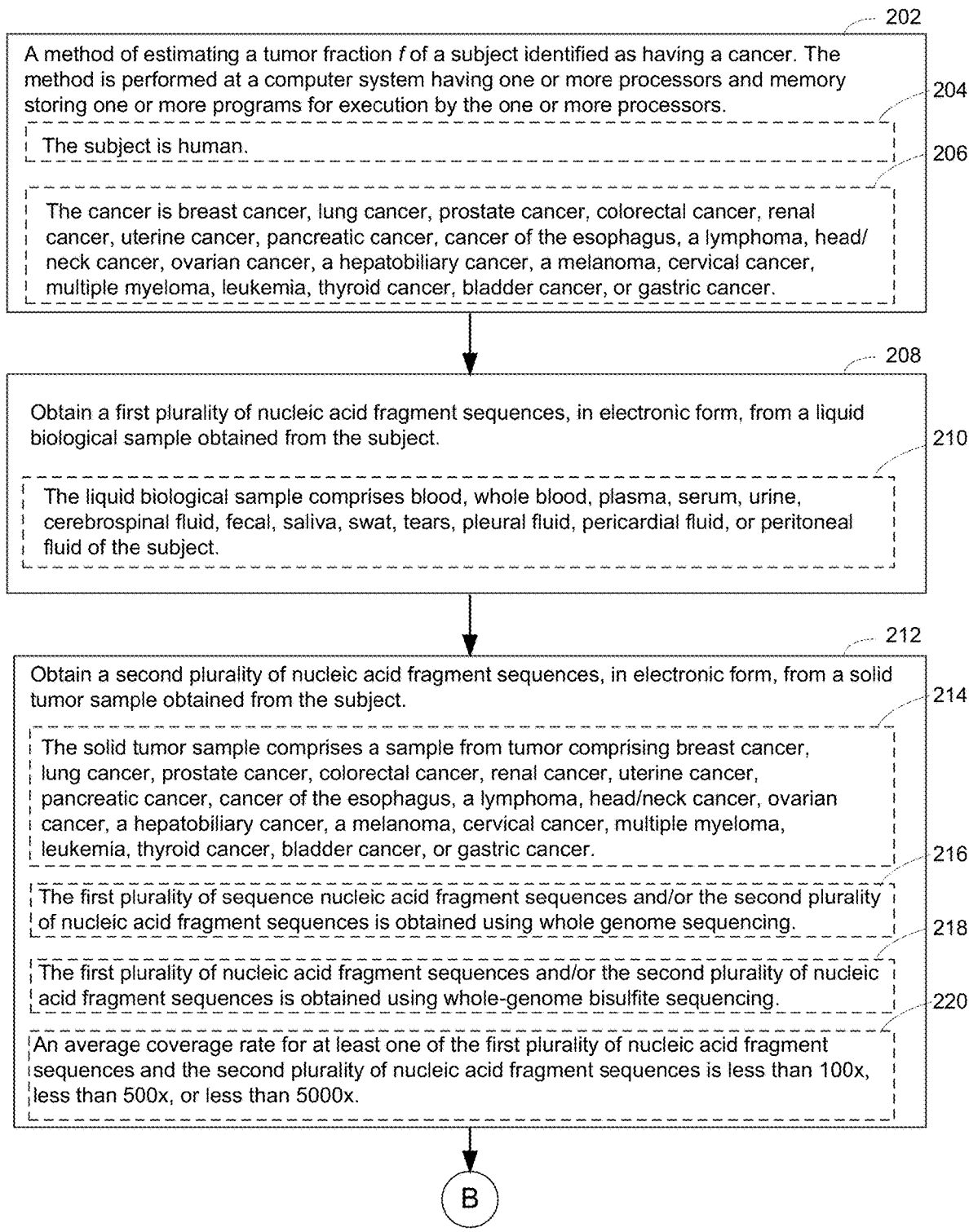

Referring to block 202 of FIG. 3A, in some embodiments, a method of estimating a tumor fraction f of a subject identified as having a cancer is performed at a computer system, such as, e.g., computer system 100 of FIG. 1. The computer system has one or more processors and memory storing one or more programs for execution by the one or more processors. The subject can be human, as shown at block 204, though embodiments of the present disclosure are not limited to a human subject and the subject can be another mammal or other species. The cancer can be any one or more of various cancers, and non-limiting examples of cancer include breast cancer, lung cancer, prostate cancer, colorectal cancer, renal cancer, uterine cancer, pancreatic cancer, cancer of the esophagus, a lymphoma, head/neck cancer, ovarian cancer, a hepatobiliary cancer, a melanoma, cervical cancer, multiple myeloma, leukemia, thyroid cancer, bladder cancer, or gastric cancer, as shown at block 206.

In some embodiments, the cancer is an adrenocortical carcinoma, a childhood adrenocortical carcinoma, a tumor of an AIDS-related cancer, kaposi sarcoma, a tumor associated with anal cancer, a tumor associated with an appendix cancer, an astrocytoma, a childhood (brain cancer) tumor, an atypical teratoid/rhabdoid tumor, a central nervous system (brain cancer) tumor, a basal cell carcinoma of the skin, a tumor associated with bile duct cancer, a bladder cancer tumor, a childhood bladder cancer tumor, a bone cancer (e.g., Ewing sarcoma and osteosarcoma and malignant fibrous histiocytoma) tissue, a brain tumor, breast cancer tissue, childhood breast cancer tissue, a childhood bronchial tumor, burkitt lymphoma tissue, a carcinoid tumor (gastrointestinal), a childhood carcinoid tumor, a carcinoma of unknown primary, a childhood carcinoma of unknown primary, a childhood cardiac (heart) tumor, a central nervous system (e.g., brain cancer such as childhood atypical teratoid/rhabdoid) tumor, a childhood embryonal tumor, a childhood germ cell tumor, cervical cancer tissue, childhood cervical cancer tissue, cholangiocarcinoma tissue, childhood chordoma tissue, a chronic myeloproliferative neoplasm, a colorectal cancer tumor, a childhood colorectal cancer tumor, childhood craniopharyngioma tissue, a ductal carcinoma in situ (DCIS), a childhood embryonal tumor, endometrial cancer (uterine cancer) tissue, childhood ependymoma tissue, esophageal cancer tissue, childhood esophageal cancer tissue, esthesioneuroblastoma (head and neck cancer) tissue, a childhood extracranial germ cell tumor, an extragonadal germ cell tumor, eye cancer tissue, an intraocular melanoma, a retinoblastoma, fallopian tube cancer tissue, gallbladder cancer tissue, gastric (stomach) cancer tissue, childhood gastric (stomach) cancer tissue, a gastrointestinal carcinoid tumor, a gastrointestinal stromal tumor (GIST), a childhood gastrointestinal stromal tumor, a germ cell tumor (e.g., a childhood central nervous system germ cell tumor, a childhood extracranial germ cell tumor, an extragonadal germ cell tumor, an ovarian germ cell tumor, or testicular cancer tissue), head and neck cancer tissue, a childhood heart tumor, hepatocellular cancer (HCC) tissue, an islet cell tumor (pancreatic neuroendocrine tumors), kidney or renal cell cancer (RCC) tissue, laryngeal cancer tissue, leukemia, liver cancer tissue, lung cancer (non-small cell and small cell) tissue, childhood lung cancer tissue, male breast cancer tissue, a malignant fibrous histiocytoma of bone and osteosarcoma, a melanoma, a childhood melanoma, an intraocular melanoma, a childhood intraocular melanoma, a merkel cell carcinoma, a malignant mesothelioma, a childhood mesothelioma, metastatic cancer tissue, metastatic squamous neck cancer with occult primary tissue, a midline tract carcinoma with NUT gene changes, mouth cancer (head and neck cancer) tissue, multiple endocrine neoplasia syndrome tissue, a multiple myeloma/plasma cell neoplasm, myelodysplastic syndrome tissue, a myelodysplastic/myeloproliferative neoplasm, a chronic myeloproliferative neoplasm, nasal cavity and paranasal sinus cancer tissue, nasopharyngeal cancer (NPC) tissue, neuroblastoma tissue, non-small cell lung cancer tissue, oral cancer tissue, lip and oral cavity cancer and oropharyngeal cancer tissue, osteosarcoma and malignant fibrous histiocytoma of bone tissue, ovarian cancer tissue, childhood ovarian cancer tissue, pancreatic cancer tissue, childhood pancreatic cancer tissue, papillomatosis (childhood laryngeal) tissue, paraganglioma tissue, childhood paraganglioma tissue, paranasal sinus and nasal cavity cancer tissue, parathyroid cancer tissue, penile cancer tissue, pharyngeal cancer tissue, pheochromocytoma tissue, childhood pheochromocytoma tissue, a pituitary tumor, a plasma cell neoplasm/multiple myeloma, a pleuropulmonary blastoma, a primary central nervous system (CNS) lymphoma, primary peritoneal cancer tissue, prostate cancer tissue, rectal cancer tissue, a retinoblastoma, a childhood rhabdomyosarcoma, salivary gland cancer tissue, a sarcoma (e.g., a childhood vascular tumor, osteosarcoma, uterine sarcoma, etc.), Szary syndrome (lymphoma) tissue, skin cancer tissue, childhood skin cancer tissue, small cell lung cancer tissue, small intestine cancer tissue, a squamous cell carcinoma of the skin, a squamous neck cancer with occult primary, a cutaneous t-cell lymphoma, testicular cancer tissue, childhood testicular cancer tissue, throat cancer (e.g., nasopharyngeal cancer, oropharyngeal cancer, hypopharyngeal cancer) tissue, a thymoma or thymic carcinoma, thyroid cancer tissue, transitional cell cancer of the renal pelvis and ureter tissue, unknown primary carcinoma tissue, ureter or renal pelvis tissue, transitional cell cancer (kidney (renal cell) cancer tissue, urethral cancer tissue, endometrial uterine cancer tissue, uterine sarcoma tissue, vaginal cancer tissue, childhood vaginal cancer tissue, a vascular tumor, vulvar cancer tissue, a Wilms tumor or other childhood kidney tumor.

Blocks 208-210.

As shown at block 202 of FIG. 3A, the described method includes obtaining a first plurality of nucleic acid fragment sequences (e.g., first nucleic acid fragment sequences 122 of FIGS. 1 and 2), in electronic form, from a liquid biological sample obtained from the subject. In some embodiments (block 210), the liquid biological sample comprises blood, whole blood, plasma, serum, urine, cerebrospinal fluid, fecal, saliva, sweat, tears, pleural fluid, pericardial fluid, or peritoneal fluid of the subject. In at least some embodiments, the liquid biological sample is blood. In some embodiments, the first plurality of nucleic acid fragment sequences is obtained from cell-free nucleic acids.

Blocks 212-220.

As shown at block 212 of FIG. 3A, the described method also includes obtaining a second plurality of nucleic acid fragment sequences (e.g., second nucleic acid fragment sequences 124 of FIGS. 1 and 2), in electronic form, from a solid tumor sample obtained from the subject. With reference to block 214 of FIG. 3A, in some nonlimiting embodiments, the solid tumor sample can comprise a sample from tumor comprising breast cancer, lung cancer, prostate cancer, colorectal cancer, renal cancer, uterine cancer, pancreatic cancer, cancer of the esophagus, a lymphoma, head/neck cancer, ovarian cancer, a hepatobiliary cancer, a melanoma, cervical cancer, multiple myeloma, leukemia, thyroid cancer, bladder cancer, or gastric cancer.

The first plurality of nucleic acid fragment sequences and the second plurality of nucleic acid fragment sequences obtained from the liquid and solid samples, respectively, can be obtained using various sequencing technologies. For example, in some embodiments, with reference to block 216, the first plurality of nucleic acid fragment sequences and/or the second plurality of nucleic acid fragment sequences are obtained using whole-genome sequencing. As another example, in some embodiments, with reference to block 218, the first plurality of nucleic acid fragment sequences and/or the second plurality of nucleic acid fragment sequences are obtained using whole-genome bisulfite sequencing. In some embodiments, as shown at block 220, an average coverage rate for at least one of the first plurality of nucleic acid fragment sequences and the second plurality of nucleic acid fragment sequences between 3× and 5000×, between 5× and 500×, between 8× and 400×, less than 100×, less than 500×, or less than 5000×.

In some embodiments, a biological sample is processed to extract cell-free nucleic acids in preparation for sequencing analysis. By way of a non-limiting example, in some embodiments, cell-free nucleic acid is extracted from a blood sample collected from a subject in K2 EDTA tubes. Samples are processed within two hours of collection by double spinning of the blood first at ten minutes at 1000 g then plasma ten minutes at 2000 g. The plasma is then stored in 1 ml aliquots at 80° C. In this way, a suitable amount of plasma (e.g. 1-5 ml) is prepared from the biological sample for the purposes of cell-free nucleic acid extraction. In some such embodiments cell-free nucleic acid is extracted using the QIAamp Circulating Nucleic Acid kit (Qiagen) and eluted into DNA Suspension Buffer (Sigma). In some embodiments, the purified cell-free nucleic acid is stored at −20° C. until use. See, for example, Swanton et al., 2017, "Phylogenetic ctDNA analysis depicts early-stage lung cancer evolution," Nature, 545(7655): 446-451, which is hereby incorporated by reference. Other equivalent methods can be used to prepare cell-free nucleic acid from biological methods for the purpose of sequencing, and all such methods are within the scope of the present disclosure.

In some embodiments, the nucleic acid that is obtained from a biological sample is in any form of nucleic acid defined in the present disclosure, or a combination thereof. For example, in some embodiments, the nucleic acid that is obtained from a biological sample is a mixture of RNA and DNA.

Any form of sequencing can be used to obtain the nucleic acid fragment sequences obtained from the biological sample including, but not limited to, high-throughput sequencing systems such as the Roche 454 platform, the Applied Biosystems SOLID platform, the Helicos True Single Molecule DNA sequencing technology, the sequencing-by-hybridization platform from Affymetrix Inc., the single-molecule, real-time (SMRT) technology of Pacific Biosciences, the sequencing-by-synthesis platforms from 454 Life Sciences, Illumina/Solexa and Helicos Biosciences, and the sequencing-by-ligation platform from Applied Biosystems. The ION TORRENT technology from Life technologies and nanopore sequencing also can be used to obtain nucleic acid fragment sequences obtained from the biological sample.

In some embodiments, sequencing-by-synthesis and reversible terminator-based sequencing (e.g., Illumina's Genome Analyzer; Genome Analyzer II; HISEQ 2000; HISEQ 2500 (Illumina, San Diego Calif.)) is used to obtain nucleic acid fragment sequences from the biological sample. In some such embodiments, millions of nucleic acid (e.g., DNA) fragments are sequenced in parallel. In one example of this type of sequencing technology, a flow cell is used that contains an optically transparent slide with eight individual lanes on the surfaces of which are bound oligonucleotide anchors (e.g., adaptor primers). A flow cell often is a solid support that is configured to retain and/or allow the orderly passage of reagent solutions over bound analytes. In some instance, flow cells are planar in shape, optically transparent, generally in the millimeter or sub-millimeter scale, and often have channels or lanes in which the analyte/reagent interaction occurs. In some embodiments, a nucleic acid sample can include a signal or tag that facilitates detection. In some such embodiments, the acquisition of nucleic acid fragment sequences from the nucleic acid obtained from the biological sample includes obtaining quantification information of the signal or tag via a variety of techniques such as, for example, flow cytometry, quantitative polymerase chain reaction (qPCR), gel electrophoresis, gene-chip analysis, microarray, mass spectrometry, cytofluorimetric analysis, fluorescence microscopy, confocal laser scanning microscopy, laser scanning cytometry, affinity chromatography, manual batch mode separation, electric field suspension, sequencing, and combination thereof Blocks 222-234.

Figure 3B:
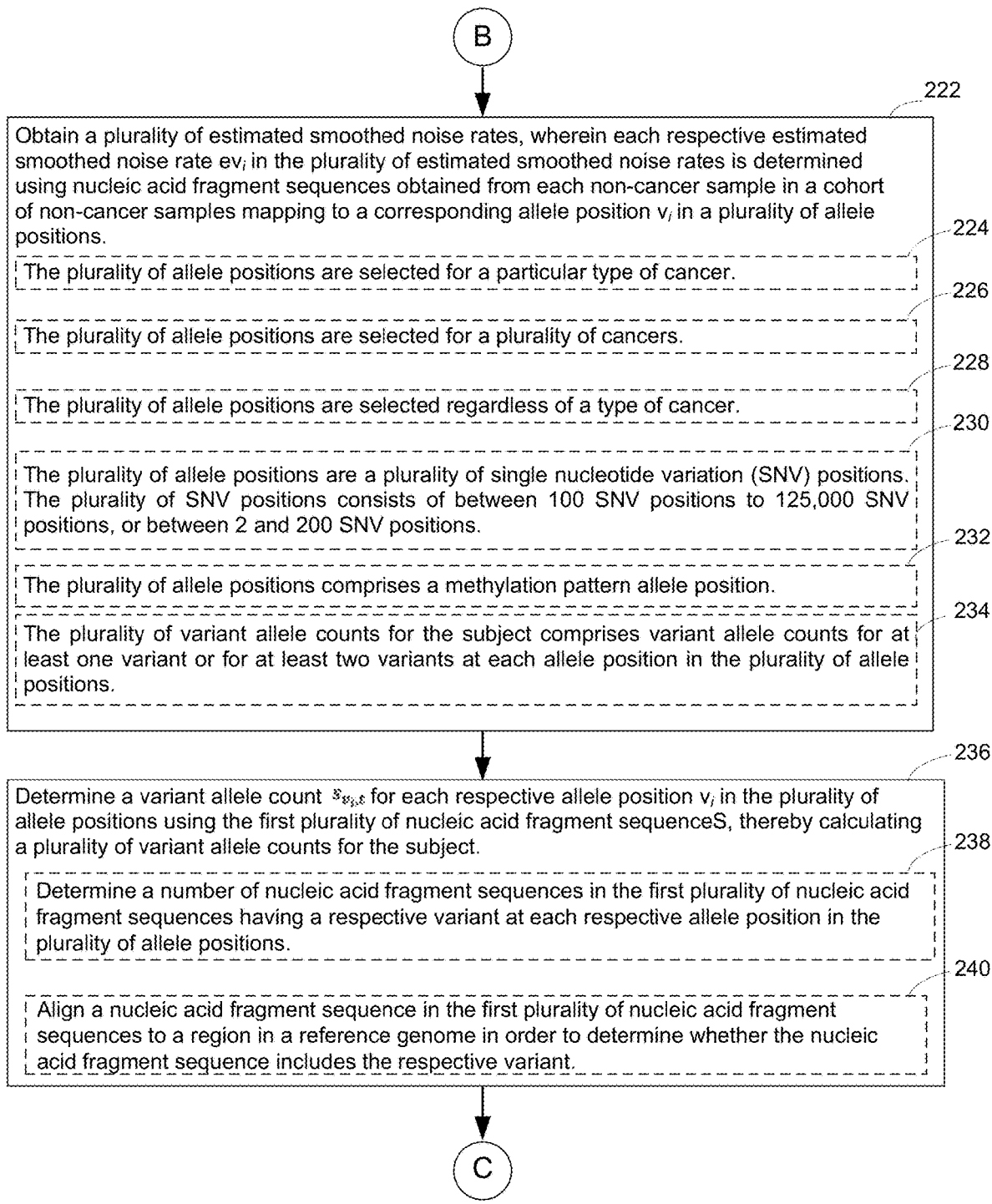
Figure 3C:
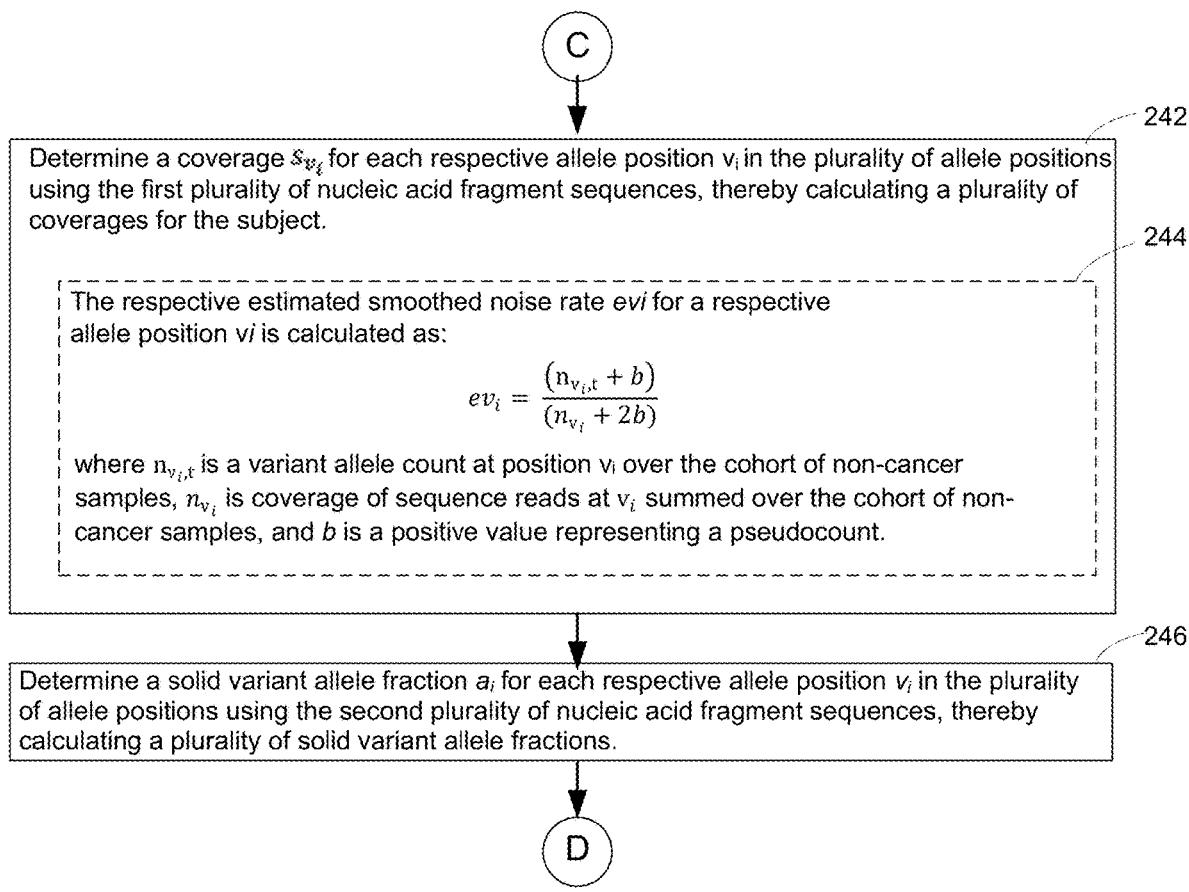
Figure 3E:
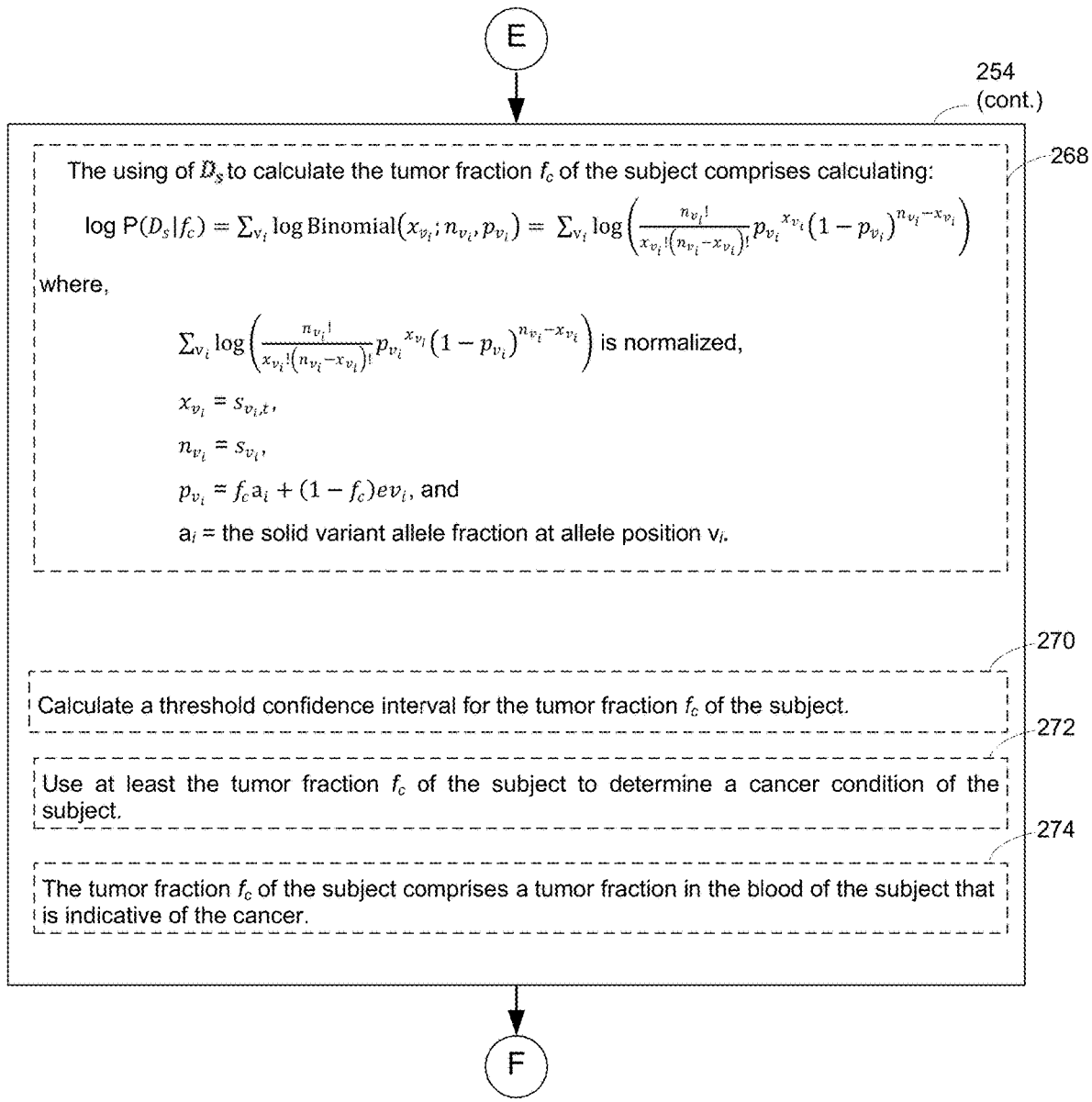

In some embodiments, at block 222 of FIG. 3B, a plurality of estimated smoothed noise rates is obtained. Each respective estimated smoothed noise rate $ev_i$ in the plurality of estimated smoothed noise rates is determined using nucleic acid fragment sequences obtained from each non-cancer sample in a cohort of non-cancer samples mapping to a corresponding allele position $v_i$ in a plurality of allele positions. In some embodiments, the cohort of non-cancer samples comprises samples from at least 10, 15, 20, 25, 30, 35, 40, 50, 100, 150, 500, or 1000 subjects. In some embodiments, the cohort of non-cancer samples consists of samples from between 10 subjects and 2000 subjects. In some embodiments, the cohort of non-cancer samples consists of samples from between 5 subjects and 100 subjects. As such, $ev_i$ represents the noise at allele position $v_i$. That is, the higher the value $ev_i$, the more variant calls (which are supposed to be indicative of cancer) occur at position $v_i$ are incurred across the non-cancer population.

The plurality of allele positions can be selected in various ways. For example, in some embodiments, as shown at block 224, the plurality of allele positions is selected for a particular type of cancer. For instance, for a given type of cancer, the scientific literature may provide a list of known allele positions whose allelic values associate with the given cancer. As an example, Antonious et al., 2008, "Common breast cancer-predisposition alleles are associated with breast cancer risk in BRCA1 and BRCA2 mutation carriers," Am J Hum Genet. 82(4):937-948, which is hereby incorporated by reference, disclose some allele positions that associate with breast cancer. In some embodiments (block 226), the plurality of allele positions are selected for a plurality of cancers. Furthermore, in some embodiments (block 228), the plurality of allele positions are selected regardless of a type of cancer.

In some embodiments, the plurality of allele positions are identified using the second plurality of nucleic acid fragment sequences collected from the solid tumor sample of the test subject. In some embodiments, for each respective allele position in the second plurality of nucleic acid fragment sequences collected from the solid tumor sample of the test subject, there are one or more nucleic acid fragment sequences in the second plurality of nucleic acid fragment sequences that have an alternate value for the respective allele position. In other words, there is collected from the solid tumor sample (in the second plurality of nucleic acid fragment sequences), for each respective allele position in the plurality of allele positions, one or more nucleic acid fragment sequences that have an alternative allele value for the respective allele position. For instance, consider the case where each allele position is a corresponding single nucleotide variation having a reference allele value and an alternate allele value. In such instances, the plurality of allele positions are those respective allele positions that are each represented by an independent positive number of nucleic acid fragment sequences (in the second plurality of nucleic acid fragment sequences) having the alternate allele value.

In some embodiments, the plurality of allele positions are filtered.

In one such filtering example, in some embodiments, the requirement is imposed that, for a given allele position to be included in the plurality of allele positions used to calculate tumor fraction using the methods of the present disclosure, a certain minimum fraction of the nucleic acid fragment sequences collected from the solid tumor sample of the test subject that uniquely map to the given allele position must exhibit the alternate allele. For example, consider the case where the alternate allele value for a particular allele position is "T" and the reference allele value for that allele position is "C." In this instance, a certain minimum fraction of the nucleic acid fragment sequences collected from the solid tumor sample of the test subject that uniquely map to the given allele position must exhibit the alternate allele "T." In some embodiments, this minimum fraction is 0.20. In some embodiments, this minimum fraction is 0.25. In some embodiments, this minimum fraction is 0.10, 0.15, 0.025, 0.30, 0.35, 0.40, or 0.45. In some embodiments, this minimum fraction is between 0.05 and 0.55.

In another filtering example, only those allele positions that have a certain minimum coverage across the second plurality of nucleic acid fragment sequences are accepted for use in calculating tumor fraction. In some such embodiments, the minimum coverage is 10, 11, 12, 13, 14, 15, 16, 17, 18, 19, 20, 21, 22, 23, 24, 25, 26, 27, 28, 29, or 30.

In some embodiments, the plurality of allele positions is filtered on both the minimum allele fraction and the coverage discussed above.

In some embodiments, the plurality of allele positions are filtered to remove allele positions that may be attributed to germline mutation in order to assure that the plurality of allele positions are somatic variations and are not arising in genomic regions that are known to give rise to germline variations. In some embodiments this is done by the removal of germline-variants private to the subject as marked by Freebayes (Garrison and Marth, 2012, "Haplotype-based variant detection from short-read sequencing," arXiv.org>q-bio>arXiv:1207.3907, which is hereby incorporated by reference). In some embodiments, this is done by blacklisting of known germline variants using gnomAD (Karczewski et al., 2019, "Variation across 141,456 human exomes and genomes reveals the spectrum of loss-of-function intolerance across human protein-coding genes," dx.doi.org/10.1101/531210, which is hereby incorporated by reference) and/or dbSNP (Wheeler et al., 2007, "Database resources of the National Center for Biotechnology Information," Nucleic Acids Res. 35 (Database issue): D5-12. doi: 10.1093/nar/gkl1031, which is hereby incorporated by reference).

Just as the plurality of allele positions is filtered, in some embodiments the first plurality and the second plurality of nucleic acid fragment sequences are independently filtered. In some embodiments, only the second plurality of nucleic acid sequence fragments is filtered. In some embodiments, only the first plurality of nucleic acid sequence fragments is filtered. In some embodiments, both the first plurality of nucleic acid sequence fragments and the second plurality of nucleic acid sequence fragments is filtered. In some embodiments, the first plurality and/or the second plurality of nucleic acid fragment sequences is filtered based on any combination of (i) whether or not each nucleic acid fragment sequence is supported by a forward and a reverse nucleic acid sequence read of the original nucleic acid fragment, (ii) base quality of the sequence reads supporting the nucleic acid fragment sequence at a given allele position, and the mapping quality of the sequence reads supporting the nucleic acid fragment sequence (e.g., Phred score) to the allele position. For disclosure on mapping quality, see Li et al., 2009, "The Sequence Alignment/Map format and SAMtools," Bioinformatics 25, pp. 2078-2079, which is hereby incorporated by reference. In some embodiments, these filtering criteria are independently applied at each allele position in the plurality of allele positions so that the composition of the first and/or second plurality of nucleic acid sequence fragments varies from allele position to allele position (e.g., if the filtering filters out a given nucleic acid sequence fragment at one allele position, the given nucleic acid sequence fragment can still potentially be used at another allele position provided the given nucleic acid sequence fragment satisfies the filtering criterion at the other allele position). In some embodiments, these filtering criteria are applied at each allele position in the plurality of allele positions so that the composition of the first and/or second plurality of nucleic acid sequence fragments does not vary from allele position to allele position (e.g., if the filtering filters out a given nucleic acid sequence fragment at one allele position, the given nucleic acid sequence fragment is not used for any of the allele positions).

In some embodiments, the allele positions are selected based on analysis of solid tumor samples. An allele position can have any suitable number of alleles, which can range from a reference allele with a single alternative allele, a reference allele with two alternative alleles, to a reference allele with 1000 or more variant alleles.

The allele positions can be variants of a suitable type. Thus, in some embodiments, with reference to block 230, each allele position in the plurality of allele positions can arise from a single nucleotide variation (SNV). In some embodiments, the plurality of allele positions consists of between 100 allele positions to 10,000,000 allele positions, each of which has a SNV. In some embodiments, the plurality of allele positions consists of between 2 allele positions and 200 SNV allele positions, each of which has a SNV. In some embodiments, for each respective allele position, there is a reference value (wild type value) and a main alternate value for the polymorphism arising at the allele position.

In some embodiments, as shown at block 232, the plurality of allele positions comprises a methylation pattern allele position. The plurality of variant allele counts for the subject comprises variant allele counts for at least one variant or for at least two variants at each allele position in the plurality of allele positions, as shown at block 234 of FIG. 3B.

Blocks 236-240.

The method continues with the evaluation of variants each of which occur at a different allele position in the genome. In some embodiments, each of these variants is a single nucleotide variant associated with a predetermined genomic location, an insertion mutation associated with predetermined genomic location, a deletion mutation associated with a predetermined genomic location, a somatic copy number alteration, a nucleic acid rearrangement associated with a predetermined genomic locus, or an aberrant epigenetic feature such as an aberrant methylation pattern associated with a predetermined genomic location. In some embodiments, each of these variants is an epigenetic feature, such as methylation, as disclosed in Example 4.

In some embodiments, whole-genome bisulfite sequencing (WGBS) is used to procure the first or second plurality of nucleic acid fragment sequences. For example, in some embodiments, the WGBS, at a coverage rate of 34×, of the CCGA-1 study described in Example 3 is used. In some embodiments, the coverage rate of such (WGBS) is 100× or less, 50× or less or between 30× and 200×. In typical embodiments, sequence read unique molecule indicators (UMIs) and endpoint positions were used to define bags of likely PCR duplicates, which were collapsed into bags in order to arrive at such coverage statistics. In some embodiments, a single sequence read from each bag is used in the disclosed analysis. In some embodiments, this single sequence read is a consensus sequence read. In some embodiments, this single sequence read is any sequence read in a bag. Thus, in this way 100× refers to the number of nucleic acid fragment sequences that cover each allele position, rather than the number of sequence reads that cover each sequence position, since such sequence reads can include PCR duplicates. Such sequence reads, from the collapsed bags, can be used to analyze for epigenetic features such as aberrant methylation patterns (e.g., alleles comprising at least five CpG sites that are on average hyper-methylated or hypo-methylated in the cancer or non-cancer control state, where hyper-methylated is, for example, greater than 0.9 and hypo-methylated is less than 0.1 across the allele across the cancer or non-cancer control cohort), sequencing variations (e.g., single nucleotide variants, insertions, deletions) or copy number variations. In some embodiments where nucleic acid fragment sequences are used to identify single nucleotide variants, variants that are either C→T or T→C between non-cancer and cancer are not used because of the conversion of non-methylated cytosines to uracil bases, which read out as thymidine in sequencing; for example, by including a variant noise filter in the noise model. In some embodiments where nucleic acid fragment sequences are used to identify single nucleotide variants, variants that are either C→T or T→C between non-cancer and cancer are in fact used provided that the bisulfite treatment of the DNA converts the unmethylated cytosines to uracils without converting the methylated cytosines. This can be done, for example, when a commercial kit such as the EZ DNA Methylation™—Gold, EZ DNA Methylation™—Direct or an EZ DNA Methylation™—Lightning kit (available from Zymo Research Corp (Irvine, CA)) is used for the bisulfite conversion. In some embodiments, the noise model is modified to include one or more parameters to account for the strand origin of a nucleic acid fragment sequences (e.g., whether the nucleic acid fragment sequence is from the forward or reverse strand of the original target molecule). Additional factors can be taken into consideration, including but not limited to trinucleotide context, position in the fragment of the variant, and different kinds of other covariates.

In some embodiments, the method further comprises determining a variant allele count $s_{v_i,t}$ for each respective allele position $v_i$ in the plurality of allele positions using the first plurality of nucleic acid fragment sequences, thereby calculating a plurality of variant allele counts for the subject, as shown at block 236 of FIG. 3B.

The determining can comprise, with reference to block 238, determining a number of nucleic acid fragment sequences in the first plurality of nucleic acid fragment sequences having a respective variant allele at each respective allele position in the plurality of allele positions. For example, if the reference allele for a given allele position is "G" and the alternative allele for the particular allele position is "T," the number of nucleic acid fragment sequences in the first plurality of nucleic acid fragment sequences having the value "T" at given allele position is the number of nucleic acid fragment sequences that map to the given allele position and have a value of "T" at the given allele position. In some embodiments, the determining can comprise, with reference to block 240, aligning a nucleic acid fragment sequence in the first plurality of nucleic acid fragment sequences to a region in a reference genome in order to determine whether the nucleic acid fragment sequence uniquely maps to a particular allele position and includes the respective variant allele at that allele position.

In some embodiments, a respective nucleic acid fragment sequence in the first plurality of nucleic acid fragment sequences is deemed to support a variant allele in the plurality of alleles when the respective nucleic acid fragment sequence (i) encompasses or is within a genomic position associated with the variant allele and (ii) contains all or a portion of the variant allele. In some embodiments, a respective nucleic acid fragment sequence in the first plurality of nucleic acid fragment sequences is deemed to not support the variant allele in the plurality of alleles when the respective nucleic acid fragment sequence (i) encompasses or is within a genomic position associated with the variant allele and (ii) does not contain all or a portion of the variant allele. For instance, consider the case of a variant allele that is associated with a particular genomic location. Those nucleic acid fragment sequences that encompass or are within this particular genomic location are evaluated to determine whether they support the variant allele. In other words, those nucleic acid fragment sequences that uniquely map onto this particular genomic location are evaluated to determine whether they support the variant allele. If a nucleic acid fragment sequence encompasses or is within a genomic position and encodes the allele variant, the nucleic acid fragment sequence is deemed to support the variant allele. For instance, in the case where the variant is a single nucleotide variation, those nucleic acid fragment sequences that both (i) encompass the genomic location corresponding to this single nucleotide variation and (ii) have the single nucleotide variation will be deemed to support the variant allele. In another example, in the case where the variant allele is an insertion that is longer than the average length of the nucleic acid fragment sequences, those nucleic acid fragment sequences that are within the genomic location corresponding to this allele position (e.g. map into the locus of the genome where this insertion is to be bound) and (ii) have all or a portion of the insertion will be deemed to support the variant allele.

Nucleic acid fragment sequences in the second plurality of nucleic acid fragment sequences can be analyzed similarly, to determine whether each nucleic acid fragment sequence in the second plurality of nucleic acid fragment sequences is deemed to support a variant allele in the plurality of variant alleles at each allele position.

In some embodiments, the first plurality of nucleic acid fragment sequences is used to identify support for each variant allele by aligning each nucleic acid fragment sequence in the first plurality of nucleic acid fragment sequences to a region in a reference genome in order to determine whether the nucleic acid fragment sequence contains all or a portion of a variant allele. The alignment of a nucleic acid fragment sequence to a region in a reference genome involves matching sequences from one or more nucleic acid fragment sequences to that of the reference genome based on complete or partial identity between the sequences. Alignments can be done manually or by a computer algorithm, examples including the Efficient Local Alignment of Nucleotide Data (ELAND) computer program distributed as part of the Illumina Genomics Analysis pipeline. The alignment of a nucleic acid fragment sequence to the reference genome can be a 100% sequence match. In some embodiments, an alignment is less than a 100% sequence match (e.g., non-perfect match, partial match, partial alignment). In some embodiments, an alignment comprises a mismatch. In some embodiments, an alignment comprises 1, 2, 3, 4 or 5 mismatches. In some embodiments, such mismatches are indicative of, and support, a variant allele. For instance, in the case where a variant allele is a single nucleotide variant at a given position in the genome, an alignment of a nucleic acid fragment sequence that contains the variant to the genome is expected to have a mismatch between the nucleic acid fragment sequence and the genome at the position in the genome associated with the single nucleotide variant. Two or more sequences can be aligned using either strand. In some embodiments, a nucleic acid sequence is aligned with the reverse complement of another nucleic acid sequence.

In some embodiments, the first plurality of nucleic acid fragment sequences is used to identify support for each variant allele using a variant calling process such as HaplotypeCaller. See, for example, McKenna et al., 2010, "The Genome Analysis Toolkit: a MapReduce framework for analyzing next-generation DNA sequencing data," Genome Research 20: 1297-303; and Van der Auwera, 2013, "From FastQ Data to High-Confidence Variant Calls: The Genome Analysis Toolkit Best Practices Pipeline," Current Protocols In Bioinformatics 43:11.10.1-11.10.33 each of which is hereby incorporated by reference.

In some embodiments, the first plurality of nucleic acid fragment sequences is used to identify support for each variant allele using VarScan. See, for example, Koboldt et al., 2012, "VarScan 2: Somatic mutation and copy number alteration discovery in cancer by exome sequencing," Genome Research, PMID: 22300766; and Koboldt et al., 2009, "VarScan: variant detection in massively parallel sequencing of individual and pooled samples," Bioinformatics 25 (17): 2283-5, each of which is hereby incorporated by reference.

In some embodiments, the first plurality of nucleic acid fragment sequences is used to identify support for each variant using Strelka. See, for example, Kim, et al., 2017, "Strelka2: Fast and accurate variant calling for clinical sequencing applications," bioRxiv doi: 10.1101/192872, which is hereby incorporated by reference.

In some embodiments, the first plurality of nucleic acid fragment sequences is used to identify support for each variant allele using SomaticSniper. See, for example, Larson et al., 2012, "SomaticSniper: identification of somatic point mutations in whole-genome sequencing data," Bioinformatics 28(3), pp. 311-317, which is hereby incorporated by reference.

In some embodiments, the first plurality of nucleic acid fragment sequences is used to identify support for each variant allele by determining one or more methylation state vectors as disclosed, for example, in U.S. Patent Application No. 62/642,480, entitled "Methylation Fragment Anomaly Detection," filed Mar. 13, 2018, which is hereby incorporated by reference.

It should be appreciated that the second plurality of nucleic acid fragment sequences can be used to identify support for each variant allele in an allele position from a plurality of allele positions in the manner similar to one or more of any of the above techniques described in connection with the first plurality of nucleic acid fragment sequences.

In some embodiments, the nucleic acid fragment sequences are pre-processed to correct biases or errors using one or more methods such as normalization, correction of GC biases, and/or correction of biases due to PCR overamplification.

Targeted Plasma Assay.

In some embodiments, the subject is a human and the first plurality of nucleic acid fragment sequences 122 taken from a liquid biological sample are part of a targeted plasma assay. That is, the biological sample is plasma from the subject and the nucleic acid fragment sequences 122 are compared to a targeted panel of allele positions (loci) of the targeted plasma assay in order to quantify variants. In some such embodiments, the targeted panel of allele positions is between 450 and 500 fifty allele positions. In some embodiments, the targeted panel of allele positions is within the range of 500±5 allele positions, within the range of 500±10 allele positions, or within the range 500±25 allele positions. In some embodiments, the first plurality of nucleic acid fragment sequences 122 taken from the biological sample have less than 5,000× coverage for this targeted panel of allele positions, though other coverages can be used. In some such embodiments, the targeted plasma assay measures abundance of single nucleotide variants in the targeted panel of allele positions, insertions in the targeted panel of allele positions, deletions in the targeted panel of allele positions, somatic copy number alterations (SCNAs) in the targeted panel of allele positions, or re-arrangements affecting the targeted panel of allele positions. In some embodiments, at least some of the allele positions in the targeted panel are within the coding or noncoding portions of genes. In some embodiments, at least some of the allele positions in the targeted panel are not associated with particular genes. In some embodiments, the targeted panel of allele positions is custom built for a particular subject. In some embodiments, the targeted panel of allele positions is custom built for a group of subjects that share a physiological relationship (e.g., they all have the same cancer, etc.).

Targeted White Blood Cell Assay.

In some embodiments, the subject is a human and the first plurality of nucleic acid fragment sequences 122 taken from a liquid biological sample are part of a targeted white blood cell assay. That is, the biological sample is white blood cells from the subject and the nucleic acid fragment sequences 122 are compared to a targeted panel of genes of the targeted white blood cell assay in order to identify variants. In some such embodiments, the targeted panel of genes is between 450 and 500 fifty genes. In some embodiments, the targeted panel of genes is within the range of 500±5 genes, within the range of 500±10 genes, or within the range 500±25 genes. In some embodiments, the first plurality of nucleic acid fragment sequences 122 taken from the biological sample have less 5,000×, 1,000×, 500×, 100×, 50×, or 10× coverage. In some of such embodiments, the targeted white blood cell assay looks for single nucleotide variants in the targeted panel of genes, insertions in the targeted panel of genes, deletions in the targeted panel of genes, or somatic copy number alterations (SCNAs) in the targeted panel of genes.

Whole Genome Plasma Assay.

In some embodiments, the subject is human and the first plurality of nucleic acid fragment sequences 122 taken from the liquid biological sample are part of a whole genome plasma assay. That is, the biological sample is plasma from the subject and the nucleic acid fragment sequences 122 are compared to the entire human genome in order to identify variants. In some embodiments, the first plurality of nucleic acid fragment sequences 122 taken from the biological sample have at least 10× but less than 50,000× coverage for a targeted panel of genes. In some such embodiments, the targeted panel of genes is between 450 and 500 fifty genes. In some embodiments, the targeted panel of genes is within the range of 500±5 genes, within the range of 500±10 genes, or within the range 500±25 genes. In some embodiments, the whole genome assay plasma looks for somatic copy number alterations (SCNAs) or fragmented features in the genome.

Whole-Genome White Blood Cell Assay.

In some embodiments, the subject is human and the first plurality of nucleic acid fragment sequences 122 taken from the liquid biological sample are part of a whole genome white blood cell assay. That is, the liquid biological sample is white blood cells from the subject and the nucleic acid fragment sequences 122 are compared to the entire human genome in order to identify variants. In some embodiments, the first plurality of nucleic acid fragment sequences 122 obtained from the biological sample have at least 10× coverage but less than 5,000× coverage for a targeted panel of genes. In some such embodiments, the targeted panel of genes is between 450 and 500 fifty genes. In some embodiments, the targeted panel of genes is within the range of 500±5 genes, within the range of 500±10 genes, or within the range 500±25 genes. In some embodiments, the whole genome white blood cell assay looks for somatic copy number alterations (SCNAs) or fragmented features in the genome.

Whole Genome Bisulfite Sequencing Assay.

In some embodiments, the subject is human and the first plurality of nucleic acid fragment sequences 122 are obtained through bisulfite sequencing and are evaluated for variants on a genome wide basis. In some embodiments, the whole genome bisulfite sequencing assay looks for variants in methylation patterns in the genome. See, for example, U.S. Patent Application No. 62/642,480, entitled "Methylation Fragment Anomaly Detection," filed Mar. 13, 2018, which is hereby incorporated by reference. In some embodiments, the whole genome bisulfite sequencing assay looks for variations in methylation patterns in the genome. See, for example, Example 7. See also, United States Patent Publication No. 20190287652, entitled "Anomalous Fragment Detection and Classification," filed Mar. 13, 2019, which is hereby incorporated by reference. In some embodiments, enzymatic conversion processes may be used to treat the nucleic acids prior to sequencing, which can be performed in various ways. An example of a bisulfite-free conversion is described in Liu et al. that describe a bisulfite-free and base-resolution sequencing method, TET-assisted pyridine borane sequencing (TAPS), for non-destructive and direct detection of 5-methylcytosine and 5-hydroxymethylcytosine without affecting unmodified cytosines. See, Liu et al., 2019, "Bisulfite-free direct detection of 5-methylcytosine and 5-hydroxymethylcytosine at base resolution," Nat Biotechnol. 37, pp. 424-429, which is hereby incorporated by reference herein in its entirety. In some embodiments, regardless of the specific enzymatic conversion approach, only the methylated cytosines are converted.

Targeted Methylation Assay.

In some embodiments, the subject is a human and the first plurality of nucleic acid fragment sequences 122 taken from a liquid biological sample are part of a targeted methylation assay. Nucleic acid samples (e.g., cfDNA or sheared genomic DNA samples) are processed to capture methylation signals (e.g., at CpG sites) and enriched using nucleic acid probes based on selected genomic regions. As disclosed herein, the enrichment probes can be between 10s to 1000s of base pairs in length. The number of probes used can range from 10,000s to over 1,000,000. The probes can collectively cover 1 megabase or less of a target genome, 2 megabase or less of a target genome, 4 megabase or less of a target genome, 6 megabase or less of a target genome, 8 megabase or less of a target genome, 10 megabase or less of a target genome, 12 megabase or less of a target genome, 15 megabase or less of a target genome, 20 megabase or less of a target genome, 30 megabase or less of a target genome, 40 megabase or less of a target genome, or up to 50 megabase of a target genome. In some embodiments, the probes target over 50 megabase of a target genome.

Similar to whole genome methylation sequencing, a targeted DNA methylation sequencing can be performed in various ways. Different enzymatic treatments and combinations with chemical treatment(s) can convert either methylated cytosines or unmethylated cytosines. For example, in some embodiments, the targeted DNA methylation sequencing detects one or more 5-methylcytosine (5mC) and/or 5-hydroxymethylcytosine (5hmC) in the plurality of nucleic acids. As another example, the targeted DNA methylation sequencing may comprise conversion of one or more unmethylated cytosines or one or more methylated cytosines, in the plurality of nucleic acids, to a corresponding one or more uracils. As another example, in some embodiments, the targeted DNA methylation sequencing may comprise conversion of one or more unmethylated cytosines, in the plurality of nucleic acids, to a corresponding one or more uracils, and the DNA methylation sequence reads out the one or more uracils as one or more corresponding thymines. In some embodiments, the targeted DNA methylation sequencing comprises conversion of one or more methylated cytosines, in the plurality of nucleic acids, to one or more corresponding uracils, and the DNA methylation sequence reads out the one or more 5mC or 5hmC as one or more corresponding thymines.

In a targeted methylation sequencing process, probes are used to enrich the nucleic acid samples. In some embodiments, probes may be designed such that they bind to sequences after cytosines in methylated CpG sites or unmethylated CpG sites are converted (e.g., in a chemical or enzymatic conversion process). In embodiments in which methylation sequencing is used, sequences of the probes may not be complementary to the corresponding genomic sequence but rather to the sequences of the converted DNA fragments.

Blocks 242-244.

In some embodiments, the method in accordance with embodiments of the present disclosure determines a coverage $s_{v_i}$ for each respective allele position $v_i$ in the plurality of allele positions using the first plurality of nucleic acid fragment sequences, thereby calculating a plurality of coverages for the subject; as shown at block 242 of FIG. 3B.

In some embodiments, the respective estimated smoothed noise rate $ev_i$ for a respective allele position $v_i$ is calculated as:

$$ev_i = \frac{(n_{v_i,t} + b)}{(n_{v_i} + 2b)}$$

where $n_{v_i,t}$ is a variant allele count at position $v_i$ over the cohort of non-cancer samples, $n_{v_i}$ is coverage of nucleic acid fragment sequences at $v_i$ summed over the cohort of non-cancer samples, and b is a positive value representing a pseudo-count.

The respective estimated smoothed noise rate is determined for each allele position and it reflects a distribution of tumor variant allele counts to other alleles in a non-cancer sample, at that position. In other words, an estimated smoothed noise rate for an allele position specifies how often the tumor allele appears at this position in non-cancer samples. The estimated smoothed noise rate $ev_i$ for a respective allele position $v_i$ can vary from 0 to 1, where values closer to 0 indicate that the allele is more likely indicative of a tumor, and values closer to 1 indicate that the allele is unlikely coming from a tumor.

Block 246.

In some embodiments, the described method comprises determining a solid variant allele fraction $a_i$ for each respective allele position $v_i$ in the plurality of allele positions using the second plurality of nucleic acid fragment sequences, thereby calculating a plurality of solid variant allele fractions.

In some embodiments, determination of the solid variant allele fraction $a_i$ for a respective allele position $v_i$ in the plurality of allele positions using the second plurality of nucleic acid fragment sequences comprises determining a ratio of a number of nucleic acid fragment sequences in the second plurality of nucleic acid fragment sequences having a respective variant at the respective allele position in the plurality of allele positions to a total number of nucleic acid fragment sequences in the second plurality of nucleic acid fragment sequences that map to the respective allele position. Thus, consider the case where there are 100 nucleic acid fragment sequences in the second plurality of nucleic acid fragment sequences that map to the respective allele position $v_i$ and that 10 of the nucleic acid fragment sequences contain the alternate allele value and 90 of the nucleic acid fragment sequences contain the reference allele value at allele position $v_i$ In this example, the solid variant allele fraction $a_i$ for the allele position $v_i$ is:

$$\frac{(\text{No. alternative allele fragments})}{\left(\begin{array}{l}\text{No. reference allele value fragments} + \\ \text{No. alternate allele value fragments}\end{array}\right)} = \frac{(10)}{(90+10)} = 0.10.$$

In some embodiments, there is more than one alternative allele value at a respective allele position $v_i$. In some embodiments, the solid variant allele fraction $a_i$ is in reference to only one of these alternative allele values. Thus, consider the case where the observed allele values for a respective allele position $v_i$ is "A," "T," and "G," where "A" is the reference allele value, "T" is alternative allele value 1, and "G" is alternative allele value 2. In such instances, the solid variant allele fraction $a_i$ is for one of these alternative allele values, typically the more prevalent one. So, consider the case where there are again 100 nucleic acid fragment sequences in the second plurality of nucleic acid fragment sequences that map to the respective allele position $v_i$, that 20 of the nucleic acid fragment sequences contain the alternate allele value 1 ("T"), 15 of the nucleic acid fragment sequences contain the alternate allele value 2 ("G"), and the remainder (65) of the nucleic acid fragment sequences contain the reference allele value ("A") at allele position $v_i$ Here, the solid variant allele fraction $a_i$ is in reference to only one of the two alternative allele values. Supposing that the solid variant allele fraction $a_i$ is in reference to the alternate allele value 1 ("T"), there are two possible ways to compute the solid variant allele fraction $a_i$ for allele position $v_i$ and both such ways are within the scope of the present disclosure. In the first approach to computing the solid variant allele fraction $a_i$ for the respective allele position $v_i$, the solid variant allele fraction $a_i$ is the ratio of (a) the number of fragments (in the second plurality of fragments mapping to the allele position $v_i$) that have the alternate allele value 1 ("T") to (b) the number of fragments (in the second plurality of fragments mapping to the allele position $v_i$) that have either the alternate allele value 1 ("T") or the reference allele value ("A"):

$$\frac{(\text{No. }alt.\text{ 1 allele fragments})}{\left(\begin{array}{l}\text{No. reference allele value fragments} + \\ \text{No. }alt.\text{ 1 allele value fragments}\end{array}\right)} = \frac{(15)}{(65+15)} = .1875.$$

In the second approach to computing the solid variant allele fraction $a_i$ for a respective allele position $v_i$, the solid variant allele fraction $a_i$ is (a) the ratio of the number of fragments (in the second plurality of fragments mapping to the allele position $v_i$) that have the alternate allele value 1 ("T") to (b) the number of fragments (in the second plurality of fragments mapping to the allele position $v_i$) that map to the allele position (e.g., the total coverage of the second plurality of fragments at allele position $v_i$):

$$\frac{(\text{No. }alt.\text{ 1 allele fragments})}{(\text{No. fragments that map to allele position }v_i)} = \frac{(15)}{(100)} = 0.150.$$

Blocks 254-284.

In some embodiments, with reference to block 254 of FIG. 3D, the method comprises using $D_s$, where $D_s$ comprises (i) the plurality of estimated smoothed noise rates, (ii) the plurality of variant allele counts, (iii) the plurality of coverages, and (iv) the plurality of solid variant allele fractions to calculate the tumor fraction f of the subject. In some embodiments this is done by computing $D_s$ as part of a grid search, a Markov chain Monte Carlo sampling (See, e.g., Geyer, 1992, "Practical Markov Chain Monte Carlo," Statistical Science 7(4), pp. 473-483, which is hereby incorporated by reference), or an Expectation-Maximization algorithm (See, e.g., Moon, 1996, "The expectation-maximization algorithm," IEEE Signal Processing Magazine 13(6)). For instance, in the case where a grid search is used, the tumor fraction f of the subject is determined by computing $D_s$, for each respective candidate tumor fraction $f_c$ in a plurality of candidate tumor fractions, and selecting the tumor fraction $f_c$ in the plurality of candidate tumor fractions as the tumor fraction f of the subject that has the highest $P(f_c|D_s)$.

With reference to block 256, in some embodiments, a likelihood that a given (calculated) tumor fraction $f_c$ is a true tumor fraction f of the subject in the form of a posterior distribution of the calculated tumor fraction $f_c$ given $D_s$ by evaluating:

$$P(f_c|D_s) \propto P(D_s|f_c)P(f_c),$$

where $P(f_c)$ is a prior, $P(f_c|D_s)$ is a posterior distribution of the calculated tumor fraction $f_c$ given $D_s$, and $P(D_s|f_c)$ is a probability of observing $D_s$ given the calculated tumor fraction $f_c$.

In some embodiments, the prior is a non-informative prior (block 258). In some embodiments, the non-informative prior is Jeffrey's prior expressed as $f_c^{-1/2}(1-f_c)^{-1/2}$, as shown at block 260. In some embodiments, the prior is a Beta prior of the form:

$$P(f_c) = \frac{f_c^{\alpha-1}(1-f_c)^{\beta-1}}{B(\alpha,\beta)}$$

where $\alpha$ and $\beta$ are assigned to reflect prior information observed about $f_c$ in for the test subject or a cohort of subjects, and $$B(\alpha,\beta) = \int_0^1 t^{x-1}(1-t)^{y-1}dt.$$

In some embodiments $\alpha=1$ and $\beta=1$ and the prior is a uniform distribution.

In some embodiments, the prior is a logit normal prior, a logit T prior, a weakly informative prior or an uninformative prior.

In some embodiments, the prior is learned by jointly modeling the prior and the tumor fraction of multiple subjects.

In some embodiments, the prior is fixed at some value between 0 and 1 (e.g., at 0.5).

In some embodiments the prior is learned. For example, in some embodiments, the prior is a Bayesian logit normal prior that is learned using a hierarchical Bayesian model and Markov chain Monte Carlo sampling.

In some embodiments, the tumor fraction of the subject is deemed to be the median value of $P(f_c|D_s)$, as shown at block 262 of FIG. 3D. In some such embodiments, a credible interval is also calculated.

In some embodiments, the posterior distribution is calculated using a Bayesian inference for a binomial distribution, a negative binomial distribution, a Poisson distribution, or a beta binomial distribution.

For example, with reference to block 264, in some embodiments, the posterior distribution is calculated using a Bayesian inference for a binomial distribution. In some embodiments (block 266), the calculated tumor fraction $f_t$ of the subject is determined by calculating $$\log P(D_s \mid f_c) = \sum_{v_i} \log \text{Binomial}(s_{v_i,t}; s_{v_t}, f_c a_i + (1-f_c)ev_i),$$

where $s_{v_i,t}$ is a variant allele count at allele position $v_i$, $s_{v_i}$ is a coverage for $s_{v_i,t}$ at allele position $v_i$, and $a_i$ is a solid variant allele fraction at allele position $v_i$.

In the above expression, the binomial distribution probabilities are combined by adding them together when the probabilities are expressed in logarithmic space to arrive at the computed probability of observing $D_s$ given the calculated tumor fraction $f_c$.

Further, in some embodiments (block 268 of FIG. 3E), the using of $D_s$ to determine the tumor fraction of a subject comprises calculating:

$$\log P(D_s \mid f_c) = \sum_{v_i} \log \text{Binomial}(x_{v_i}; n_{v_i}, p_{v_i}) =$$

$$\sum_{v_i} \log \left( \frac{n_{v_i}!}{x_{v_i}! (n_{v_i} - x_{v_i})!} p_{v_i}^{x_{v_i}} (1-p_{v_i})^{n_{v_i}-x_{v_i}} \right)$$

where, $$\sum_{v_i} \log \left( \frac{n_{v_i}!}{x_{v_i}! (n_{v_i} - x_{v_i})!} p_{v_i}^{x_{v_i}} (1-p_{v_i})^{n_{v_i}-x_{v_i}} \right)$$

is normalized, $x_{v_i} = s_{v_i,t}$, $n_{v_i} = s_{v_i}$, $p_{v_i} = f_c a_i + (1-f_c)ev_i$, and $a_i$=the solid variant allele fraction at allele position $v_i$.

Figure 7A:
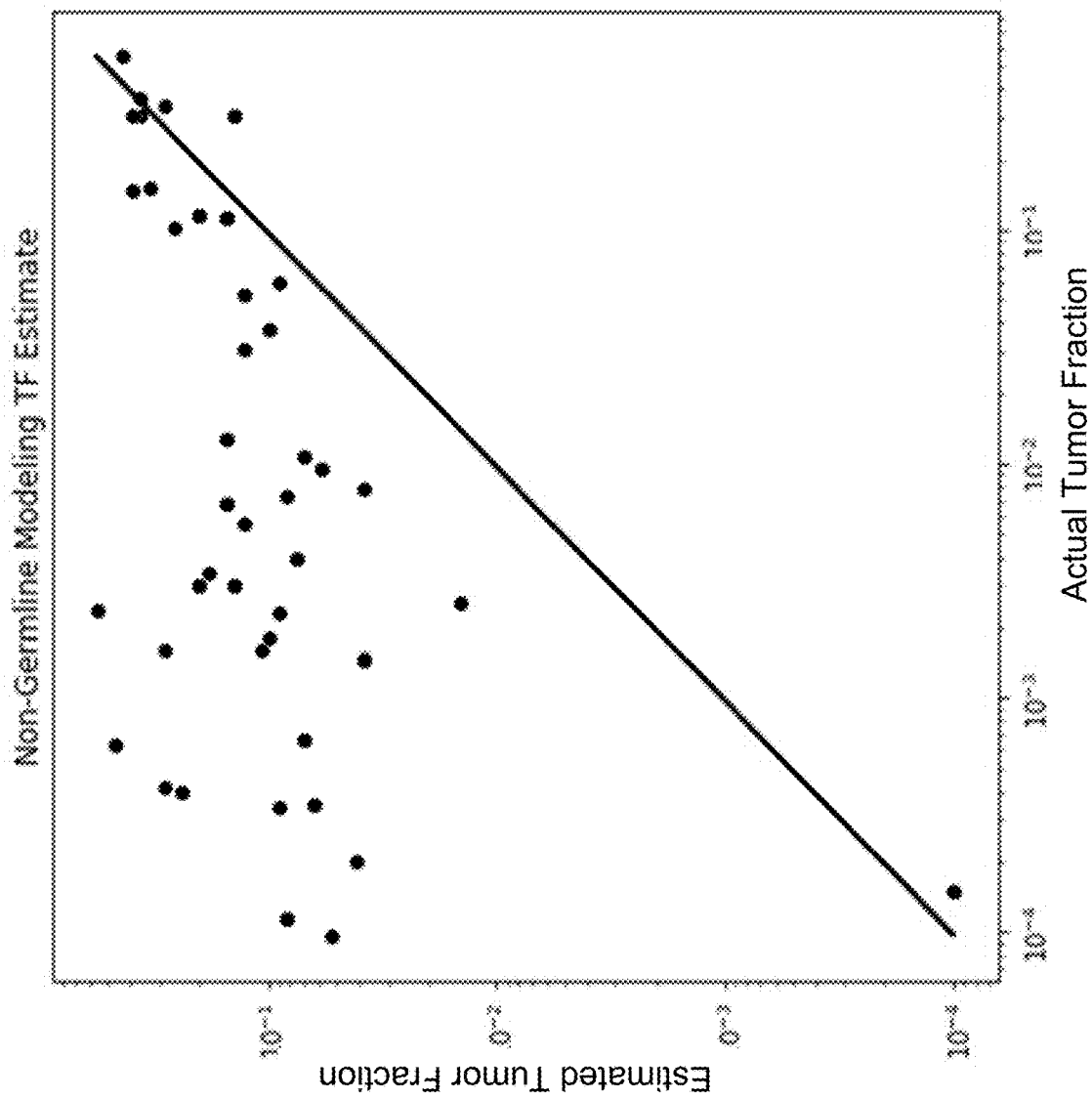
FIG. 7A is a plot illustrating a comparison of tumor fraction estimates of a number of patients with two samples (one liquid biopsy and one tumor biopsy), in which there is no correction for germline contamination when estimating patient tumor fraction in accordance with some embodiments of the present disclosure.

FIG. 7A illustrates how well the tumor fraction calculations using the expression $$\log P(D_s \mid f_c) = \sum_{v_i} \log \text{Binomial}(s_{v_i,t}; s_{v_t}, f_c a_i + (1-f_c)ev_i)$$

matches up to the actual tumor fractions of such subjects across a variety of cancers. That is, FIG. 7A is a plot illustrating a comparison of tumor fraction estimates of a number of patients, each with a various cancer, with two samples taken from each subject (one liquid and one a solid tumor), in which tumor fraction is estimated using $$\log P(D_s \mid f_c) = \sum_{v_i} \log \text{Binomial}(s_{v_i,t}; s_{v_i}, f_c a_i + (1-f_c)ev_i).$$

Figure 4:
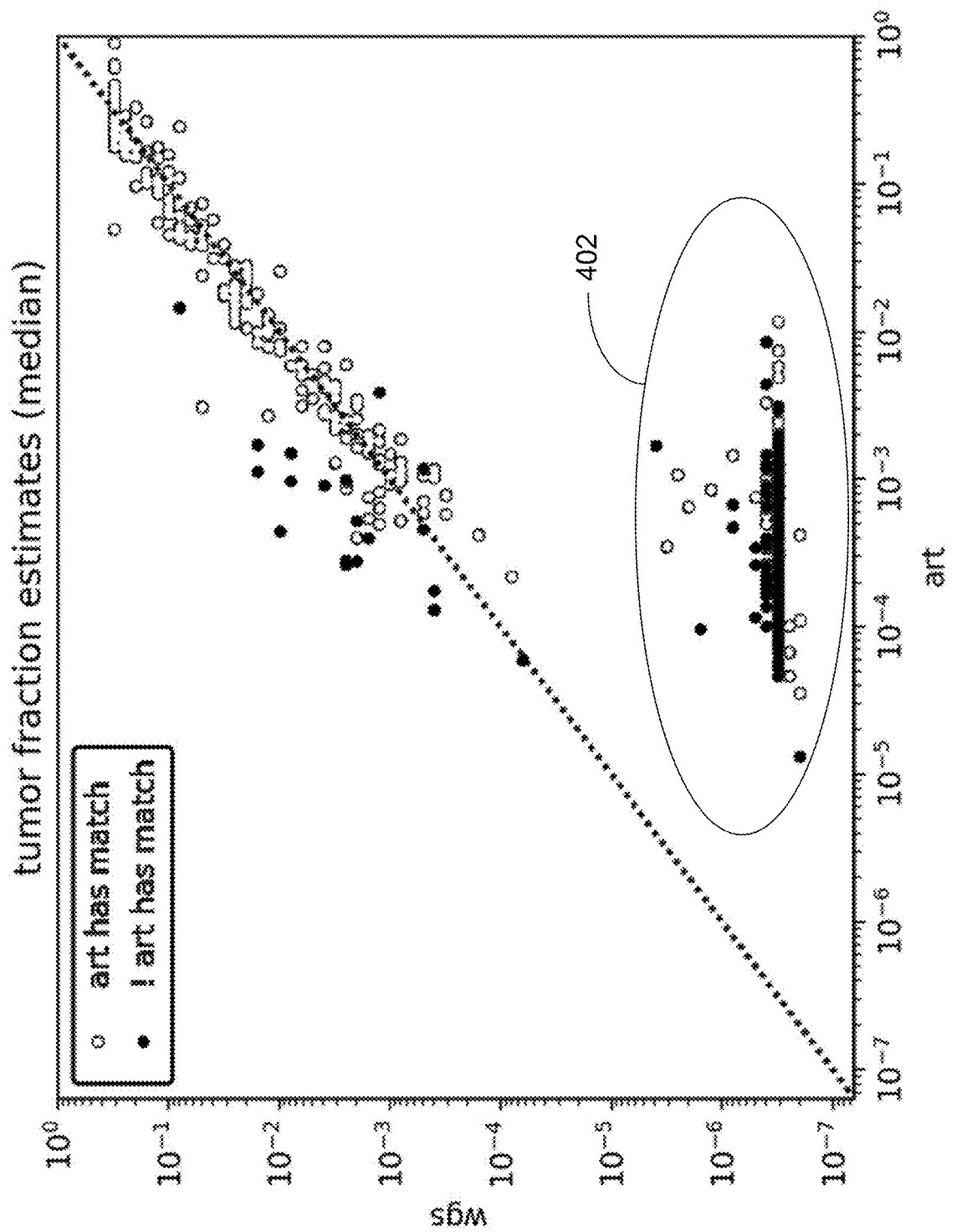
FIG. 4 is a plot illustrating a comparison of tumor fraction estimates determined using an approach in accordance with some embodiments of the present disclosure (based on sequencing data from whole genome sequencing: WGS) versus a different approach (based on targeted sequencing data: ART), in accordance with some embodiments of the present disclosure.
Figure 11:
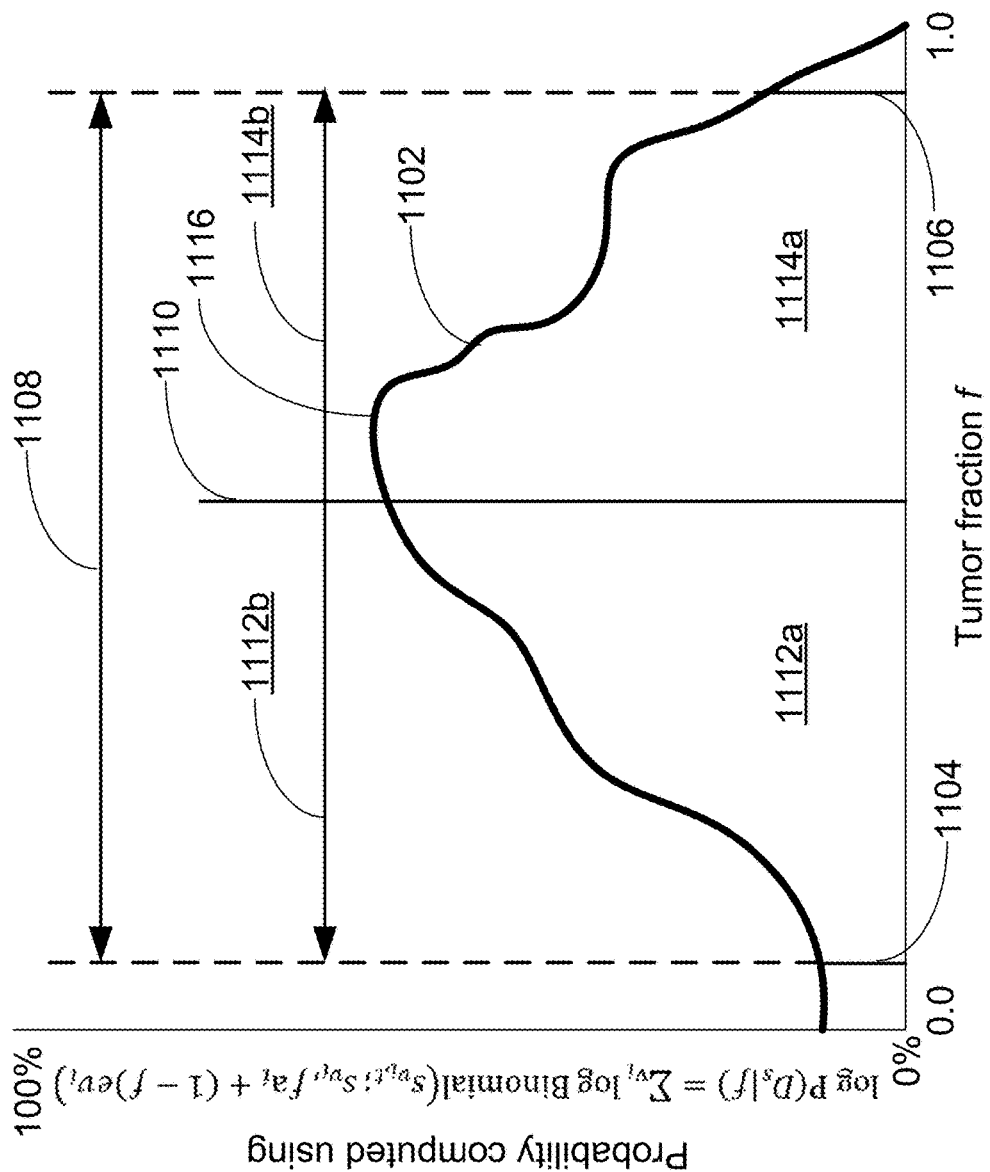
FIG. 11 illustrates the determination of a tumor fraction value from $P(D_s|f_c)$ in accordance with various embodiments of the present disclosure.

To obtain the estimated tumor fraction $f_c$ of each subject in FIG. 7A, $$P(D_s \mid f_c) = \sum_{v_i} \log \text{Binomial}(s_{v_i,t}; s_{v_i}, f_c a_i + (1-f_c)ev_i)$$

is evaluated in the same manner as described in Example 1 for FIG. 4, in conjunction with FIG. 11. In FIG. 7A, each dot represents a different subject.

Figure 7B:
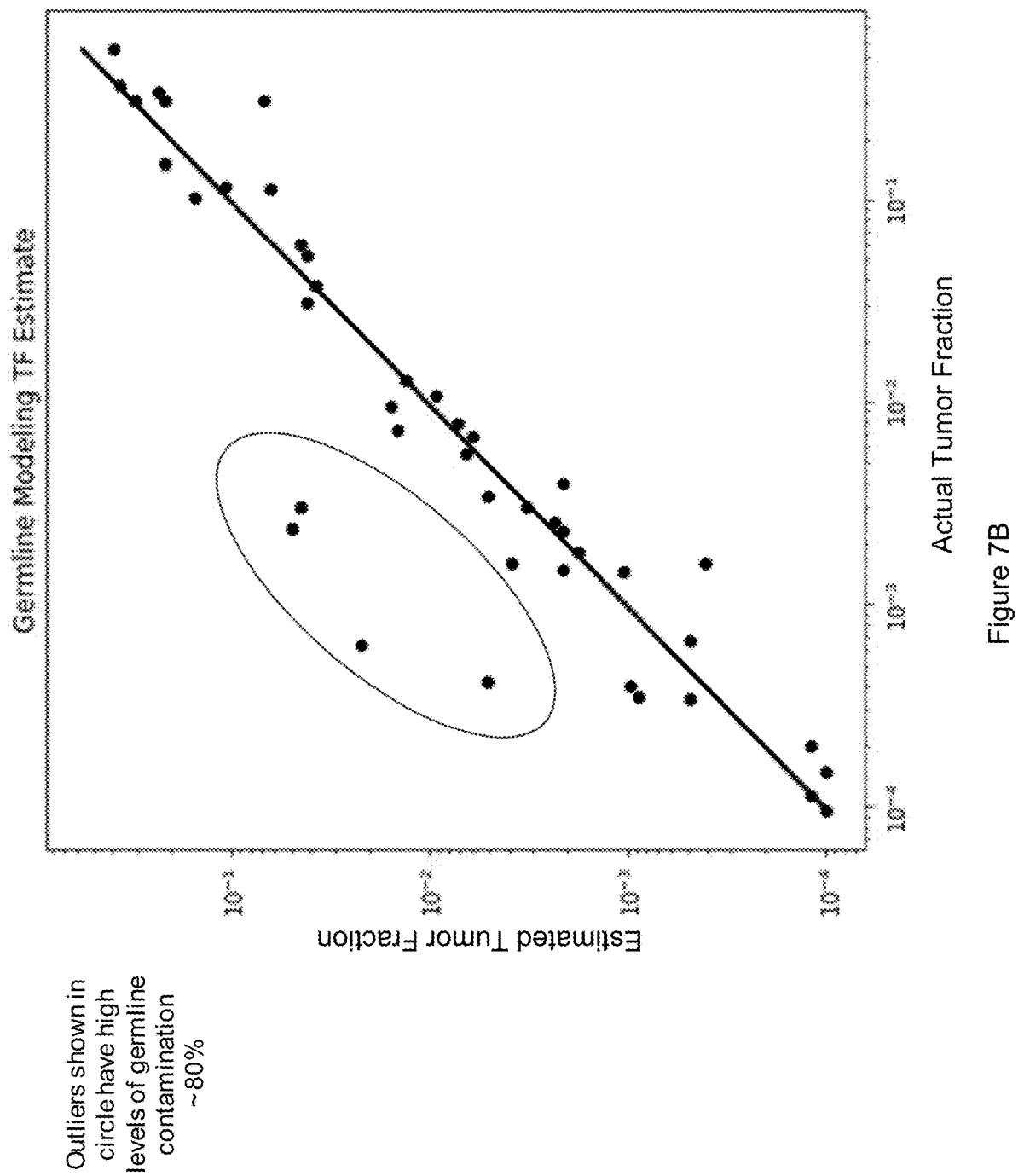
FIG. 7B is a plot illustrating a comparison of tumor fraction estimates of the patients of FIG. 7A, in which a correction is made for germline contamination when estimating patient tumor fraction in accordance with some embodiments of the present disclosure.

The method of estimating tumor fraction for FIG. 7A does not take into account germline contamination and, thus, the estimated tumor fraction for a number of subjects does not match the actual tumor fraction. This is visualized in FIG. 7A by the fact that a number of the circles do not fall on a straight line. To address this shortcoming, in some embodiments, tumor fraction is estimated using a form of $P(D_s|f_c)$ that accounts for germline contamination. FIG. 7B is a plot illustrating a comparison of tumor fraction estimates of the patients of FIG. 7A, in which a correction is made for germline contamination when estimating patient tumor fraction in accordance with some embodiments of the present disclosure. In particular, for FIG. 7B, tumor fraction is estimated as:

$$\log P(D_s \mid f_c) = \sum_{v_i} \log(Q*\text{Binomial}(s_{v_i,t}; s_{v_i}, f_c a_i + (1-f_c)ev_i) +$$
$$P*\text{Binomial}(s_{v_i,t}; s_{v_i}, T))$$

where $s_{v_i,t}$ is a variant allele count at allele position $v_i$, $s_{v_i}$ is a coverage for $s_{v_i,t}$ at allele position $v_i$, $a_i$ is a solid variant allele fraction at allele position $v_i$, Q and P are each positive and sum to one, and T is between 0.45 and 0.55. In particular, for FIG. 7B, T is 0.50, Q=0.5, and P=0.5. However, in some embodiments, the values of Q, P and T can be treated as hyperparameters that are optimized using a training population of subjects with known tumor fractions before the above expression for log $P(D_s|f_c)$ that takes into account germline contamination is evaluated.

In some embodiments, sequencing artifacts arise. Accordingly, to address this, in some embodiments, tumor fraction is calculating using a $P(D_s|f_c)$ that takes into account sequencing artifacts. For instance, in some such embodiments $P(D_s|f_c)$ is calculated as $$\log P(D_s \mid f_c) = \sum_{v_i} \log(Q*\text{Binomial}(s_{v_i,t}; s_{v_i}, f_c a_i + (1-f_c)ev_i) +$$
$$P*\text{Binomial}(s_{v_i,t}; s_{v_i}, V)).$$

In some embodiments, V is between 0.15 and 0.25. In some embodiments, V is 0.20. In some embodiments, Q and P are each positive and sum to one. In some embodiments, Q is 0.5 and P is 0.5. However, in some embodiments, the values of Q, P and V are treated as hyperparameters that are optimized using a training population of subjects with known tumor fractions before the above expression for log $P(D_s|f_c)$ that takes into sequencing artifacts is evaluated.

In some embodiments, false sequencing calls arise. Accordingly, to address this, in some embodiments, tumor fraction is calculating using a $P(D_s|f_c)$ that takes into account false sequencing calls. For instance, in some such embodiments, $P(D_s|f_c)$ is calculated as $$\log P(D_s \mid f_c) = \sum_{v_i} \log(Q *$$
$$\text{Binomial}(s_{v_i,t}; s_{v_i}, f_c a_i + (1 - f_c)ev_i) + )P * \text{Binomial}(s_{v_i,t}; s_{v_i}, Z)).$$

In some embodiments, Z is between 0.00 and 0.05. In some embodiments, Q and P are each positive and sum to one. In some embodiments, Q is 0.5 and P is 0.5. However, in some embodiments, the values of Q, P and Z are treated as hyperparameters that are optimized using a training population of subjects with known tumor fractions before the above expression for log $P(D_s|f_c)$ that takes into false sequencing calls is evaluated.

Figure 10:
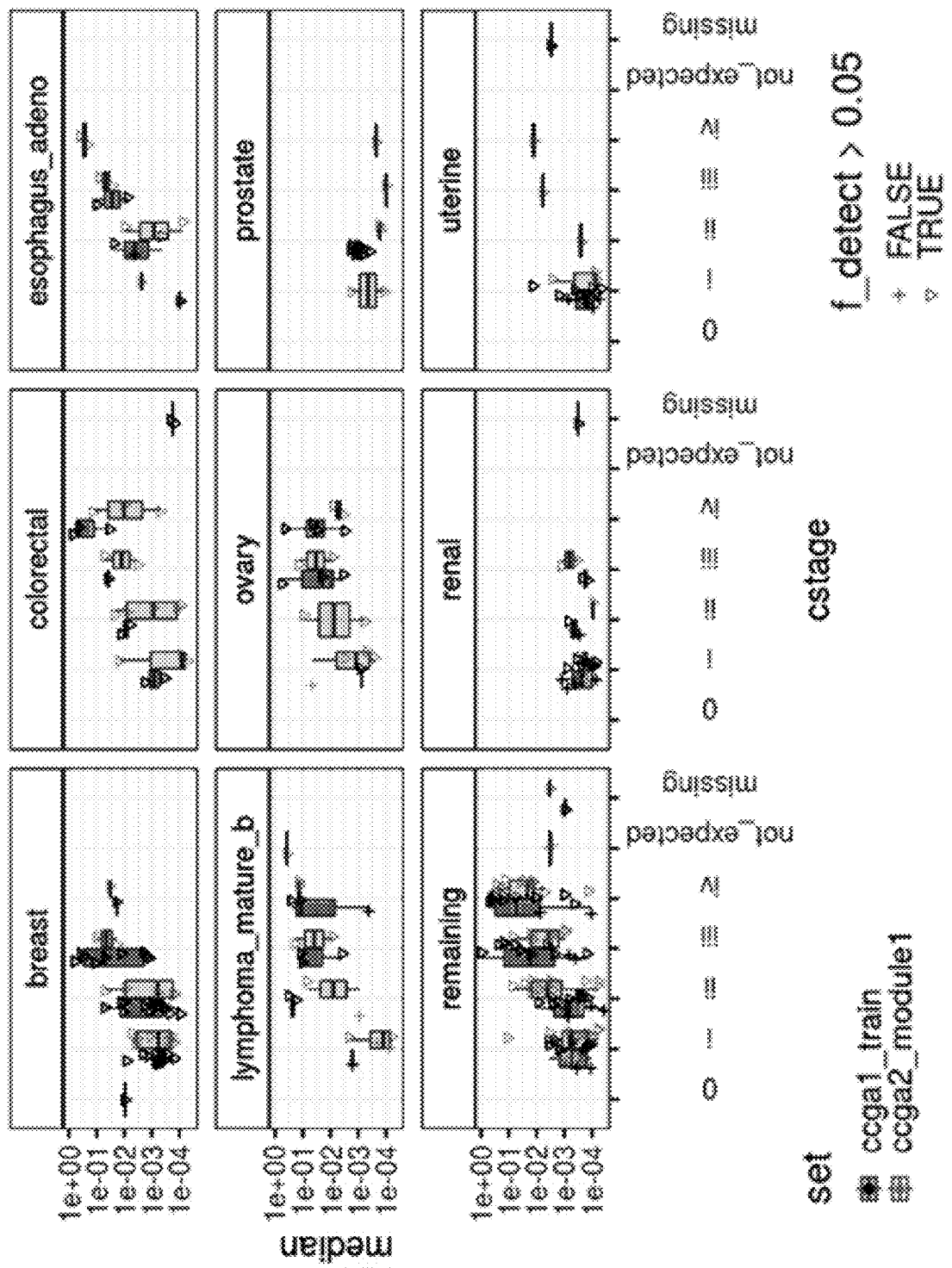
FIG. 10 is a plot illustrating the performance of an approach for tumor fraction in accordance with some embodiments of the present disclosure that accounts for a tumor fraction component, germline component, background artifact component and bisulfite artifacts in the form of false calls when estimating tumor fraction, by cancer stage for certain cancers in accordance with some embodiments of the present disclosure.

In some embodiments, $P(D_s|f_c)$ takes into account germline contamination, unknown background artifacts, and false sequencing calls. In some such embodiments, $P(D_s|f_c)$ is calculated as $$\log P(D_s \mid f_c) = \sum_{v_i} \log(Q * \text{Binomial}(s_{v_i,t}; s_{v_i}, f_c a_i + (1 - f_c)ev_i) +$$
$$P_1 * \text{Binomial}(s_{v_i,t}; s_{v_i}, T) +$$
$$P_2 * \text{Binomial}(s_{v_i,t}; s_{v_i}, V) + P_3 * \text{Binomial}(s_{v_i,t}; s_{v_i}, Z)),$$

where, as above, $s_{v_i,t}$ is a variant allele count at allele position $v_i$, $s_{v_i}$ is a coverage for $s_{v_i,t}$ at allele position $v_i$, $a_i$ is a solid variant allele fraction at allele position $v_i$. Further, Q, $P_1$, $P_2$, and $P_3$ are each positive and sum to one, T is between 0.45 and 0.55, V is between 0.15 and 0.25, and Z is between 0.00 and 0.05. In some embodiments, T is 0.5, V is 0.20, and Z is 0. In some embodiments, Q=0.5 and $P_1$, $P_2$ and $P_3$ sum to 0.5. In some embodiments, $P_1$ is 0.5*⅓, $P_2$ is 0.5*⅓ and $P_3$ is 0.5*⅓. In some embodiments, the values of Q, $P_1$, $P_2$, $P_3$, T, V, and Z are optimized using a training population of subjects with known tumor fractions. FIG. 10 illustrates the performance of this form of $P(D_s|f_c)$ for calculating tumor fraction as a function of stage (0, i, ii, iii, iv) for breast cancer, colorectal cancer, esophagus cancer, lymphoma, ovary cancer, prostate cancer, renal cancer, and uterine cancer.

Figure 8:
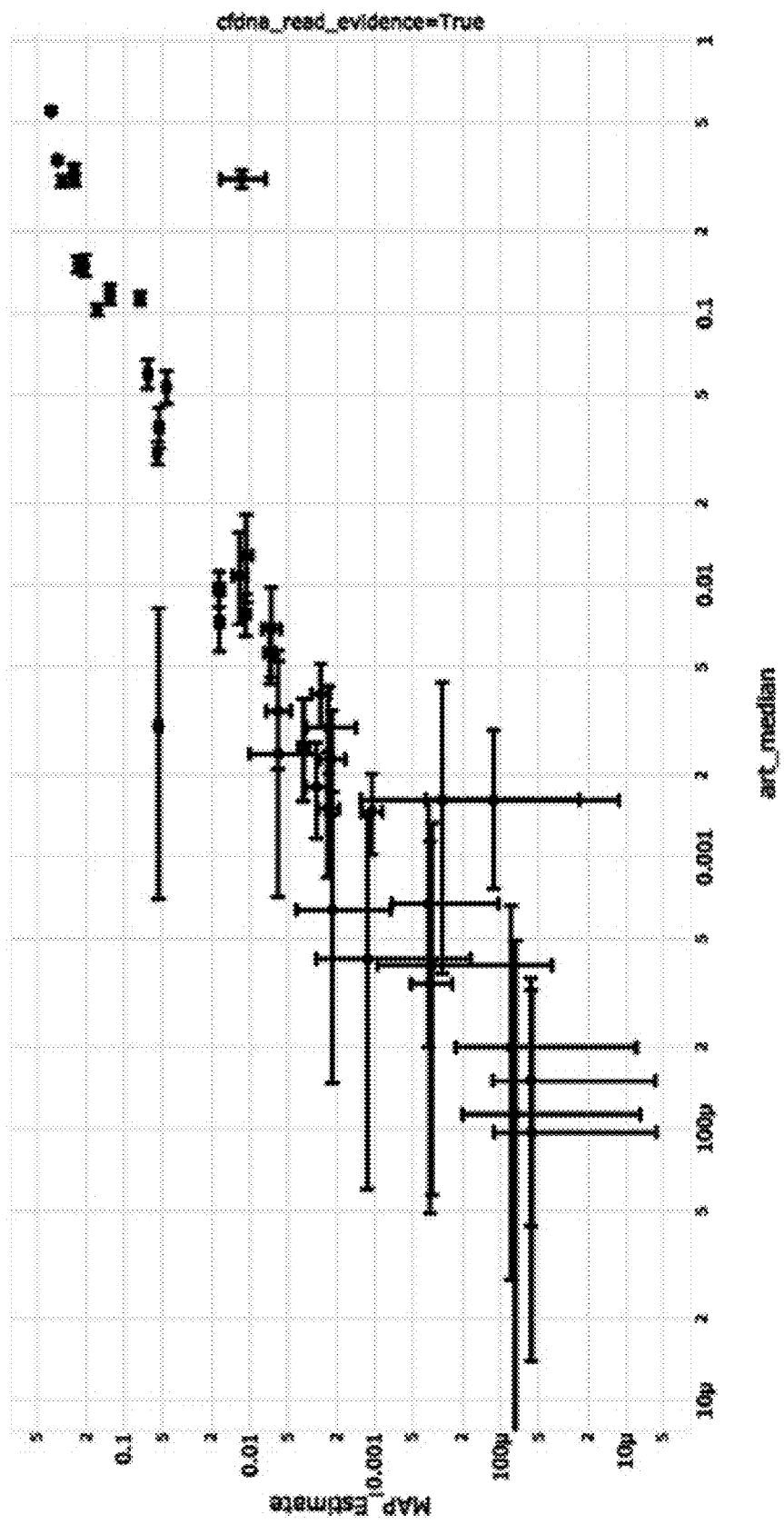
FIG. 8 is a plot illustrating a comparison of tumor fraction estimates determined using an approach in accordance with some embodiments of the present disclosure that accounts for the tumor fraction component, germline component, background artifact component and bisulfite artifacts in the form of false calls versus a different approach for tumor fraction estimation, in accordance with some embodiments of the present disclosure.

FIG. 8 is a plot illustrating a comparison of tumor fraction estimates determined using $$\log P(D_s \mid f_c) = \sum_{v_i} \log(Q * \text{Binomial}(s_{v_i,t}; s_{v_i}, f_c a_i + (1 - f_c)ev_i) +$$
$$P_1 * \text{Binomial}(s_{v_i,t}; s_{v_i}, T) +$$
$$P_2 * \text{Binomial}(s_{v_i,t}; s_{v_i}, V) + P_3 * \text{Binomial}(s_{v_i,t}; s_{v_i}, Z)),$$

where $P_1$ is 0.5*⅓, $P_2$ is 0.5*⅓, $P_3$ is 0.5*⅓, and Q=0.5 (Map_Estimate, vertical axis) versus the approach for tumor fraction estimation described in Venn et al., May 7-11, 2019, "Tumor Shedding into Cell-free DNA (cfDNA) is Associated with High-mortality Cancers," 2019 Cold Spring Harbor Laboratory Meeting: The Biology of Genomes May 7-11, 2019 Cold Spring Harbor, New York and further described in International Patent Application No. PCT/US2019/027756 entitled "Systems and Methods for Determining Tumor Fraction in Cell-Free Nucleic Acid," filed Apr. 16, 2019 (art median, horizontal axis), in accordance with some embodiments of the present disclosure. Thus, in FIG. 8, each circle represents the tumor fraction of a different one of the 44 subjects from CCGA-1 represented in the Figure and the (x, y) coordinates of each circle are defined as x=art_median tumor fraction estimate, y=Map_Estimate tumor fraction estimate.

As discussed in Example 1 in conjunction with FIG. 4, for a given subject, the ART (art_median) assay involves sequencing cell-free nucleic acid fragments from a liquid biopsy of the given subject and comparing them to nucleic acid fragments in a tumor biopsy taken from the given patient.

To obtain the y value (the y=MAP_Estimate tumor fraction estimate), in FIG. 8, $$\log P(D_s \mid f_c) = \sum_{v_i} \log(Q * \text{Binomial}(s_{v_i,t}; s_{v_i}, f_c a_i + (1 - f_c)ev_i) +$$
$$P_1 * \text{Binomial}(s_{v_i,t}; s_{v_i}, T) +$$
$$P_2 * \text{Binomial}(s_{v_i,t}; s_{v_i}, V) + P_3 * \text{Binomial}(s_{v_i,t}; s_{v_i}, Z)))$$

is used to generate a distribution of tumor fraction values of 44 CCGA-1 subjects, as illustrated in FIG. 11. For each of the 44 subjects, a candidate list of single nucleotide variations was generated, and a series of filtering steps were undertaken in order to enrich for somatic variants. These filters included application of a minimum (0.20 percent) and maximum (0.90 percent) variant allele frequency (VAF) threshold, a minimum depth requirement (10), a custom blacklist of known noisy regions, the removal of germline-variants private to an individual as marked by Freebayes (Garrison and Marth, 2012, "Haplotype-based variant detection from short-read sequencing," arXiv.org>q-bio>arXiv: 1207.3907, which is hereby incorporated by reference) within sample-matched whole-genome sequencing cfDNA, and blacklisting of known germline variants using gnomAD (Karczewski et al., 2019, "Variation across 141,456 human exomes and genomes reveals the spectrum of loss-of-function intolerance across human protein-coding genes," dx.doi.org/10.1101/531210, which is hereby incorporated by reference) and dbSNP (Wheeler et al., 2007, "Database resources of the National Center for Biotechnology Information," Nucleic Acids Res. 35 (Database issue): D5-12. doi:10.1093/nar/gkl1031, which is hereby incorporated by reference). Counts of fragments supporting and not supporting each variant were generated from matched WGS sequencing of corresponding cfDNA samples. For FIG. 8, the distribution of $P(D_s|f)$, as illustrated in FIG. 11, was used across the candidate list of single nucleotide variations that remained after filtering to determine posterior tumor fraction estimates using a grid search over tumor fractions and employing a per variant likelihood defined as a mixture of binomial likelihoods defined by $P(D_s|f)$. In particular, $P(D_s \mid f_c)$ in the form of log $P(D_s \mid f_c) =$ $$\sum_{v_i} \log(Q * \text{Binomial})(s_{v_i,t}; s_{v_i}, f_c a_i + (1 - f_c)ev_i) +$$
$$P_1 * \text{Binomial}(s_{v_i,t}; s_{v_i}, T) +$$
$$P_2 * \text{Binomial}(s_{v_i,t}; s_{v_i}, V) + P_3 * \text{Binomial}(s_{v_i,t}; s_{v_i}, Z)),$$

accounted for (1) observing fragments due to tumor shedding as well as (2) various error modes including leak through germline variants and falsely called variants. Median and 95% credible intervals were calculated for each participant's tumor fraction. In other words, $P(D_s|f_c)$ was evaluated from f=0 to f=1.0 for each of the 44 CCGA-1 subjects. Thus the area under curve 1102 of FIG. 11 sums to a total probability of 100%. Then, the left-hand boundary 1104 defining 2.5 percent of the probability on the left side of the distribution and the right-hand boundary 1106 defining 2.5 percent of the probability on the right side of the distribution are identified, thus identifying a 95 percent credible interval 1108. From this 95 percent credible interval, a measure of central tendency 1110 can be determined, nominally called a median value herein, although the measure of central tendency used for the MAP_Estimate tumor fraction in FIG. 8 is not guaranteed to be a median value in a strict mathematical sense because there are no restrictions (e.g., no requirement that curve 1102 be symmetrical about 1110) on the shape of curve 1102. For the value of y=MAP_Estimate, in FIG. 8, the value 1110 of $f_t$ is reported, where 1110 is chosen that divides the area defined by the 95 percent credible interval into an equal left hand portion 1112a and right hand portion 1114a. That is, areas 1112a and 1114a each represent 47.5 percent of the total probability. Note that because there is no requirement that curve 1102 be symmetrical about the "median 1110" in the present disclosure, the left-hand error bar 1112b (the distance between the median 1110 and left-hand interval 1104) may be longer or shorter than the right-hand error bar 1114b (the distance between the median 1110 and right-hand interval 1106). Moreover, FIG. 8 shows the extent of the 95 degree credible interval for tumor fraction f for each subject for both the MAP_Estimate and art_median assays. Thus, in FIG. 8, vertical lines emanating above each circle represent the 1114a/b portion of the 95 percent credible interval and vertical lines emanating below each circle represent the 1112a/b portion of the 95 percent credible interval of FIG. 11 for each subject. It will be appreciated that, the smaller the credible interval lines (e.g., the shorter lines 1112 b/1114 b are in FIG. 11 for a given credible interval), the more certain one can be that the "median value" for the tumor fraction is within a narrow range around the "median value." This is visualized in FIG. 8, where the signal is much better for high tumor fraction (e.g., above 0.001) than for low tumor fractions (e.g., below 0.001) and thus the error bars (credible interval lines) for the subjects with high tumor fractions are smaller than the error bars for the subjects with low tumor fractions.

Figure 9A:
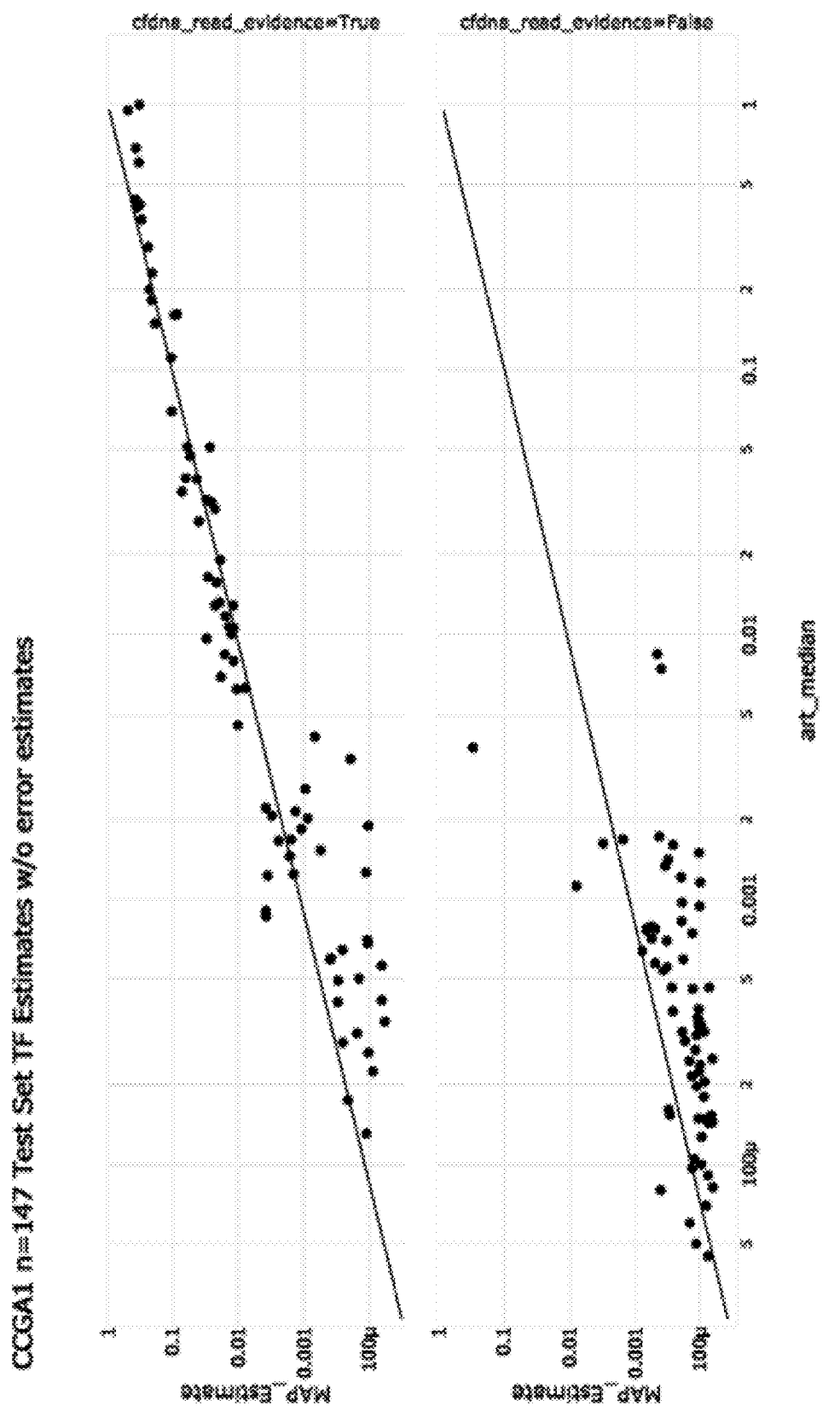
FIG. 9A is a plot illustrating the performance of an approach for tumor fraction estimation in accordance with some embodiments of the present disclosure that accounts for a tumor fraction component, germline component, background artifact component and bisulfite artifacts in the form of false sequencing calls when estimating tumor fraction, versus a different approach for tumor estimation, for 147 subjects from CCGA-1 in accordance with some embodiments of the present disclosure.

FIG. 9A is a plot illustrating the performance of an approach for tumor fraction estimation in accordance with some embodiments of the present disclosure that accounts for a tumor fraction component, germline component, background artifact component and bisulfate artifacts in the form of false calls when estimating tumor fraction, versus a different approach for tumor estimation, for 147 subjects from CCGA-1 in accordance with some embodiments of the present disclosure. In particular, FIG. 9A is a plot illustrating a comparison of tumor fraction estimates determined using $$\log P(D_s \mid f_c) = \sum_{v_i} \log(Q*\text{Binomial}(s_{v_i,t}; s_{v_i}, f_c a_i + (1-f_c)ev_i) +$$
$$P_1*\text{Binomial}(s_{v_i,t}; s_{v_i}, T) +$$
$$P_2*\text{Binomial}(s_{v_i,t}; s_{v_i}, V) + P_3*\text{Binomial}(s_{v_i,t}; s_{v_i}, Z)),$$

where $P_1$ is 0.5*⅓, $P_2$ is 0.5*⅓, $P_3$ is 0.5*⅓, and Q=0.5 (Map_Estimate, vertical axis) versus the approach for tumor fraction estimation described in Venn et al., May 7-11, 2019, "Tumor Shedding into Cell-free DNA (cfDNA) is Associated with High-mortality Cancers," 2019 Cold Spring Harbor Laboratory Meeting: The Biology of Genomes May 7-11, 2019 Cold Spring Harbor, New York and further described in International Patent Application No. PCT/US2019/027756 entitled "Systems and Methods for Determining Tumor Fraction in Cell-Free Nucleic Acid," filed Apr. 16, 2019 (art_median, horizontal axis), in accordance with some embodiments of the present disclosure. Thus, in FIG. 9A, each circle represents the tumor fraction of a different one of the 147 subjects from CCGA-1 represented in the Figure and the (x, y) coordinates of each circle are defined as x=art_median tumor fraction estimate, y=Map_Estimate tumor fraction estimate.

As discussed in Example 1 in conjunction with FIG. 4, for a given subject, the ART assay involves sequencing cell-free nucleic acid fragments from a liquid biopsy of the given subject and comparing them to nucleic acid fragments in a tumor biopsy taken from the given patient. In some instances, the ART assay identifies among the cell-free nucleic acid fragment somatic variants that are also in the tumor. For each such subject where at least one such match (at least one somatic variant) was found between the cell-free and tumor nucleic acid, the circle representing the subject is presented in the top graph in FIG. 9A. Thus, circles that are not in the top graph of FIG. 9A, but rather are in the bottom graph of FIG. 9A, represent those subjects in which the ART assay did not identify even a single cell-free nucleic acid fragment in the liquid biopsy for any somatic variant that was observed in the subject's tumor fraction.

Figure 9B:
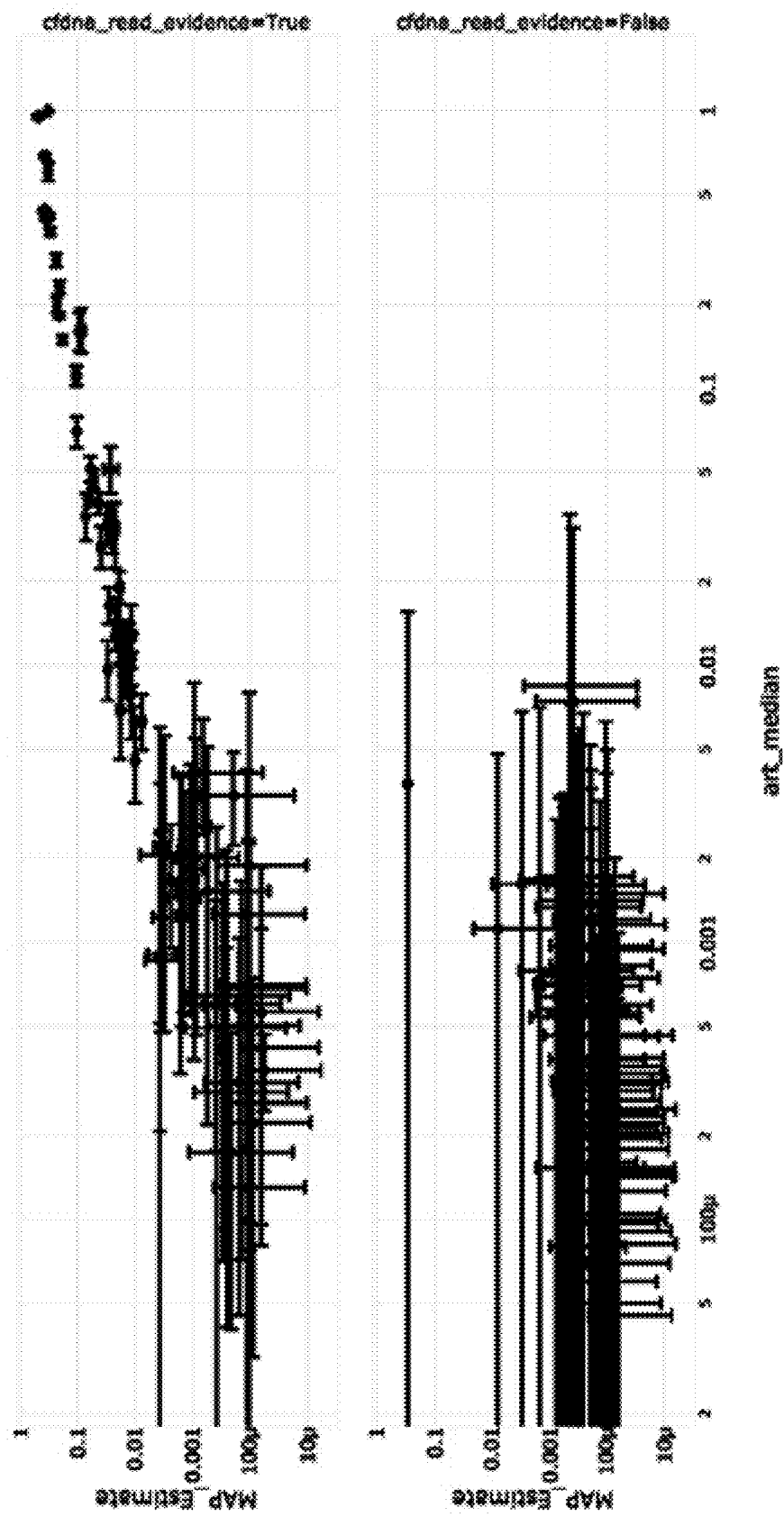
FIG. 9B is a plot illustrating the 95 percent error bars for the data of FIG. 9A.

To obtain the y value (the y=MAP_Estimate tumor fraction estimate), in FIG. 9A, $$\log P(D_s \mid f_c) = \sum_{v_i} \log(Q*\text{Binomial}(s_{v_i,t}; s_{v_i}, f_c a_i + (1-f_c)ev_i) +$$
$$P_1*\text{Binomial}(s_{v_i,t}; s_{v_i}, T) +$$
$$P_2*\text{Binomial}(s_{v_i,t}; s_{v_i}, V) + P_3*\text{Binomial}(s_{v_i,t}; s_{v_i}, Z))$$

is used to generate a distribution of tumor fraction values, as illustrated in FIG. 11. However, before using the equation for $P(D_s|f)$ to plot FIG. 9A, $P(D_s|f_c)$ is first trained against a set of 1000 CCGA-1 subjects for which the tumor fraction is known. In some embodiments, the equation for $P(D_s|f)$ is trained using an expectation-maximization protocol illustrated in FIG. 12. Expectation-maximization is discussed generally in Moon, 1996, "The expectation-maximization algorithm," IEEE Signal Processing Magazine 13(6), pp. 47-60, which is hereby incorporated by reference. Referring to FIG. 12, in accordance with the expectation-maximization algorithm, there is an E-step and an M-Step for the refinement of $P(D_s|f)$ in which respective parameters of $P(D_s|f)$ are updated. Once $P(D_s|f)$ is trained, the distribution of $P(D_s|f)$ illustrated in FIG. 11 is evaluated from f=0 to f=1.0 for 147 CCGA-1 subjects that were not part of the 1000 CCGA-1 subjects used to train $P(D_s|f)$. Thus the area under curve 1102 of FIG. 11 sums to a total probability of 100%. Then, the left-hand boundary 1104 defining 2.5 percent of the probability on the left side of the distribution and the right-hand boundary 1106 defining 2.5 percent of the probability on the right side of the distribution are identified, thus identifying a 95 percent credible interval 1108. From this 95 percent credible interval, a measure of central tendency 1110 can be determined, nominally called a median value herein, although the measure of central tendency used for the MAP_Estimate tumor fraction in FIG. 9A is not guaranteed to be a median value in a strict mathematical sense because there are no restrictions (e.g., no requirement that curve 1102 be symmetrical about 1110) on the shape of curve 1102. For the value of y=MAP_Estimate, in FIG. 9A, the value 1110 of $f_c$ is reported, where 1110 is chosen that divides the area defined by the 95 percent credible interval into an equal left hand portion 1112a and right hand portion 1114a. That is, areas 1112a and 1114a each represent 47.5 percent of the total probability. Note that because there is no requirement that curve 1102 be symmetrical about the "median 1110" in the present disclosure, the left-hand error bar 1112b (the distance between the median 1110 and left-hand interval 1104) may be longer or shorter than the right-hand error bar 1114b (the distance between the median 1110 and right-hand interval 1106). Moreover, FIG. 9B shows the extent of the 95 degree credible interval for tumor fraction f for each subject for both the MAP_Estimate and art_median assays that is represented in FIG. 9A. Thus, in FIG. 9B, vertical lines emanating above each circle represent the 1114a/b portion of the 95 percent credible interval and vertical lines emanating below each circle represent the 1112a/b portion of the 95 percent credible interval of FIG. 11 for each subject. It will be appreciated that, the smaller the credible interval values (e.g., the shorter lines 1112 b/1114 b are in FIG. 11 for a given credible interval), the more certain one can be that the "median value" for the tumor fraction is within a narrow range around the "median value." This is visualized in FIG. 9B, where the signal is much better for high tumor fraction (e.g., above 0.001) than for low tumor fractions (e.g., below 0.001) and thus the error bars (credible interval lines) for the subjects with high tumor fractions are smaller than the error bars for the subjects with low tumor fractions.

In some embodiments (block 270), a threshold credible interval for the tumor fraction f of the subject is calculated (e.g., as discussed in Example 1 below in conjunction with FIG. 11). In some embodiments (block 270), the threshold credible interval for the tumor fraction f of the subject is calculated using any of the forms of $P(D_s|f)$ disclosed herein.

In some embodiments (block 272), the tumor fraction f of the subject is used to determine a cancer condition of the subject. The tumor fraction f of the subject can comprise a tumor fraction in the blood of the subject that is indicative of the cancer, as shown at block 274 of FIG. 3E. For instance, in some embodiments, a subject is deemed to have cancer when the tumor fraction f of the subject calculated using any of the forms of $P(D_s|f)$ disclosed herein is greater than 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.30, 0.35, 0.40, 0.45 or 0.50. In some such embodiments, this cancer is breast cancer, colorectal cancer, esophagus cancer, lymphoma, ovary cancer, prostate cancer, renal cancer, and uterine cancer.

Figure 3F:
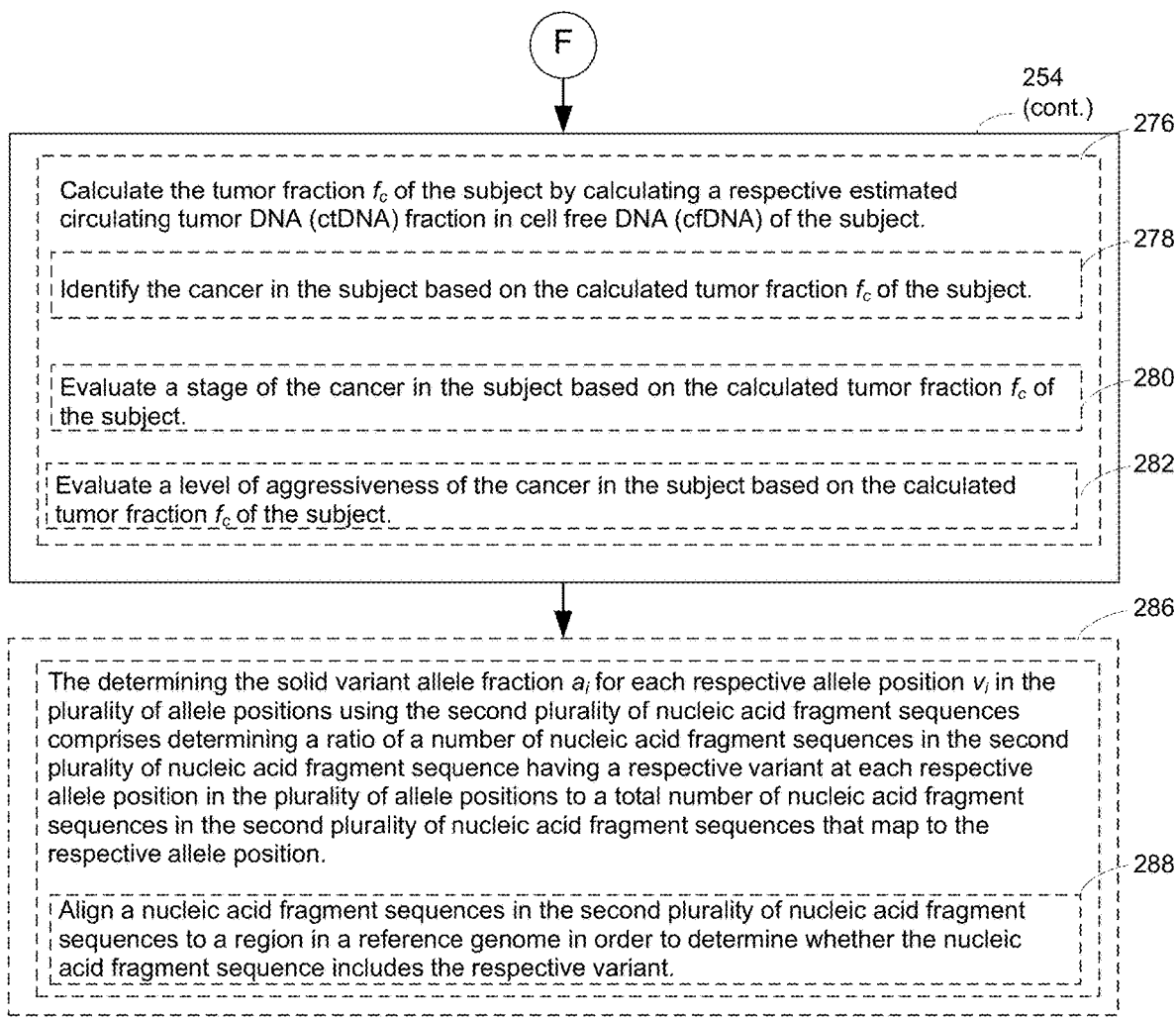

With reference to FIG. 3F, in some embodiments, calculating the tumor fraction f of the subject comprises calculating a respective estimated circulating tumor DNA (ctDNA) fraction in cell-free DNA (cfDNA) of the subject, as shown at block 276. The cancer in the subject can be verified based on the calculated tumor fraction f of the subject (block 278). For instance, in some embodiments the subject is verified as having cancer when the tumor fraction f of the subject calculated using any of the forms of $P(D_s|f)$ disclosed herein is greater than 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.30, 0.35, 0.40, 0.45 or 0.50.

In some embodiments, with reference to block 280, a stage of the cancer in the subject is evaluated based on the calculated tumor fraction f of the subject. The tumor fraction f of the subject can comprise a tumor fraction in the blood of the subject that is indicative of the cancer. In some embodiments, a subject is deemed to have a stage of cancer when the tumor fraction f of the subject calculated using any of the forms of $P(D_s|f)$ disclosed herein is greater than 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.30, 0.35, 0.40, 0.45 or 0.50. In some such embodiments, this cancer is breast cancer, colorectal cancer, esophagus cancer, lymphoma, ovary cancer, prostate cancer, renal cancer, and uterine cancer. In some such embodiments, the stage of cancer is stage I cancer. In some such embodiments the stage of cancer is stage II cancer. In some such embodiments the stage of cancer is stage III cancer. In some such embodiments the stage of cancer is stage IV cancer.

As another example, at block 282, a level of aggressiveness of the cancer in the subject can be evaluated based on the calculated tumor fraction f of the subject. For example, in some embodiments, the level of aggressiveness of the cancer is deemed to be a function of the calculated tumor fraction of the subject, where the tumor fraction is calculated using any of the forms of $P(D_s|f)$ disclosed herein. For instance, by way of example, in some embodiments the cancer of a subject is deemed to be more aggressive the higher the calculated tumor fraction f is.

In some embodiments (block 286), the determining the solid variant allele fraction $a_i$ for each respective allele position $v_i$ in the plurality of allele positions using the second plurality of nucleic acid fragment sequences (as shown at block 246 of FIG. 3C) comprises determining a ratio of a number of nucleic acid fragment sequences in the second plurality of nucleic acid fragment sequences having a respective variant at each respective allele position in the plurality of allele positions to a total number of nucleic acid fragment sequences in the second plurality of nucleic acid fragment sequences that map to the respective allele position. The determining can comprise aligning a nucleic acid fragment sequence in the second plurality of nucleic acid fragment sequences to a region in a reference genome in order to determine whether the nucleic acid fragment sequence includes the respective variant, as shown at block 288 of FIG. 3F.

As discussed above, the described embodiments can be performed by a classifier that is implemented to determine a tumor fraction f in a subject. The tumor fraction estimates can be computed for various samples, and a probability of observing variant allele counts is estimated for various respective values of the sample's tumor fraction estimates. The described techniques are able to reliably evaluate a tumor fraction even if the sequencing coverage is relatively low, e.g., under 5,000×, under 500×, or under 50×.

Evaluating Performance of a Classifier.

The disclosed methods for estimating tumor fraction provides a basis for evaluating a classifier that predicts whether or not a subject has cancer. For instance, consider the case where the disclose tumor fraction estimates determines that the tumor fraction for a test subject is $1\times10^{-9}$ and the cancer classifier, using some input data from the test subject required by the classifier that is the same or different than the data from the test subject needed to calculate the tumor fraction using the disclosed method, determines that the subject has cancer. In this instance, presumably the cancer classifier provided a false call because it is unlikely that a subject with a tumor fraction of $1\times10^{-9}$ has cancer.

Advantageously, the data needed to calculate the tumor fraction does not have to be the same as the data used by the cancer classifier to diagnose cancer. As such, the disclosed tumor fraction calculation can act as an orthogonal, independent basis for assessing the performance of a classifier.

In some embodiments, a method for evaluating a performance of an independent cancer classifier is provided. The cancer classifier is used to determine a tumor fraction in a test subject as discussed above. A likelihood of the determined tumor fraction being a true tumor fraction is then determined based on a value of the tumor fraction and this value is compared to the call made by the classifier for the test subject thereby evaluating the performance of the cancer classifier. For instance, consider the case as above where the disclosed methods for estimating tumor fraction identify a subject as having a tumor fraction of $1 \times 10^{-9}$. In such instances, the likelihood that the tumor fraction is a true tumor fraction would be quite low based on the $1 \times 10^{-9}$ value of the tumor fraction. Thus, if the independent cancer classifier determined that the test subject does have cancer this would be considered a false call. On the other hand, if the independent cancer classifier determined that the test subject does not have cancer, this would be considered a true call.

In some embodiments, the method for evaluating performance of a classifier comprises executing, using at least one processor, the cancer classifier using a first plurality of nucleic acid fragment sequences, a second plurality of nucleic acid fragment sequences, and a plurality of estimated smoothed noise rates, by: (a) obtaining the first plurality of nucleic acid fragment sequences, in electronic form, representing a liquid biological sample obtained from a subject identified as having a cancer; (b) obtaining the second plurality of nucleic acid fragment sequences, in electronic form, representing a solid tumor sample obtained from the subject; (c) obtaining the plurality of estimated smoothed noise rates, where each respective estimated smoothed noise rate $ev_i$ in the plurality of estimated smoothed noise rates is determined using nucleic acid fragment sequences obtained from each non-cancer sample in a cohort of non-cancer samples mapping to a corresponding allele position $v_i$ in a plurality of allele positions; (d) determining a variant allele count $s_{v_i,t}$ for each respective allele position $v_i$ in the plurality of allele positions using the first plurality of nucleic acid fragment sequences, thereby calculating a plurality of variant allele counts for the subject; (e) determining a coverage $s_{v_i}$ for each respective allele position $v_i$ in the plurality of allele positions using the first plurality of nucleic acid fragment sequences, thereby calculating a plurality of coverages for the subject; (f) determining a solid variant allele fraction $a_i$ for each respective allele position $v_i$ in the plurality of allele positions using the second plurality of nucleic acid fragment sequences, thereby calculating a plurality of solid variant allele fractions; (g) using $D_{sj}$, where $D_{sj}$ comprises (i) the plurality of estimated smoothed noise rates, (ii) the plurality of variant allele counts, (iii) the plurality of coverages, (iv) the plurality of solid variant allele fractions to calculate the tumor fraction f of the subject; and i is an integer between 1 and N. The method further comprises determining a likelihood that the calculated tumor fraction f is a true tumor fraction given $D_{sj}$, thereby evaluating performance of the cancer classifier. To further evaluate the performance of the cancer classifier, the method involves repeating the execution of the cancer classifier using another first plurality of nucleic acid fragment sequences, another second plurality of nucleic acid fragment sequences, and another plurality of estimated smoothed noise rates, by performing the steps (a) to (g) of the execution to calculate another tumor fraction f of another subject identified as having a cancer, using $D_{sj+1}$ where $D_{sj+1}$ is determined by repeating steps (d) to (f) of the execution; and determining a likelihood that the calculated another tumor fraction f is a true tumor fraction given $D_{sj+1}$, thereby evaluating the performance of the cancer classifier.

In some embodiments, a tumor fraction of the subject is estimated to be between $0.5 \times 10^{-4}$ and $1.5 \times 10^{-4}$, and the cancer is a melanoma. In some embodiments, the estimated tumor fraction in the subject is between $0.5 \times 10^{-3}$ and $1 \times 10^{-2}$, and the cancer is a renal cancer, uterine cancer, thyroid cancer, prostate cancer, breast cancer, bladder cancer, gastric cancer, cervical cancer or a combination thereof. In some embodiments, the estimated tumor fraction is between $1 \times 10^{-2}$ and 0.8, and the first cancer condition is lung cancer, esophageal cancer, a head/neck cancer, colorectal cancer, anorectal cancer, ovarian cancer, a hepatobiliary cancer, a pancreatic cancer, a lymphoma, or a combination thereof.

In some embodiments the classifier makes use of the B score classifier described in U.S. application Ser. No. 16/352,739, entitled "Method and System for Selecting, Managing, and Analyzing Data of High Dimensionality," filed Mar. 13, 2019, which is hereby incorporated by reference.

In some embodiments, the classifier makes use of the M score classifier described in U.S. Patent Application No. 62/642,480, entitled "Methylation Fragment Anomaly Detection," filed Mar. 13, 2018, and U.S. patent application Ser. No. 16/719,902, entitled "Systems and Methods for Estimating Cell Source Fractions Using Methylation Information," filed Dec. 18, 2019, each of which is hereby incorporated by reference, each of which is hereby incorporated by reference.

In some embodiments, the classifier is a neural network or a convolutional neural network. See, Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, Fundamentals of Artificial Neural Networks, Massachusetts Institute of Technology, each of which is hereby incorporated by reference.

In some embodiments, the classifier uses a support vector machine (SVM). SVMs are described in Cristianini and Shawe-Taylor, 2000, "An Introduction to Support Vector Machines," Cambridge University Press, Cambridge; Boser et al., 1992, "A training algorithm for optimal margin classifiers," in Proceedings of the 5$^{th}$ Annual ACM Workshop on Computational Learning Theory, ACM Press, Pittsburgh, Pa., pp. 142-152; Vapnik, 1998, Statistical Learning Theory, Wiley, New York; Mount, 2001, *Bioinformatics: sequence and genome analysis*, Cold Spring Harbor Laboratory Press, Cold Spring Harbor, N.Y.; Duda, *Pattern Classification*, Second Edition, 2001, John Wiley & Sons, Inc., pp. 259, 262-265; and Hastie, 2001, *The Elements of Statistical Learning*, Springer, New York; and Furey et al., 2000, *Bioinformatics* 16, 906-914, each of which is hereby incorporated by reference in its entirety. When used for classification, SVMs separate a given set of binary labeled data with a hyper-plane that is maximally distant from the labeled data. For cases in which no linear separation is possible, SVMs can work in combination with the technique of 'kernels', which automatically realizes a non-linear mapping to a feature space. The hyper-plane found by the SVM in feature space corresponds to a non-linear decision boundary in the input space.

In some embodiments, the classifier uses a decision tree. Decision trees are described generally by Duda, 2001, *Pattern Classification*, John Wiley & Sons, Inc., New York, pp. 395-396, which is hereby incorporated by reference. Tree-based methods partition the feature space into a set of rectangles, and then fit a model (like a constant) in each one. In some embodiments, the decision tree is random forest regression. One specific algorithm that can be used is a classification and regression tree (CART). Other specific decision tree algorithms include, but are not limited to, ID3, C4.5, MART, and Random Forests. CART, ID3, and C4.5 are described in Duda, 2001, *Pattern Classification*, John Wiley & Sons, Inc., New York. pp. 396-408 and pp. 411-412, which is hereby incorporated by reference. CART, MART, and C4.5 are described in Hastie et al., 2001, *The Elements of Statistical Learning*, Springer-Verlag, New York, Chapter 9, which is hereby incorporated by reference in its entirety. Random Forests are described in Breiman, 1999, "Random Forests—Random Features," Technical Report 567, Statistics Department, U.C. Berkeley, September 1999, which is hereby incorporated by reference in its entirety.

In some embodiments, the classifier uses an unsupervised clustering model. In some embodiments, the classifier is a supervised clustering model. Clustering is described at pages 211-256 of Duda and Hart, Pattern Classification and Scene Analysis, 1973, John Wiley & Sons, Inc., New York, (hereinafter "Duda 1973") which is hereby incorporated by reference in its entirety. As described in Section 6.7 of Duda 1973, the clustering problem is described as one of finding natural groupings in a dataset. To identify natural groupings, two issues are addressed. First, a way to measure similarity (or dissimilarity) between two samples is determined. This metric (similarity measure) is used to ensure that the samples in one cluster are more like one another than they are to samples in other clusters. Second, a mechanism for partitioning the data into clusters using the similarity measure is determined. Similarity measures are discussed in Section 6.7 of Duda 1973, where it is stated that one way to begin a clustering investigation is to define a distance function and to compute the matrix of distances between all pairs of samples in the training set. If distance is a good measure of similarity, then the distance between reference entities in the same cluster will be significantly less than the distance between the reference entities in different clusters. However, as stated on page 215 of Duda 1973, clustering does not require the use of a distance metric. For example, a nonmetric similarity function s(x, x') can be used to compare two vector x and x'. Conventionally, s(x, x') is a symmetric function whose value is large when x and x' are somehow "similar." An example of a nonmetric similarity function s(x, x') is provided on page 218 of Duda 1973. Once a method for measuring "similarity" or "dissimilarity" between points in a dataset has been selected, clustering requires a criterion function that measures the clustering quality of any partition of the data. Partitions of the data set that extremize the criterion function are used to cluster the data. See page 217 of Duda 1973. Criterion functions are discussed in Section 6.8 of Duda 1973. More recently, Duda et al., Pattern Classification, $2^{nd}$ edition, John Wiley & Sons, Inc. New York, has been published. Pages 537-563 describe clustering in detail. More information on clustering techniques can be found in Kaufman and Rousseeuw, 1990, *Finding Groups in Data: An Introduction to Cluster Analysis*, Wiley, New York, N.Y.; Everitt, 1993, Cluster analysis (3d ed.), Wiley, New York, N.Y.; and Backer, 1995, Computer-Assisted Reasoning in Cluster Analysis, Prentice Hall, Upper Saddle River, New Jersey, each of which is hereby incorporated by reference. Particular exemplary clustering techniques that can be used in the present disclosure include, but are not limited to, hierarchical clustering (agglomerative clustering using the nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering comprises unsupervised clustering where no preconceived notion of what clusters should form when the training set is clustered are imposed.

In some embodiments, the classifier is a regression model, such as the of the multi-category logit models described in Agresti, *An Introduction to Categorical Data Analysis*, 1996, John Wiley & Sons, Inc., New York, Chapter 8, which is hereby incorporated by reference in its entirety. In some embodiments, the classifier makes use of a regression model disclosed in Hastie et al., 2001, *The Elements of Statistical Learning*, Springer-Verlag, New York.

EXAMPLES

Example 1

FIG. 4 compares tumor fraction estimates estimated using $$\log P(D_s \mid f) = \sum_{v_i} \log \mathrm{Binomial}(s_{v_i,t}; s_{v_i}, fa_i + (1-f)ev_i),$$

where $s_{v_i,t}$ is a variant allele count at allele position $v_i$, $s_{v_i}$ is a coverage for $s_{v_i,t}$ at allele position $v_i$, and $a_i$ is a solid variant allele fraction at allele position $v_i$ as described in the present disclosure (WGS) to tumor fractions estimated by the methods disclosed in Venn et al., May 7-11, 2019, "Tumor Shedding into Cell-free DNA (cfDNA) is Associated with High-mortality Cancers," 2019 Cold Spring Harbor Laboratory Meeting: The Biology of Genomes May 7-11, 2019 Cold Spring Harbor, New York (ART) and further described in International Patent Application No. PCT/US2019/027756 entitled "Systems and Methods for Determining Tumor Fraction in Cell-Free Nucleic Acid," filed Apr. 16, 2019 which is hereby incorporated by reference. Thus, in FIG. 4, each circle represents the tumor fraction of a different subject and the (x, y) coordinates of each circle are defined as x=ART tumor fraction estimate, y=WGS tumor fraction estimate.

For a given subject, the ART assay involves sequencing cell-free nucleic acid fragments from a liquid biopsy of the given subject and comparing them to nucleic acid fragments derived from a tumor biopsy taken from the given patient. In some instances, the ART assay identifies among the cell-free nucleic acid fragment somatic variants that are also in the tumor. For each such subject where at least one such match (at least one somatic variant) was found between the cell-free and tissue-derived tumor nucleic acid, the circle representing the subject is filled in FIG. 4. Thus, open circles in FIG. 4 represent those subjects in which the ART assay did not identify even a single cell-free nucleic acid fragment in the liquid biopsy for any somatic variant that was observed in the subject's tumor fraction. In FIG. 4, the subjects in region 402 have been assigned tumor fraction values by the respective WGS and ART assays that do not agree with each other and presumably have tumor fractions that fall below the threshold ability for the respective assays to detect tumor fraction in the respective subjects.

To obtain the y value (the y=WGS tumor fraction estimate), in FIG. 4, $$\log P(D_s \mid f_c) = \sum_{v_i} \log \text{Binomial}(s_{v_i,t}; s_{v_i}, f_c a_i + (1 - f_c)ev_i)$$

is used to generate a distribution of tumor fraction values, as illustrated in FIG. 11. For FIG. 4, the distribution of FIG. 11 was evaluated from $f_c=0$ to $f_c=1.0$ and thus the area under curve 1102 sums to a total probability of 100%. Then, the left-hand boundary 1104 defining 2.5 percent of the probability on the left side of the distribution and the right-hand boundary 1106 defining 2.5 percent of the probability on the right side of the distribution are identified, thus identifying a 95 percent credible interval 1108. From this 95 percent credible interval, a measure of central tendency 1110 can be determined, nominally called a median value herein, although the measure of central tendency used for the WGS tumor fraction in FIG. 4 is not guaranteed to be a median value in a strict mathematical sense because there are no restrictions (e.g., no requirement that curve 1102 be symmetrical about 1110) on the shape of curve 1102. For the value of y=WGS, in FIG. 4, the value 1110 of $f_c$ is reported, where 1110 is chosen that divides the area defined by the 95 percent credible interval into an equal left hand portion 1112a and right hand portion 1114a. That is, areas 1112a and 1114a each represent 47.5 percent of the total probability. Note that because there is no requirement that curve 1102 be symmetrical about the "median 1110," the left-hand error bar 1112b (the distance between the median 1110 and left-hand interval 1104) may be longer or shorter than the right-hand error bar 1114b (the distance between the median 1110 and right-hand interval 1106).

It will be appreciated from FIG. 11 that the tumor fraction value for $$\log P(D_s \mid f_c) = \sum_{v_i} \log \text{Binomial}(s_{v_i,t}; s_{v_i}, f_c a_i + (1 - f_c)ev_i)$$

could be reported (as the y=WGS tumor fraction estimate) using other metrics. For instance, rather than using the "median" value 1110 of FIG. 11 from a 95 percent credible interval, a different credible interval could be used (e.g., 50 percent credible interval, 60 percent credible interval, 70 percent credible interval, 80 percent credible interval, 90 percent credible interval, 99 percent credible interval, etc.). Further still, rather than identifying the "median" as defined for position 1110 of FIG. 11, the tumor fraction for $$\log P(D_s \mid f_c) = \sum_{v_i} \log \text{Binomial}(s_{v_i,t}; s_{v_i}, f_c a_i + (1 - f_c)ev_i)$$

could be reported as the tumor fraction value $f_c$ that gave the maximum probability on curve 1102. This may be the same tumor fraction value or a different tumor fraction value as position 1110 depending on the shape of curve 1102. In the case of FIG. 11, the maximum value is achieved at position 1116. Thus, in some embodiments, the tumor fraction is reported as that corresponding to position 1116 rather than position 1110.

Figure 5:
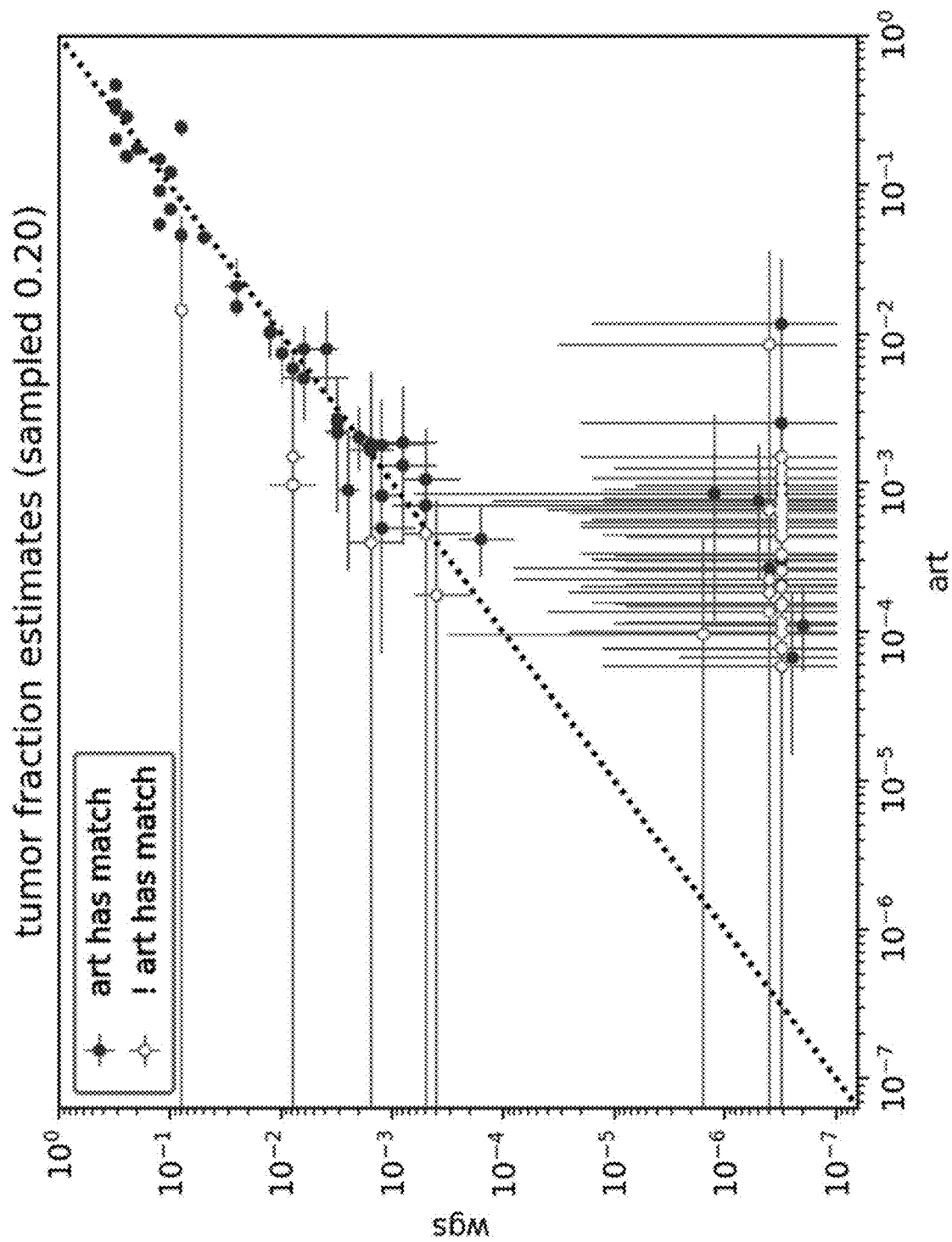
FIG. 5 is a plot illustrating a comparison of tumor fraction estimates (samples 0.20) determined using an approach in accordance with some embodiments of the present disclosure versus a different approach, in accordance with some embodiments of the present disclosure.

FIG. 5 illustrates a plot that is similar to that of FIG. 4. In FIG. 5, a slightly different form of $P(D_s \mid f_c)$ is evaluated. However, the identification of the "median" value of $f_c$ using the modified form of $P(D_s \mid f_c)$ is the same as that described for FIG. 5 above. Moreover, FIG. 5 shows the extent of the 95 degree credible interval for tumor fraction $f_c$ for each subject for both the WGS and ART assays. Thus, in FIG. 5, vertical lines emanating above each circle represent the 1114a/b portion of the 95 percent credible interval and vertical lines emanating below each circle represent the 1112a/b portion of the 95 percent credible interval of FIG. 11 for each subject. It will be appreciated that, the smaller the credible interval lines (e.g., the shorter lines 1112 b/1114 b are in FIG. 11 for a given credible interval), the more certain one can be that the "median value" for the tumor fraction is within a narrow range around the "median value." This is visualized in FIG. 5, where the signal is much better for high tumor fraction (e.g. above $10^{-3}$) than for low tumor fractions (e.g., below $10^{-3}$) and thus the error bars (credible interval lines) for the subjects with high tumor fractions are smaller than the error bars for the subjects with low tumor fractions.

Example 2

Figure 6:
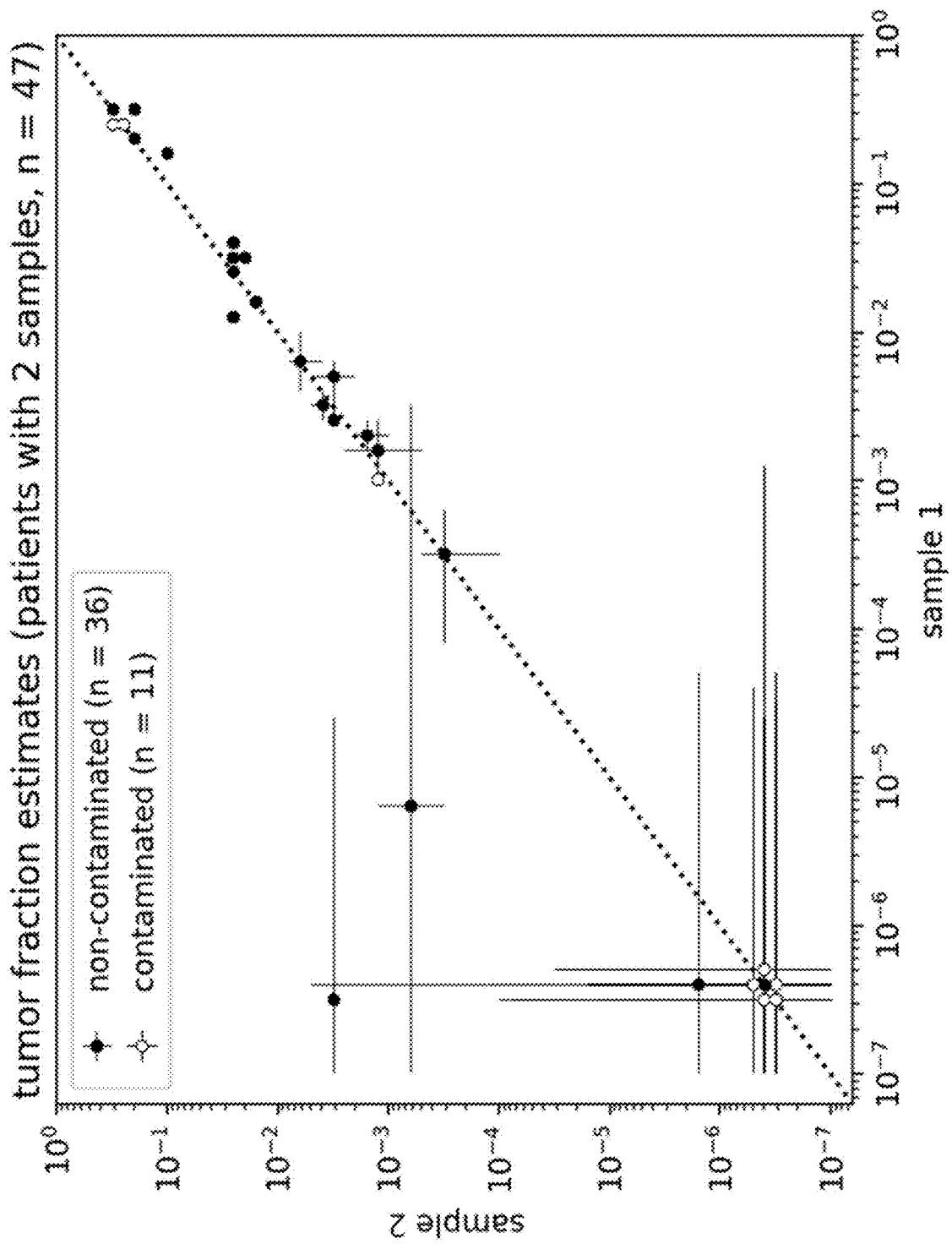
FIG. 6 is a plot illustrating a comparison of tumor fraction estimates of 47 patients with two samples, in accordance with some embodiments of the present disclosure.

FIG. 6 is a plot illustrating a comparison of tumor fraction estimates of 47 patients with two liquid biopsy samples drawn from the subject at the same time. For each liquid biopsy sample of each subject, tumor fraction was estimated in the same manner as described above for FIG. 4 using $$\log P(D_s \mid f_c) = \sum_{v_i} \log \text{Binomial}(s_{v_i,t}; s_{v_i}, f_c a_i + (1 - f_c)ev_i).$$

In FIG. 6, each circle represents a different subject and the (x, y) coordinates of each circle are defined as x=WGS tumor fraction estimate (sample 1), y=WGS tumor fraction estimate (sample 2). It is expected that, since each pair of samples is from the same subject drawn at the same time, the tumor fraction estimates for each liquid biopsy sample from a given subject should be the same and therefore the collection of circles should fall on a straight line. It is seen from FIG. 6 that this is generally the case until tumor fraction falls below $10^{-3}$. Also shown in FIG. 6 are the 95 percent credible intervals for each subject, as described above in conjunction with FIG. 11.

Example 3—Cell-Free Genome Atlas Study (CCGA) Cohort

Subjects from the CCGA [NCT02889978] were used in the Examples of the present disclosure.

CCGA is a prospective, multi-center, observational cfDNA-based early cancer detection study that has enrolled 15,254 demographically-balanced participants at 141 sites. Blood samples were collected from the 15,254 enrolled participants (56% cancer, 44% non-cancer) from subjects with newly diagnosed therapy-naive cancer (C, case) and participants without a diagnosis of cancer (noncancer [NC], control) as defined at enrollment.

In a first cohort (pre-specified substudy) (CCGA-1), plasma cfDNA extractions were obtained from 3,583 CCGA and STRIVE participants (CCGA: 1,530 cancer subjects and 884 non-cancer subjects; STRIVE 1,169 non-cancer participants). STRIVE is a multi-center, prospective, cohort study enrolling women undergoing screening mammography (99, 259 participants enrolled). Blood was collected (n=1,785) from 984 CCGA participants with newly diagnosed, untreated cancer (20 tumor types, all stages) and 749 participants with no cancer diagnosis (controls) for plasma cfDNA extraction. This preplanned substudy included 878 cases, 580 controls, and 169 assay controls (n=1627) across twenty tumor types and all clinical stages.

Three sequencing assays were performed on the blood drawn from each participant: 1) paired cfDNA and white blood cell (WBC)-targeted sequencing (60,000×, 507 gene panel) for single nucleotide variants/indels (the ART sequencing assay); a joint caller removed WBC-derived somatic variants and residual technical noise; 2) paired cfDNA and WBC whole-genome sequencing (WGS; 35×) for copy number variation; a novel machine learning algorithm generated cancer-related signal scores; joint analysis identified shared events; and 3) cfDNA whole-genome bisulfite sequencing (WGBS; 34×) for methylation; normalized scores were generated using abnormally methylated fragments. In addition, tissue samples were obtained from participants with cancer only, such that 4) whole-genome sequencing (WGS; 30×) was performed on paired tumor and WBC gDNA for identification of tumor variants for comparison.

In a second pre-specified substudy (CCGA-2), a targeted, rather than whole-genome, bisulfite sequencing assay was used to develop a classifier of cancer versus non-cancer and tissue-of-origin based on a targeted methylation sequencing approach. For CCGA-2, 3,133 training participants and 1,354 validation samples (775 having cancer; 579 not having cancer as determined at enrollment, prior to confirmation of cancer versus non-cancer status) were used. Plasma cfDNA was subjected to a bisulfite sequencing assay (the COMPASS assay) targeting the most informative regions of the methylome, as identified from a unique methylation database and prior prototype whole-genome and targeted sequencing assays, to identify cancer and tissue-defining methylation signal. Of the original 3,133 samples reserved for training, only 1,308 samples were deemed clinically evaluable and analyzable. Analysis was performed on a primary analysis population n=927 (654 cancer and 273 non-cancer) and a secondary analysis population n=1,027 (659 cancer and 373 non-cancer). Finally, genomic DNA from formalin-fixed, paraffin-embedded (FFPE) tumor tissues and isolated cells from tumors was subjected to whole-genome bisulfite sequencing (WGBS) to generate a large database of cancer-defining methylation signals for use in panel design and in training to optimize performance.

See, e.g., Klein et al., 2018, "Development of a comprehensive cell-free DNA (cfDNA) assay for early detection of multiple tumor types: The Circulating Cell-free Genome Atlas (CCGA) study," J. Clin. Oncology 36(15), 12021-12021; doi: 10.1200/JC0.2018.36.15_suppl. 12021, and Liu et al., 2019, "Genome-wide cell-free DNA (cfDNA) methylation signatures and effect on tissue of origin (TOO) performance," J. Clin. Oncology 37(15), 3049-3049; doi: 10.1200/JC0.2019.37.15_suppl. 3049, each of which is hereby incorporated herein by reference in its entirety.

Example 4 Using Epigenetic Features Such a Methylation State as Variants

In some embodiments, one or more methylation state vectors are determined in accordance with U.S. Patent Application No. 62/642,480, entitled "Methylation Fragment Anomaly Detection," filed Mar. 13, 2018, which is hereby incorporated by reference. In such embodiments, five-cytosine methylation occurs at CpG contexts. One method for determining methylation status is through bisulfite conversion sequencing (BS-seq). Under BS-seq non-methylated cytosines are converted to uracil bases, which read out as thymidine in sequencing. Accordingly, in some embodiments, an epigenetic pattern such as the methylation state at one or more nucleotide positions is used as a basis for determining a variant allele for which ctDNA fraction is determined. In some embodiments, the methylation can include a methylation index of a CpG site, a methylation density of CpG sites in a region (e.g., that includes 2 or more, 3 or more, 4 or more 5 or more or 6 or more CpG sites), a distribution of CpG sites over a contiguous region, a pattern or level of methylation for each individual CpG site within a region that contains more than one CpG site, and/or non-CpG methylation. "DNA methylation" in mammalian genomes can refer to the addition of a methyl group to position 5 of the heterocyclic ring of cytosine (e.g., to produce 5-methylcytosine) among CpG dinucleotides. Methylation of cytosine can occur in cytosines in other sequence contexts, for example, 5'-CHG-3' and 5'-CHH-3', where H is adenine, cytosine or thymine. Cytosine methylation can also be in the form of 5-hydroxymethylcytosine. Methylation of DNA can include methylation of non-cytosine nucleotides, such as N6-methyladenine.

In some embodiments, the cell-free nucleic acid fragments are treated to convert unmethylated cytosines to uracils. In one embodiment, the method uses a bisulfite treatment of the DNA that converts the unmethylated cytosines to uracils without converting the methylated cytosines. For example, a commercial kit such as the EZ DNA Methylation™—Gold, EZ DNA Methylation™—Direct or an EZ DNA Methylation™—Lightning kit (available from Zymo Research Corp (Irvine, CA)) is used for the bisulfite conversion. In another embodiment, the conversion of unmethylated cytosines to uracils is accomplished using an enzymatic reaction. For example, the conversion can use a commercially available kit for conversion of unmethylated cytosines to uracils, such as APOBEC-Seq (NEBiolabs, Ipswich, MA) or using the techniques disclosed in Schutsky et al., 2018, "Nondestructive, base-resolution sequencing of 5-hydroxymethylcytosine using a DNA deaminase," Nature Biotechnology 36, 1083-1090 or Liu et al., 2019, "Bisulfite-free direct detection of 5-methylcytosine and 5-hydroxymethylcytosine at base resolution" Nature Biotechnology 37, pp. 424-429.

Example 5—Tumor Fraction Estimation

Tumor fraction was estimated from the observed counts of fragments with tumor features in cfDNA. Genetic small nucleotide variant and methylation variant tumor features were determined from WGBS of tumor tissue biopsies (described above). A subset of 231 participants had matched tumor biopsy and cfDNA sequencing in the training set and were used in the tumor fraction estimations. This set of participants excluded those whose biopsies were used in target selection.

More specifically, to calculate the tumor-fraction from SNVs, a joint analysis of whole genome bisulfite sequencing (WGBS) of tumor tissue and whole genome sequencing of cfDNA was performed to identify tumor-associated somatic small nucleotide variants. This process started with calling SNVs within WGBS tissue using a custom variant caller that accounted for the effects of bisulfite conversion (unmethylated C-to-T conversion) by using strand-specific pileups and a Bayesian genotype model. Once a candidate list of SNVs was generated, a series of filtering steps were undertaken in order to enrich for somatic variants, since filtering using a matched-normal reference for these individuals was not available. These filters included a minimum variant allele frequency (VAF) (e.g., a minimum VAF of 20%) a maximum variant allele frequency (e.g., a maximum VAF of 90%), a minimum depth (e.g., a depth of 10), a custom blacklist of known noisy sites, the removal of germline-variants private to an individual as marked by Freebayes within sample-matched WGS cfDNA, and blacklisting of known germline variants using gnomAD and dbSNP. Counts of fragments supporting and not supporting each variant were generated from matched WGS sequencing of corresponding cfDNA samples. Posterior tumor fraction estimates were calculated using a grid search over tumor fractions and employing a per variant likelihood defined as a mixture of binomial likelihoods. The mixture components accounted for (1) observing fragments due to tumor shedding as well as (2) various error modes including germline variants and falsely called variants. Median and 95% credible intervals were calculated for each participant's tumor fraction.

REFERENCES CITED AND ALTERNATIVE EMBODIMENTS

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a non-transitory computer-readable storage medium. For instance, the computer program product could contain the program modules shown in any combination of FIG. 1 or 2, and/or as described in FIG. 3. These program modules can be stored on a CD-ROM, DVD, magnetic disk storage product, USB key, or any other non-transitory computer-readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A method of estimating a tumor fraction f of a subject, the method comprising:
(A) sequencing a first plurality of nucleic acid fragment sequences from a liquid biological sample obtained from the subject, wherein the liquid biological sample comprises blood, whole blood, plasma, serum, urine, fecal, saliva, sweat, or tears obtained from the subject;
(B) sequencing a second plurality of nucleic acid fragment sequences from a solid tumor sample obtained from the subject, wherein an average coverage rate for at least one of the first plurality of nucleic acid fragment sequences and the second plurality of nucleic acid fragment sequences is less than 5000×;
(C) determining a plurality of estimated smoothed noise rates corresponding to a plurality of allele positions, wherein the plurality of allele positions comprise a range between one million to ten million allele positions, each respective estimated smoothed noise rate $ev_i$ in the plurality of estimated smoothed noise rates is determined using nucleic acid fragment sequences, in electronic form, obtained from each non-cancer sample in a cohort of non-cancer samples mapping to a corresponding allele position $v_i$ in the plurality of allele positions, and each respective estimated smoothed noise rate $ev_i$ for the corresponding allele position specifies how often a tumor allele appears at the corresponding allele position in non-cancer samples;
(D) determining a variant allele count $s_{v_i,t}$ for each respective allele position $v_i$ in the plurality of allele positions using the first plurality of nucleic acid fragment sequences, thereby obtaining a plurality of variant allele counts for the subject;
(E) determining a coverage $s_{v_i}$ for each respective allele position $v_i$ in the plurality of allele positions using the first plurality of nucleic acid fragment sequences, thereby obtaining a plurality of coverages for the subject;
(F) determining a solid variant allele fraction $a_i$ for each respective allele position $v_i$ in the plurality of allele positions using the second plurality of nucleic acid fragment sequences, thereby obtaining a plurality of solid variant allele fractions;
(G) determining, using a computer system comprising a processor coupled to non-transitory memory, the tumor fraction f of the subject based on $D_s$ comprising (i) the plurality of estimated smoothed noise rates, (ii) the plurality of variant allele counts, (iii) the plurality of coverages, and (iv) the plurality of solid variant allele fractions, wherein (ii) and (iii) are determined based on the first plurality of nucleic acid fragment sequences from the liquid biological sample, and (iv) is determined based on the second plurality of nucleic acid fragment sequences from the solid tumor sample; and
(H) modifying a treatment regimen for the subject based, at least in part, on a value of the tumor fraction f of the subject, wherein the treatment regimen comprises applying an agent for cancer to the subject, wherein the agent for cancer is a hormone, an immune therapy, radiography, or a cancer drug, and wherein the modification to the treatment regimen comprises intensifying or discontinuing the agent.

2. The method of claim 1, wherein the respective estimated smoothed noise rate $ev_i$ for a respective allele position $v_i$ is calculated as:

$$ev_i = \frac{(n_{v_i,t} + b)}{(n_{v_i} + 2b)}$$

wherein,
$n_{v_i,t}$ is a variant allele count at position $v_i$ over the cohort of non-cancer samples,
$n_{v_i}$ is coverage of nucleic acid fragment sequences at $v_i$ summed over the cohort of non-cancer samples, and
b is a positive value representing a pseudocount.

3. The method of claim 1, wherein the determining (G) calculates a likelihood that a candidate tumor fraction $f_c$ is a true tumor fraction of the subject in the form of a posterior distribution of the candidate tumor fraction $f_c$ given $D_s$ by evaluating:

$$P(D_s) \propto P(f_c)P(f_c),$$

wherein,
$P(f_c)$ is a prior, wherein the prior is a non-informative prior,
$P(D_s)$ is the posterior distribution of the candidate tumor fraction $f_c$ given $D_s$, and
$P(f_c)$ is a probability of observing $D_s$ given the tumor fraction $f_c$.

4. The method of claim 3, wherein the determining (G) comprises computing the tumor fraction f of the subject by computing $D_s$ as part of a grid search, a Markov chain Monte Carlo sampling, or an Expectation-Maximization algorithm.

5. The method of claim 3, wherein the tumor fraction of the subject is deemed to be a median value of $P(D_s)$ across a range of calculated tumor fractions.

6. The method of claim 3, wherein the posterior distribution assumes a set of information comprising a plurality of solid variant allele fractions, wherein the posterior distribution is calculated based on a conditional probability of the set of information being satisfied, assuming that the candidate tumor fraction satisfies $f_c$.

7. The method of claim 3, wherein the determining the tumor fraction f in (G) comprises calculating:
wherein,
$s_{v_i,t}$ is a variant allele count at allele position $v_i$,
$s_{v_i}$ is a coverage for $s_{v_i,t}$ at allele position $v_i$, and
$a_i$ is a solid variant allele fraction at allele position $v_i$.

8. The method of claim 3, wherein the determining the tumor fraction f in (G) comprises calculating:
wherein,
is normalized,
$x_{v_i} = s_{v_i,t}$,
$n_{v_i} = s_{v_i}$,
$P_{v_i} = f_c a_i + (1-f_c)ev_i$, and
$a_i$=the solid variant allele fraction at allele position $v_i$.

9. The method of claim 3, wherein the calculation of the tumor fraction f in (G) comprises a factor corresponding to a germline contamination:
wherein,
$s_{v_i,t}$ is a variant allele count at allele position $v_i$,
$s_{v_i}$ is a coverage for $s_{v_i,t}$ at allele position $v_i$,
$a_i$ is a solid variant allele fraction at allele position $v_i$,
Q and P are each positive and sum to one, and
T is between 0.45 and 0.55.

10. The method of claim 1, the method further comprising calculating a threshold credible interval for the tumor fraction f of the subject.

11. The method of claim 1, the method further comprising using at least the tumor fraction f of the subject to determine a cancer condition of the subject.

12. The method of claim 1, wherein the determining (D) comprises determining a number of nucleic acid fragment sequences in the first plurality of nucleic acid fragment sequences having a respective variant at each respective allele position in the plurality of allele positions.

13. The method of claim 12, wherein the determining (D) comprises aligning a nucleic acid fragment sequence in the first plurality of nucleic acid fragment sequences to a region in a reference genome in order to determine whether the nucleic acid fragment sequence includes the respective variant.

14. The method of claim 1, wherein the determining the solid variant allele fraction $a_i$ for each respective allele position $v_i$ in the plurality of allele positions using the second plurality of nucleic acid fragment sequences (F) comprises comparing a number of nucleic acid fragment sequences in the second plurality of nucleic acid fragment sequences having a respective variant at each respective allele position in the plurality of allele positions to a total number of nucleic acid fragment sequences in the second plurality of nucleic acid fragment sequences that map to the respective allele position.

15. The method of claim 14, wherein the determining (F) comprises aligning a nucleic acid fragment sequence in the second plurality of nucleic acid fragment sequences to a region in a reference genome in order to determine whether the nucleic acid fragment sequence includes the respective variant.

16. The method of claim 1, wherein the plurality of allele positions are selected for a particular type of cancer, or
the plurality of allele positions are selected for a plurality of cancers, or
the plurality of allele positions are selected independent of a type of cancer.

17. The method of claim 1, wherein the plurality of allele positions comprises a methylation pattern allele position.

18. The method of claim 1, wherein at least one of the first plurality of nucleic acid fragment sequences and the second plurality of nucleic acid fragment sequences is obtained using whole-genome bisulfite sequencing.

19. The method of claim 1, further comprising evaluating a stage of the cancer in the subject based on the calculated tumor fraction f of the subject.

20. The method of claim 1, further comprising evaluating a level of aggressiveness of the cancer in the subject based on the calculated tumor fraction f of the subject.

21. The method of claim 1, wherein the agent for cancer is Lenalidomide, Pembrolizumab, Trastuzumab, Bevacizumab, Rituximab, Ibrutinib, Human Papillomavirus Quadrivalent (Types 6, 11, 16, and 18) Vaccine, Pertuzumab, Pemetrexed, Nilotinib, Denosumab, Abiraterone acetate, Promacta, Imatinib, Everolimus, Palbociclib, Erlotinib, or Bortezomib.

22. The method of claim 1, wherein the subject has been treated with the agent for cancer and the method further comprises:
(I) using the tumor fraction f of the subject to evaluate a response of the subject to the agent for cancer.

* * * * *